(12) United States Patent
Nashizawa

(10) Patent No.: US 11,438,523 B2
(45) Date of Patent: Sep. 6, 2022

(54) DISPLAY CONTROL APPARATUS, DISPLAY CONTROL METHOD, AND A NON-TRANSITORY COMPUTER-READABLE MEDIUM

(71) Applicant: CANON KABUSHIKI KAISHA, Tokyo (JP)

(72) Inventor: Hiroaki Nashizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/167,839

(22) Filed: Feb. 4, 2021

(65) Prior Publication Data

US 2021/0250518 A1 Aug. 12, 2021

(30) Foreign Application Priority Data

Feb. 6, 2020 (JP) .............................. JP2020-018973

(51) Int. Cl.
*H04N 5/243* (2006.01)
*G09G 5/10* (2006.01)
*H04N 5/232* (2006.01)

(52) U.S. Cl.
CPC .............. *H04N 5/243* (2013.01); *G09G 5/10* (2013.01); *H04N 5/23232* (2013.01); *H04N 5/23293* (2013.01); *G09G 2320/0626* (2013.01)

(58) Field of Classification Search
CPC .... G09G 5/02; G09G 2320/0626; G09G 5/10; G09G 2320/0666; G09G 2320/0673; G09G 2340/06; G09G 2320/0238; H04N 5/23293; H04N 5/23216; H04N 5/23232; H04N 5/243; H04N 5/2355; H04N 5/23245; H04N 9/64; H04N 5/232935; H04N 5/23258
See application file for complete search history.

(56) References Cited

U.S. PATENT DOCUMENTS

| | | | |
|---|---|---|---|
| 2015/0213586 A1* | 7/2015 | Koike ..................... | G06T 5/007 382/284 |
| 2016/0300537 A1* | 10/2016 | Hoffman .............. | G09G 3/2092 |
| 2018/0204542 A1* | 7/2018 | Saito ........................ | G09G 5/14 |
| 2019/0289217 A1 | 9/2019 | Nakagawa et al. | |
| 2021/0297645 A1* | 9/2021 | Toma ..................... | G06T 5/009 |

FOREIGN PATENT DOCUMENTS

| | | |
|---|---|---|
| JP | 2019-057824 A | 4/2019 |
| WO | 2016/038950 A1 | 6/2017 |

* cited by examiner

*Primary Examiner* — Muhammad N Edun
(74) *Attorney, Agent, or Firm* — Cowan, Liebowitz & Latman, P.C.

(57) ABSTRACT

A display control apparatus includes: a display controller configured to display a graphic image together with an HDR image on a display unit, wherein the display controller is further configured to (1) display the graphic image in second brightness in a case where brightness of the HDR image is first brightness, and (2) display the graphic image in fourth brightness that is higher than the second brightness in a case where brightness of the HDR image is third brightness that is higher than the first brightness.

13 Claims, 42 Drawing Sheets

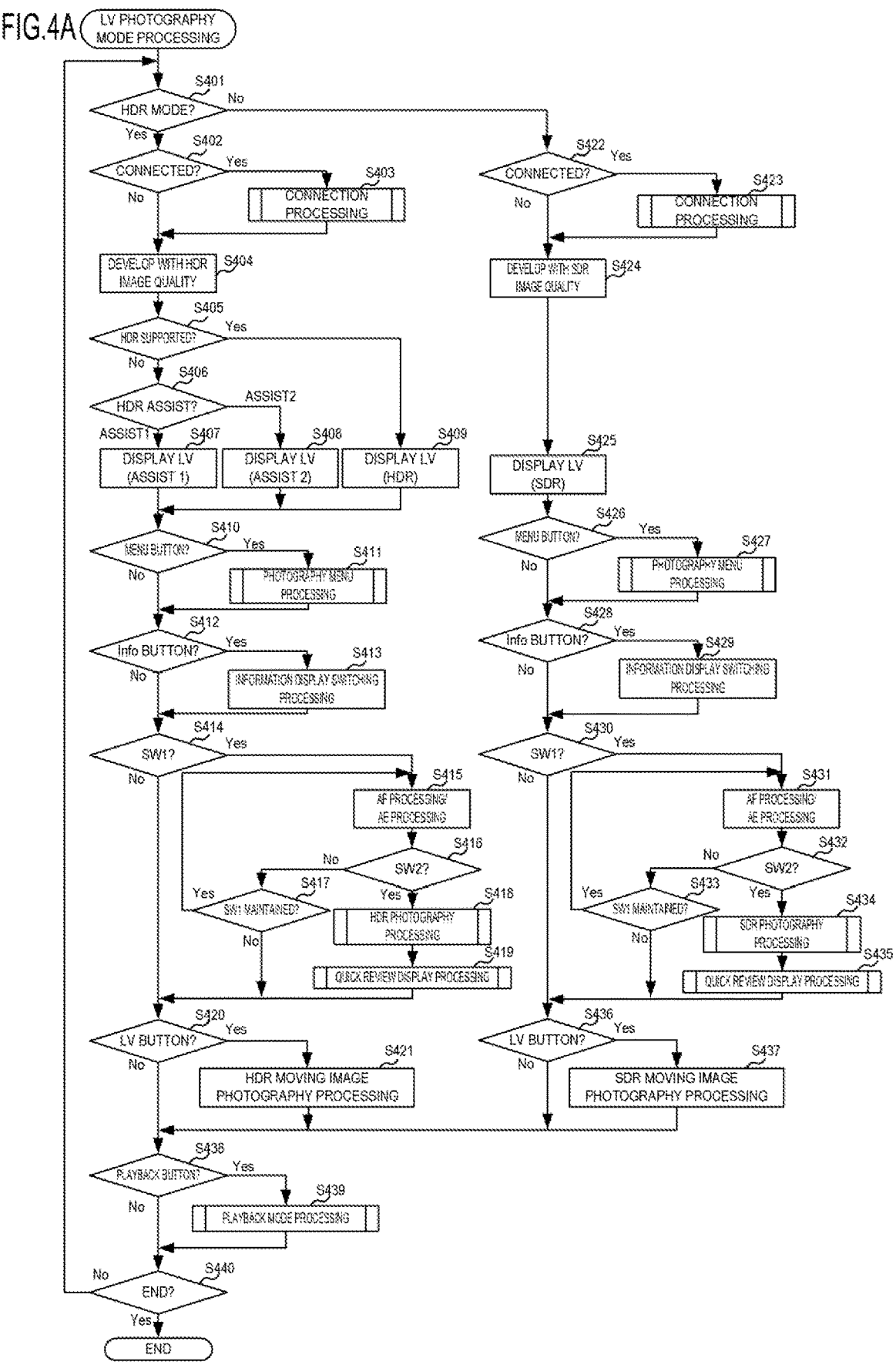

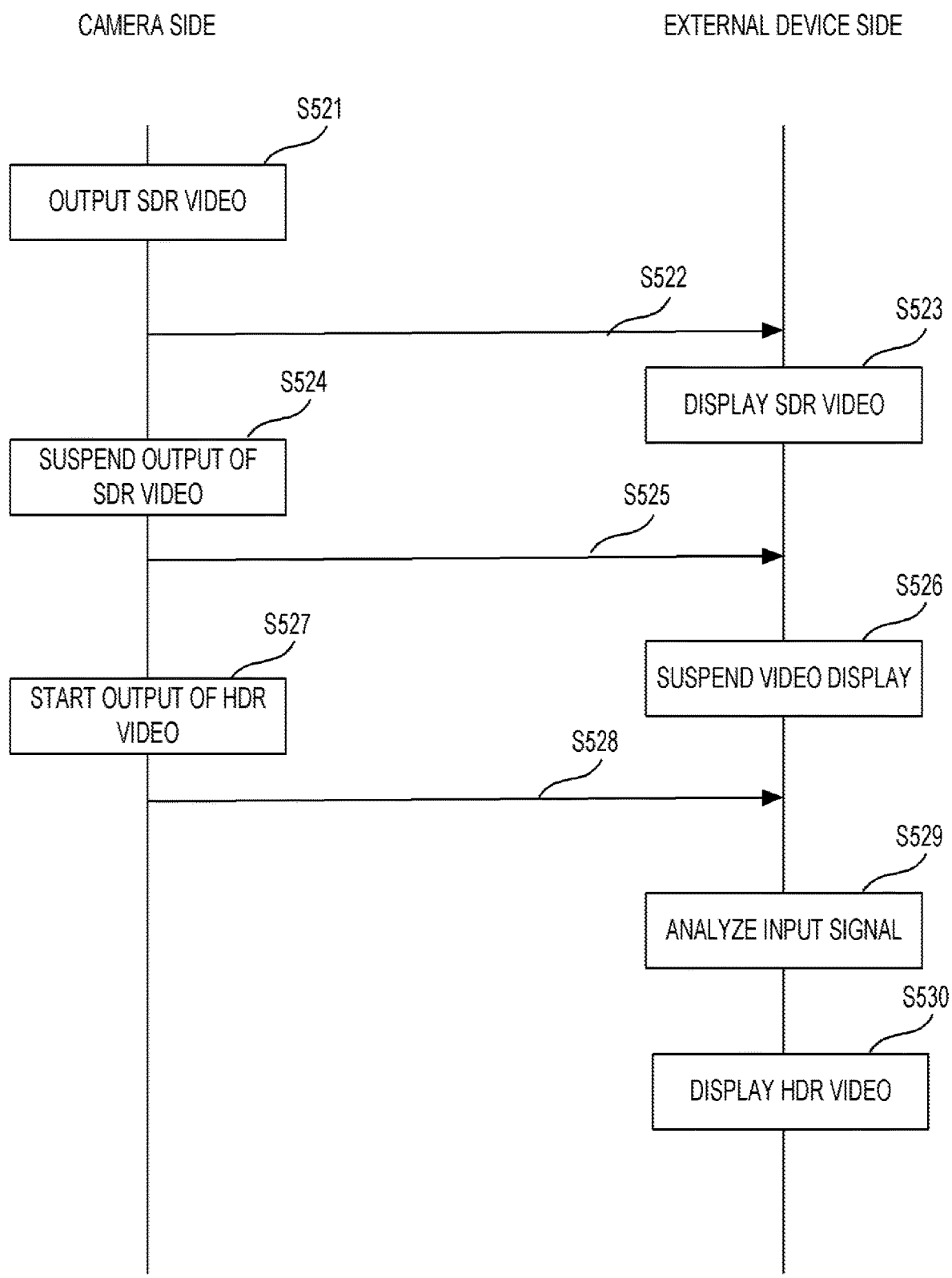

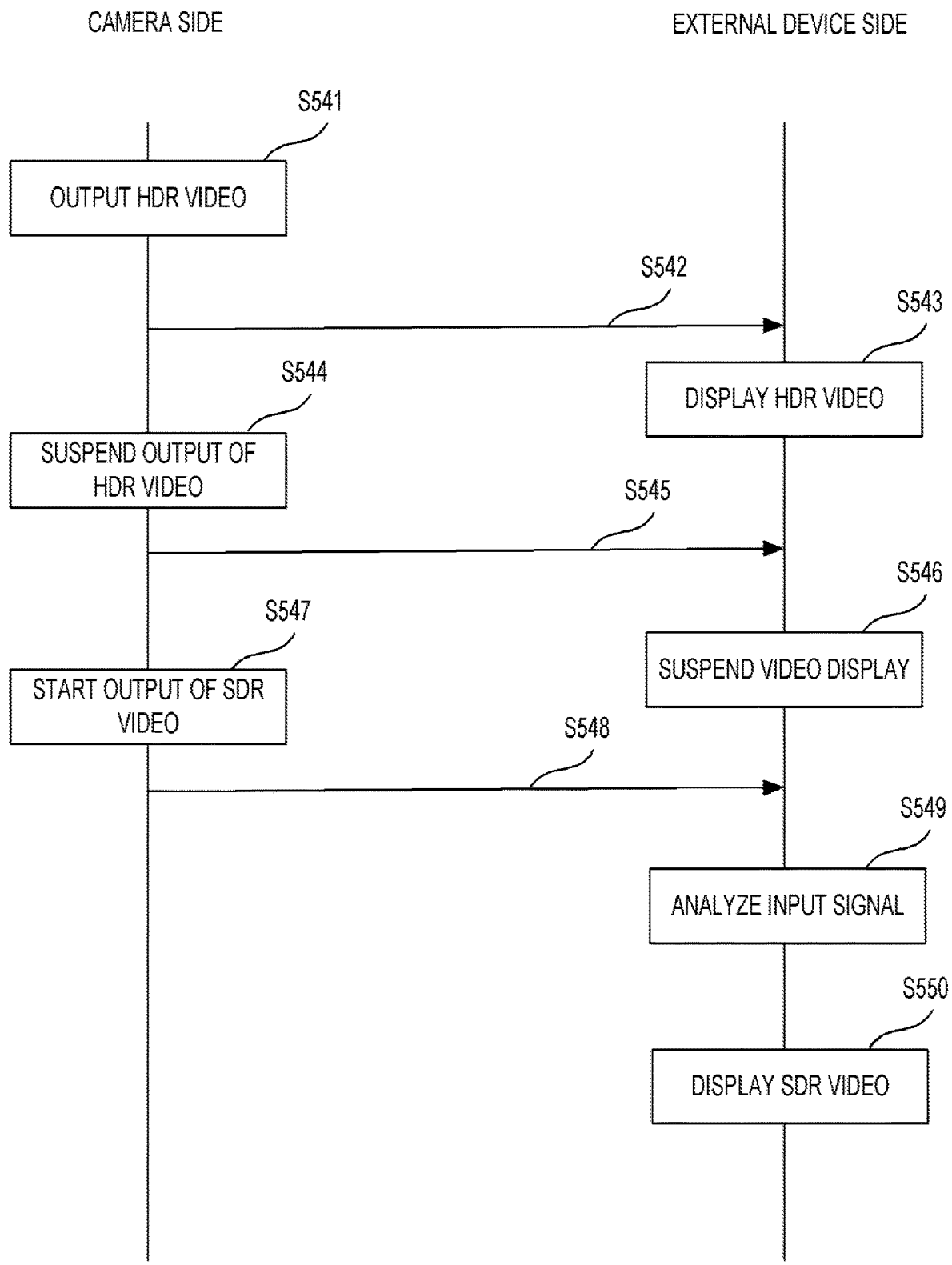

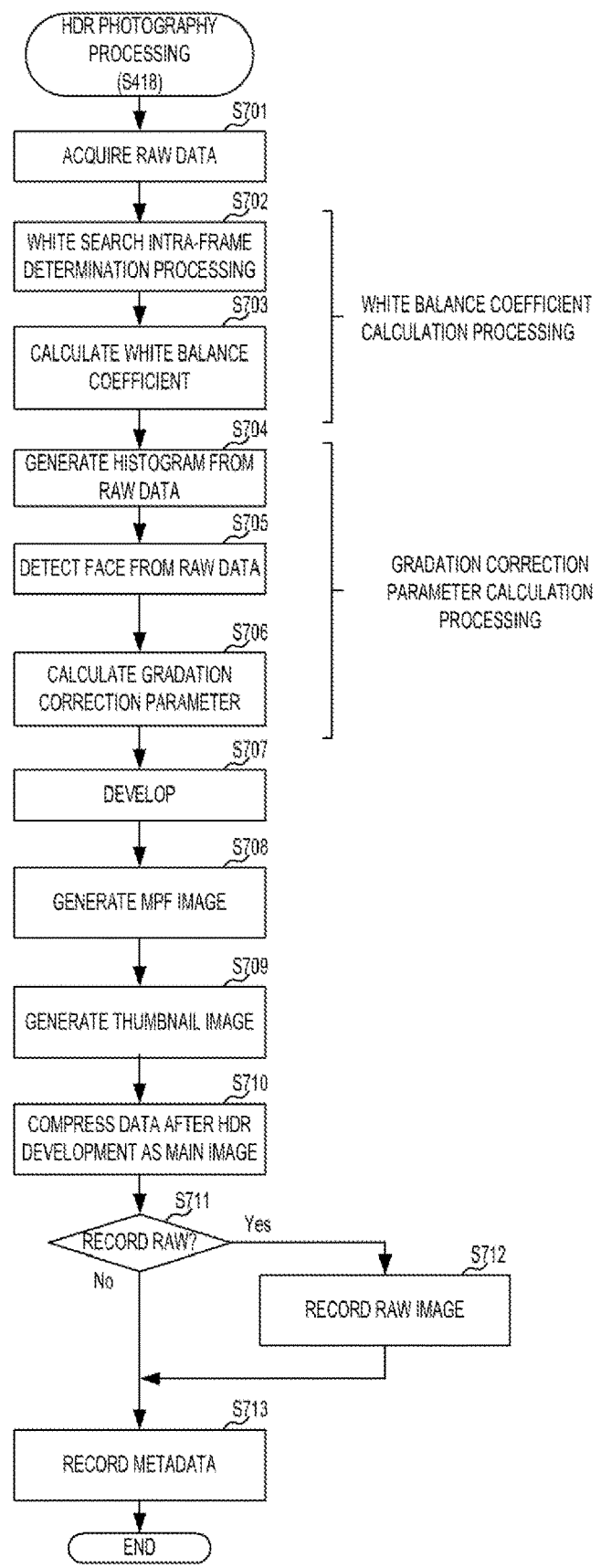

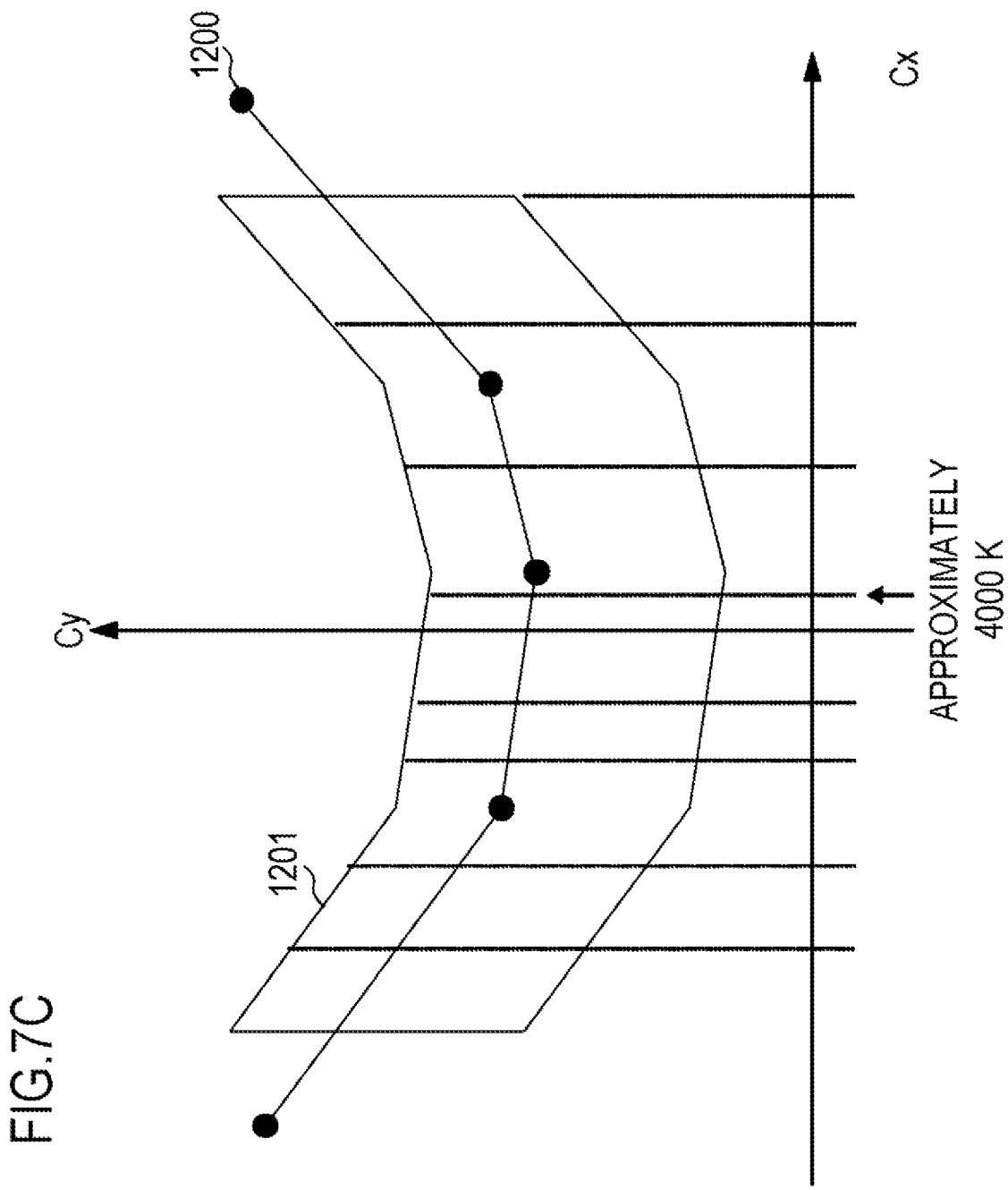

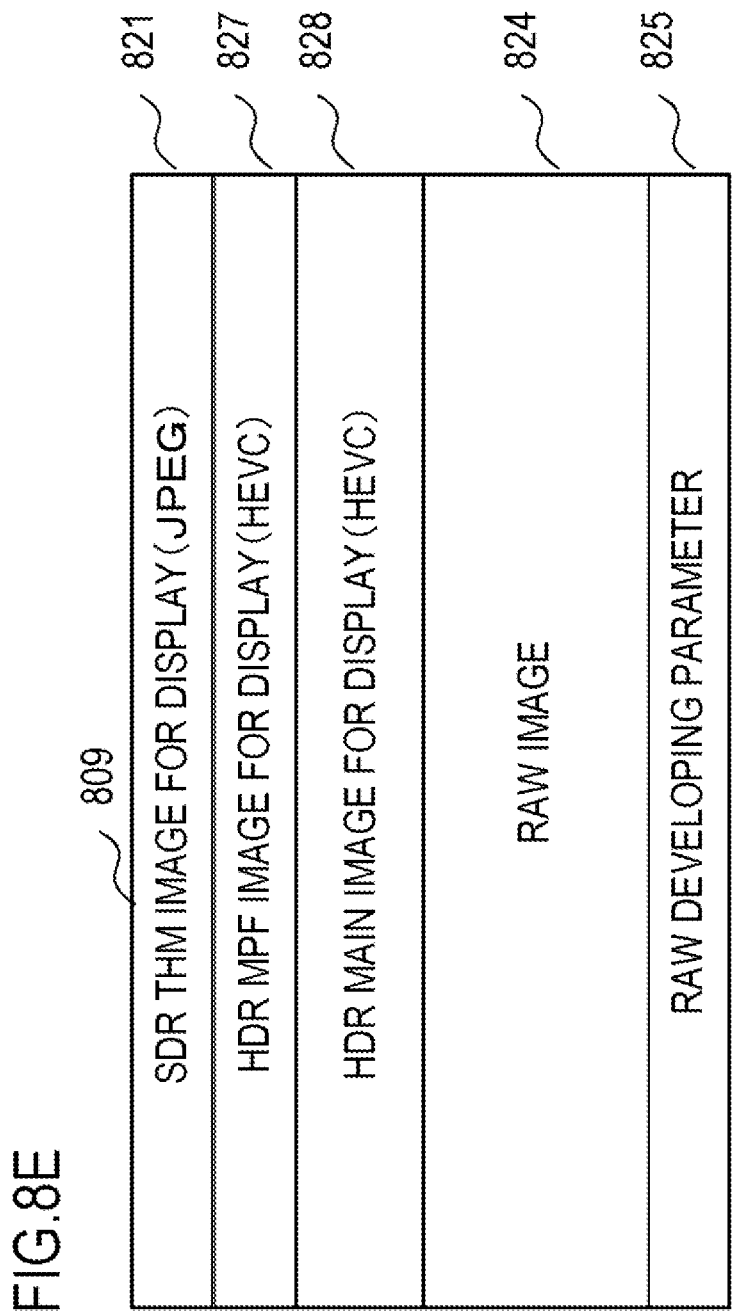

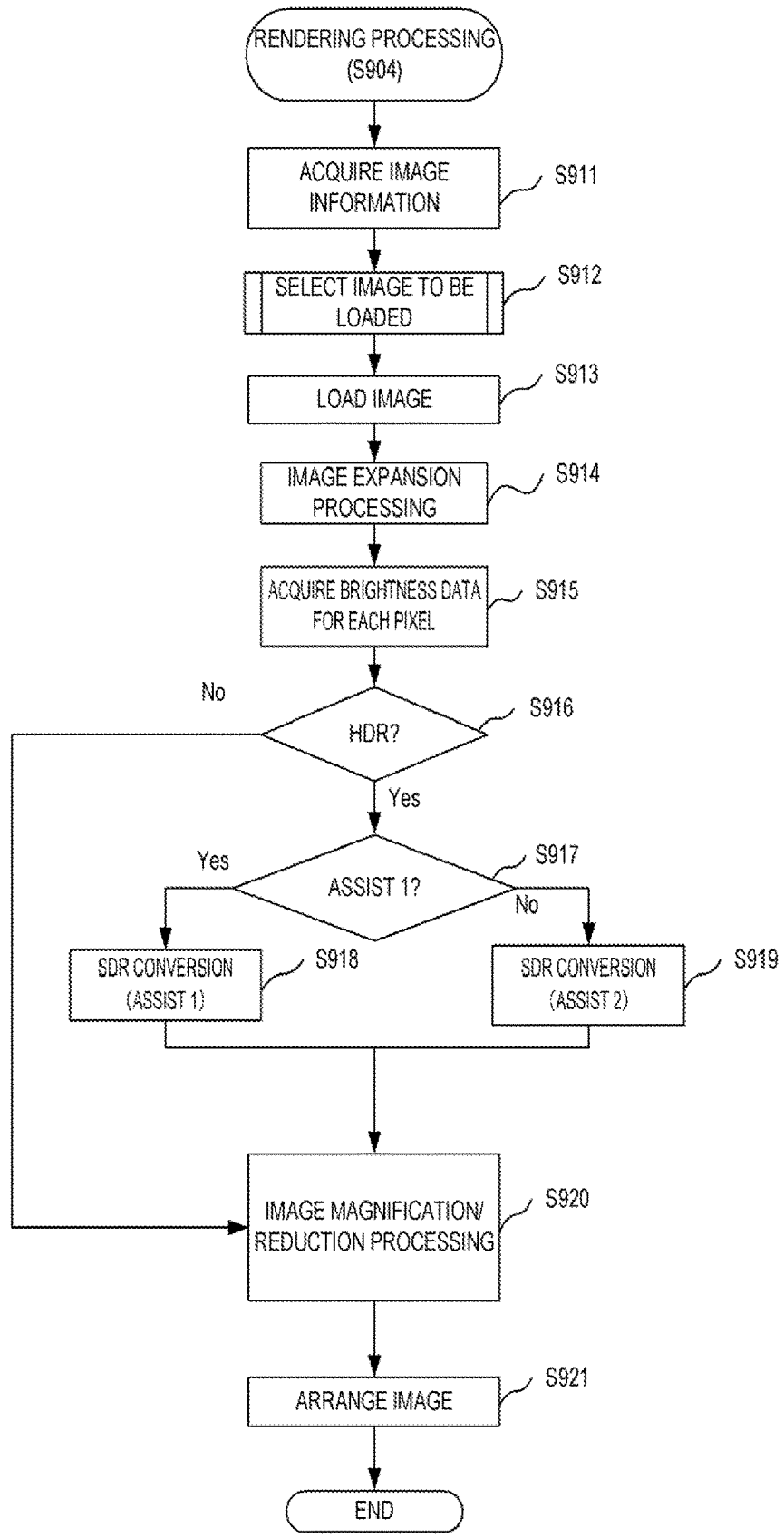

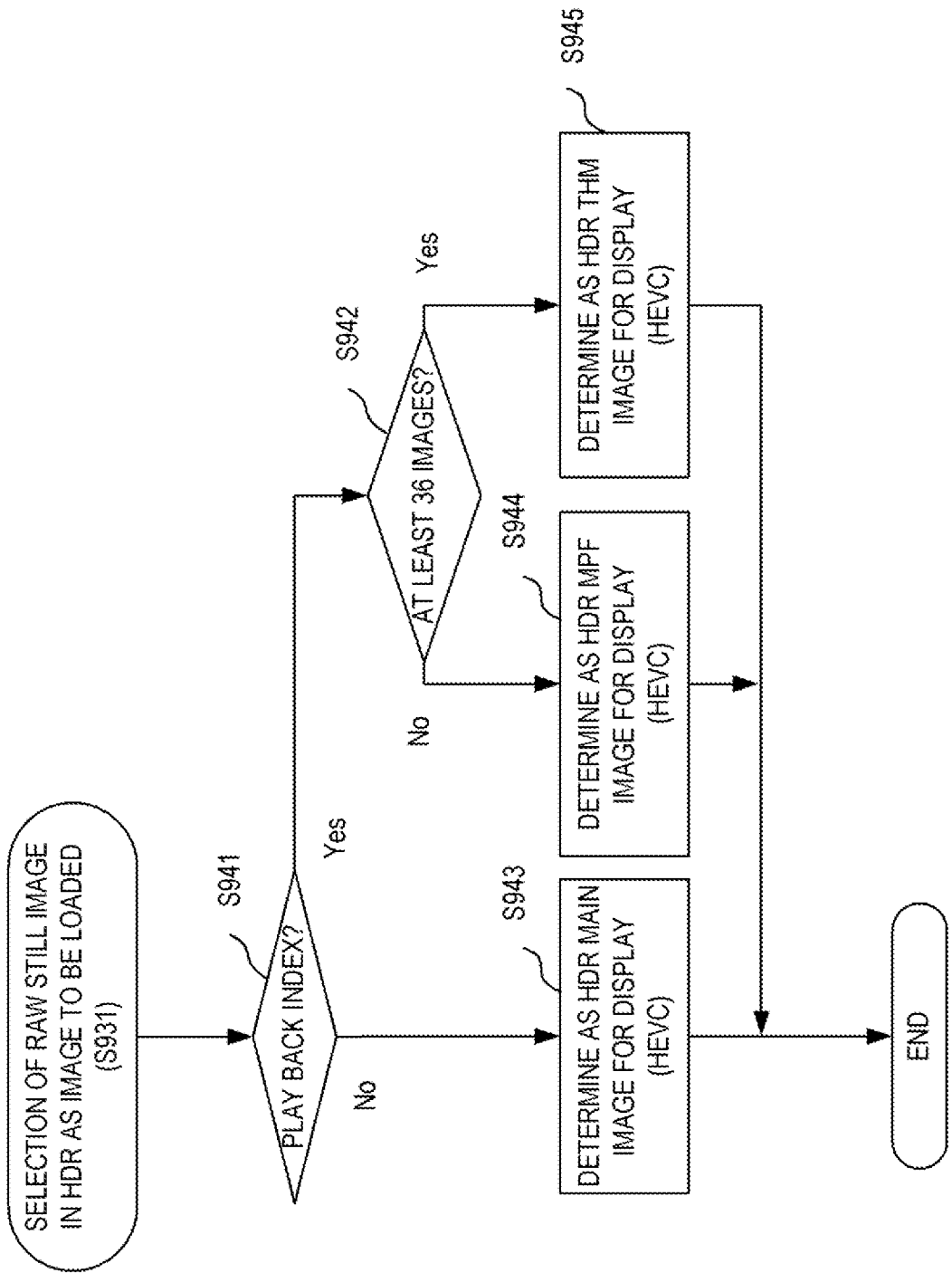

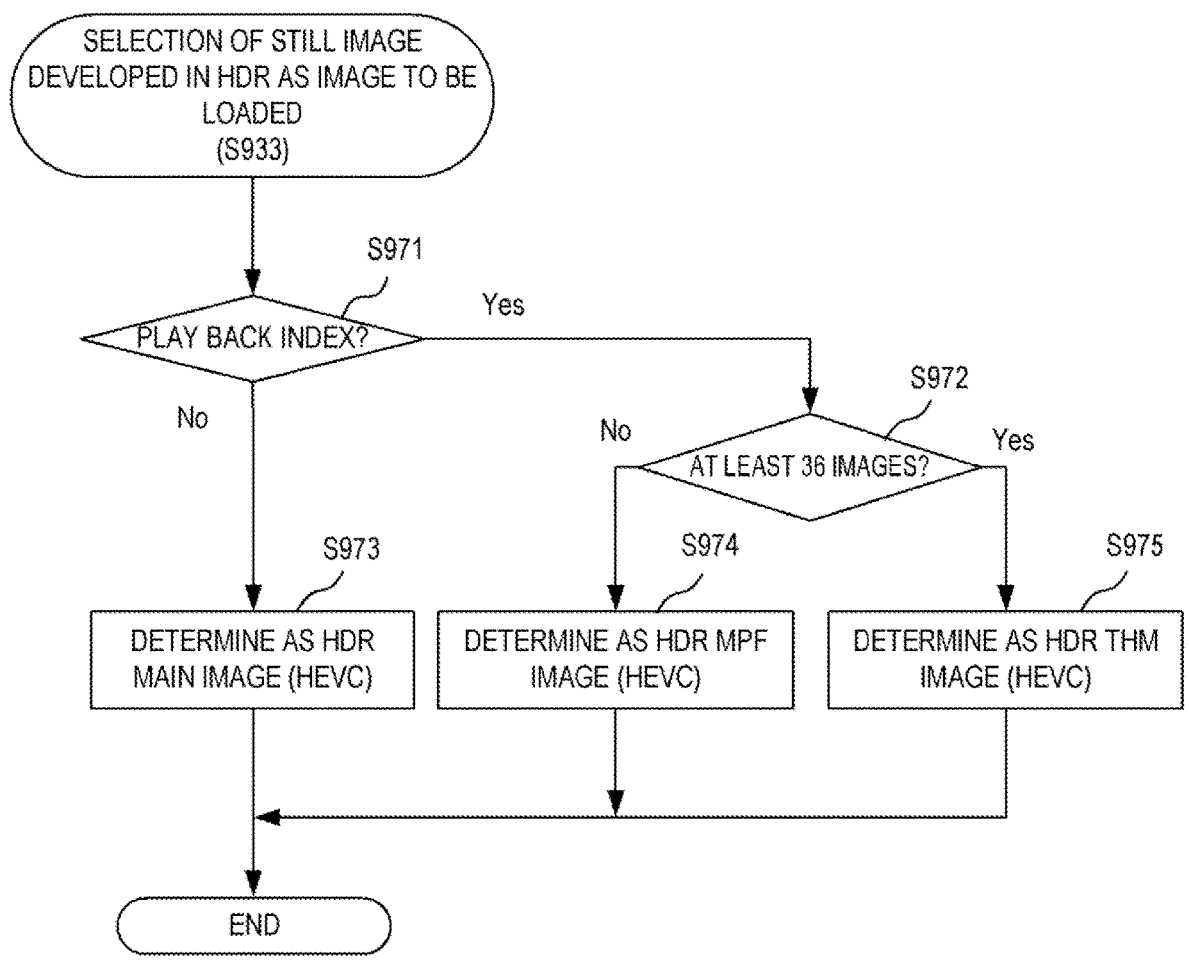

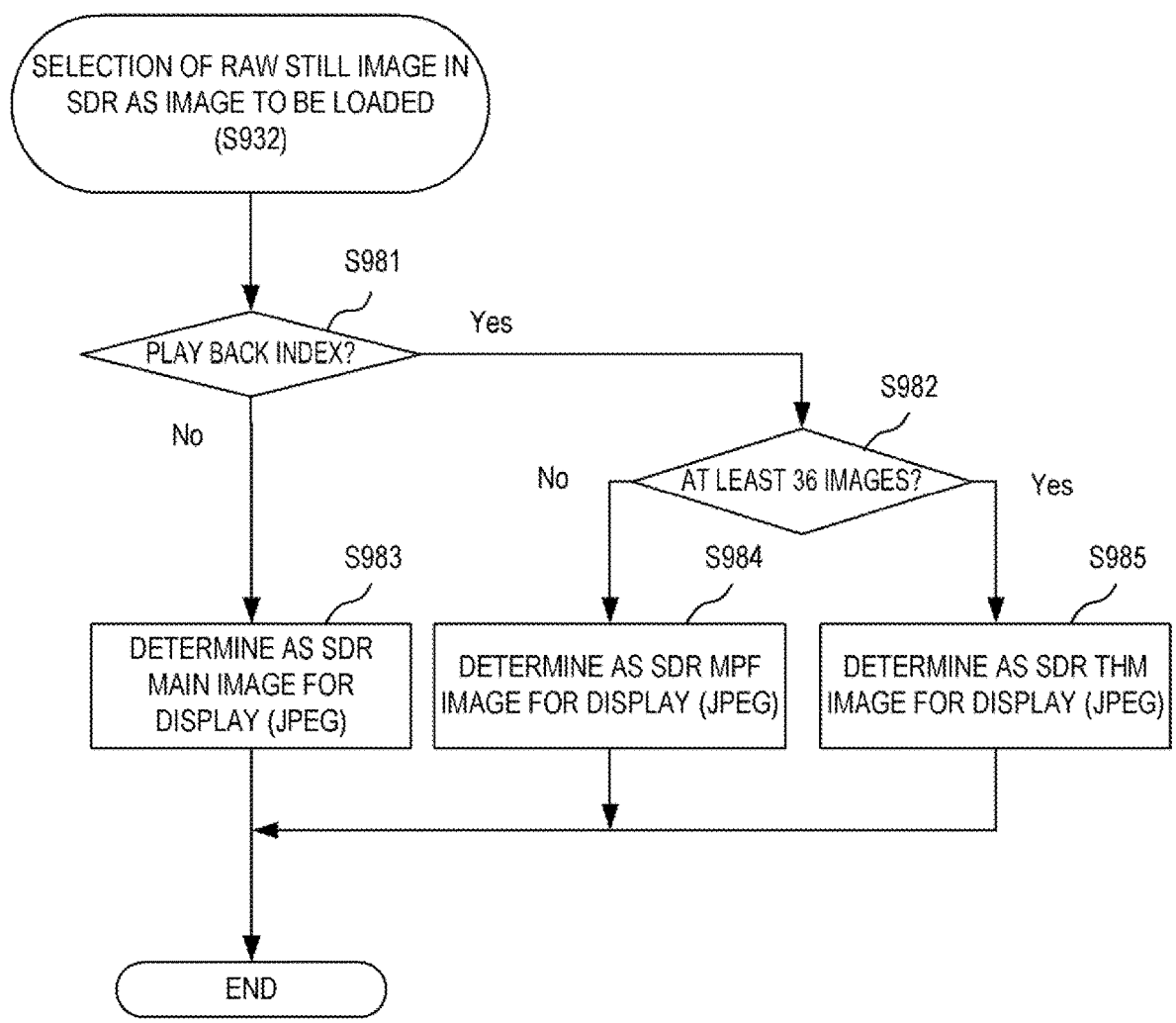

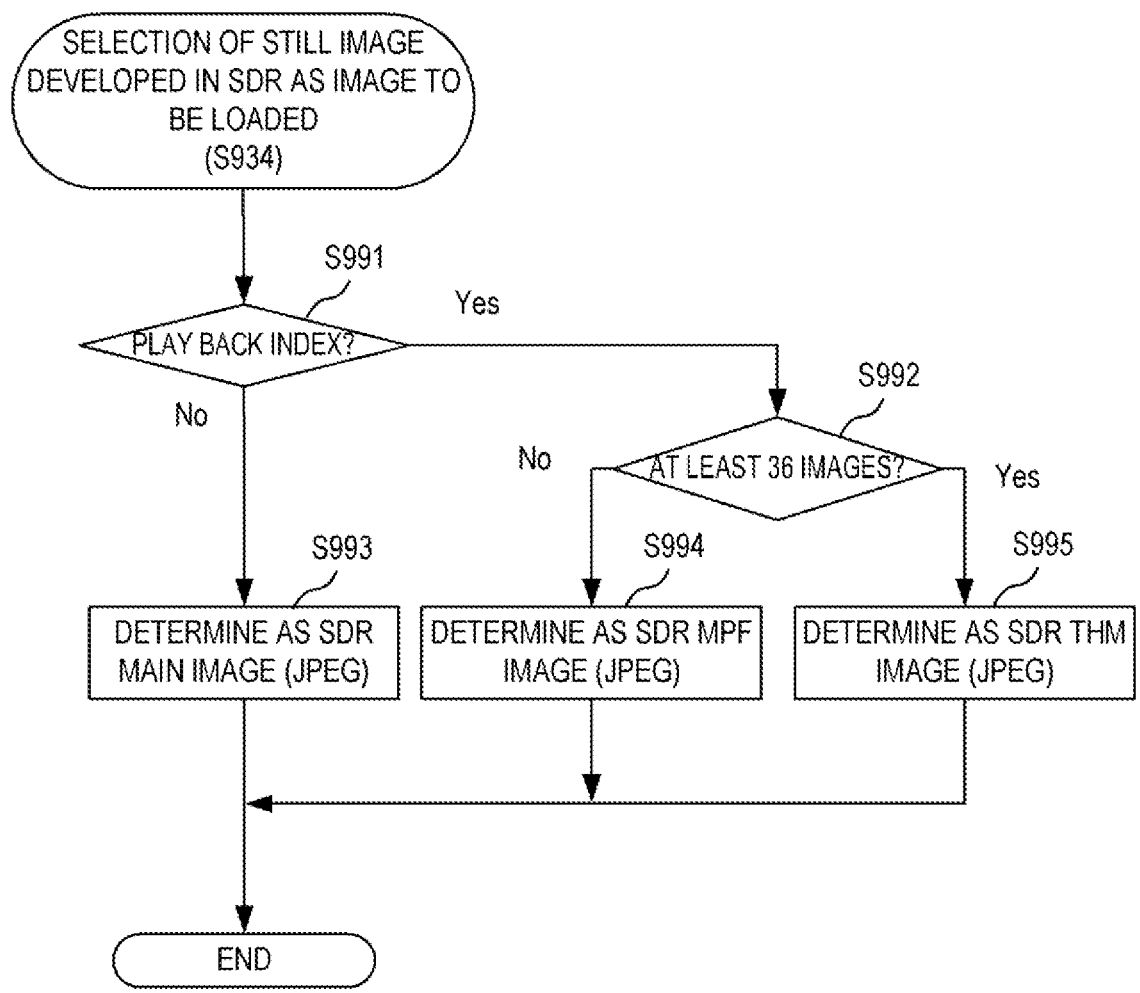

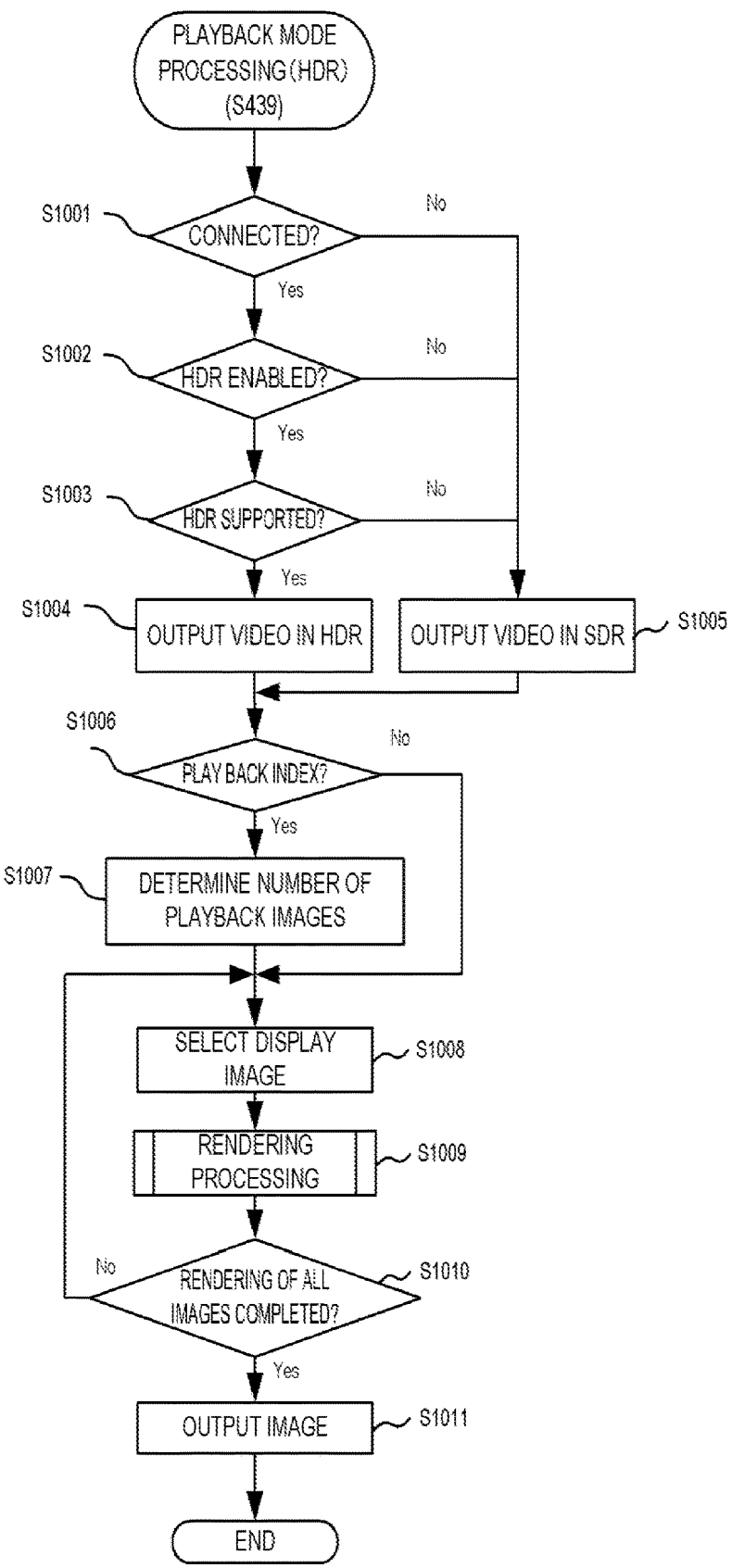

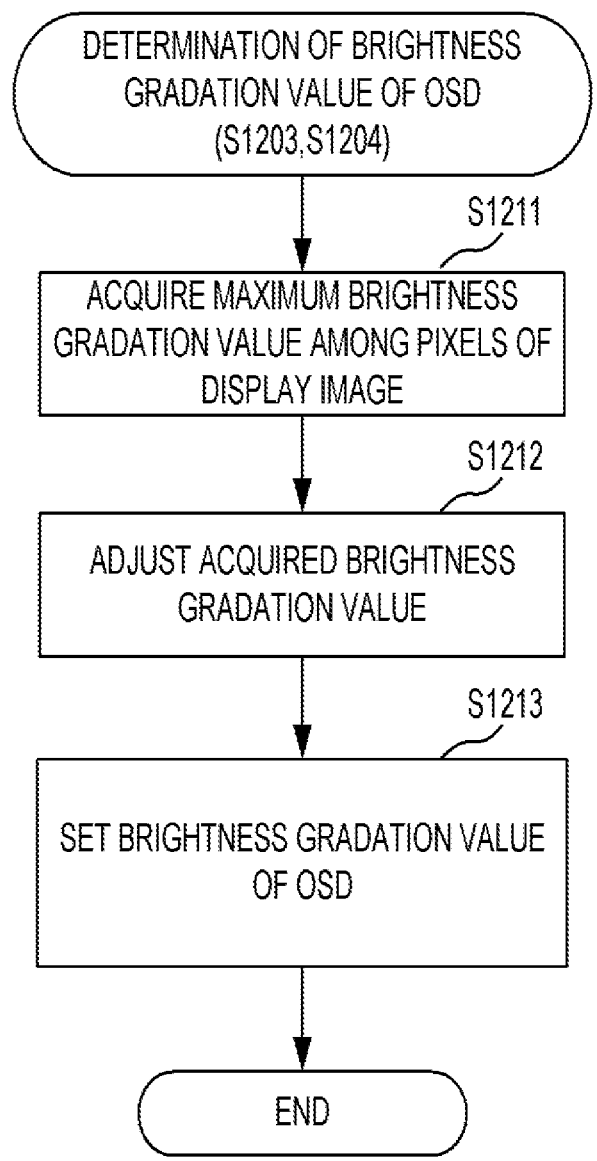

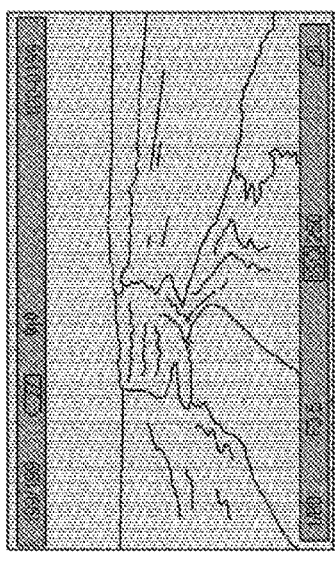
FIG.13A CONVENTIONAL METHOD
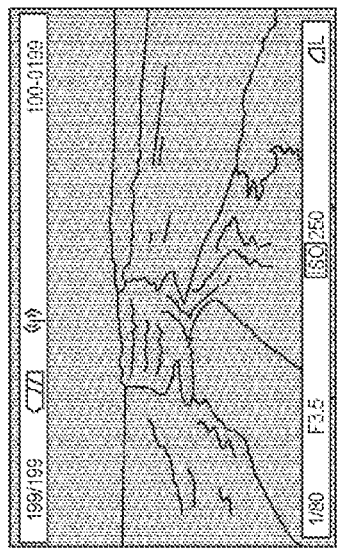
FIG.13B CONVENTIONAL METHOD
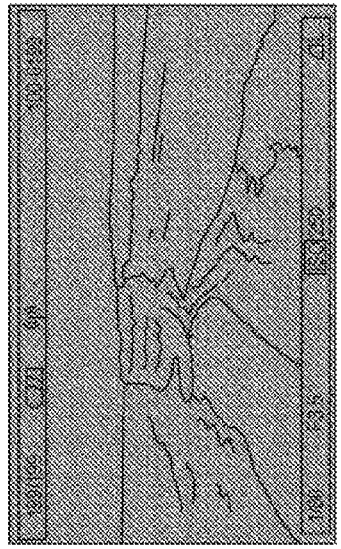
FIG.13C CONVENTIONAL METHOD
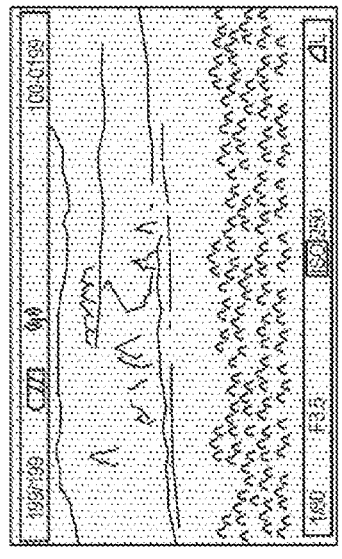
FIG.13E PRESENT EMBODIMENT
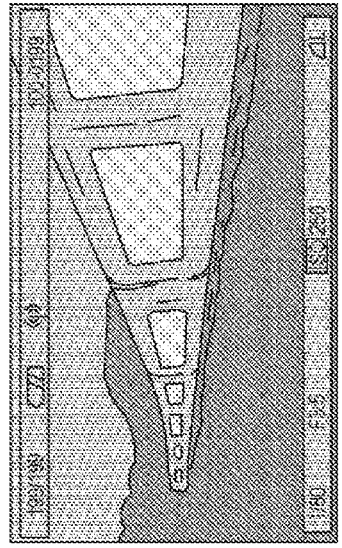
FIG.13D PRESENT EMBODIMENT

FIG.15

| PHOTOGRAPHY MODE | DEVELOPING MODE | MAXIMUM SIGNAL VALUE AFTER DEVELOPMENT | MAXIMUM BRIGHTNESS VALUE AFTER DEVELOPMENT |
|---|---|---|---|
| D RANGE: NARROW | HIGH CONTRAST | 633 (10Bit) | 291 (cd/m$^2$) |
| D RANGE: NARROW | STANDARD CONTRAST | 612 (10Bit) | 240 (cd/m$^2$) |
| D RANGE: WIDE | HIGH CONTRAST | 721 (10Bit) | 648 (cd/m$^2$) |
| D RANGE: WIDE | STANDARD CONTRAST | 688 (10Bit) | 481 (cd/m$^2$) |

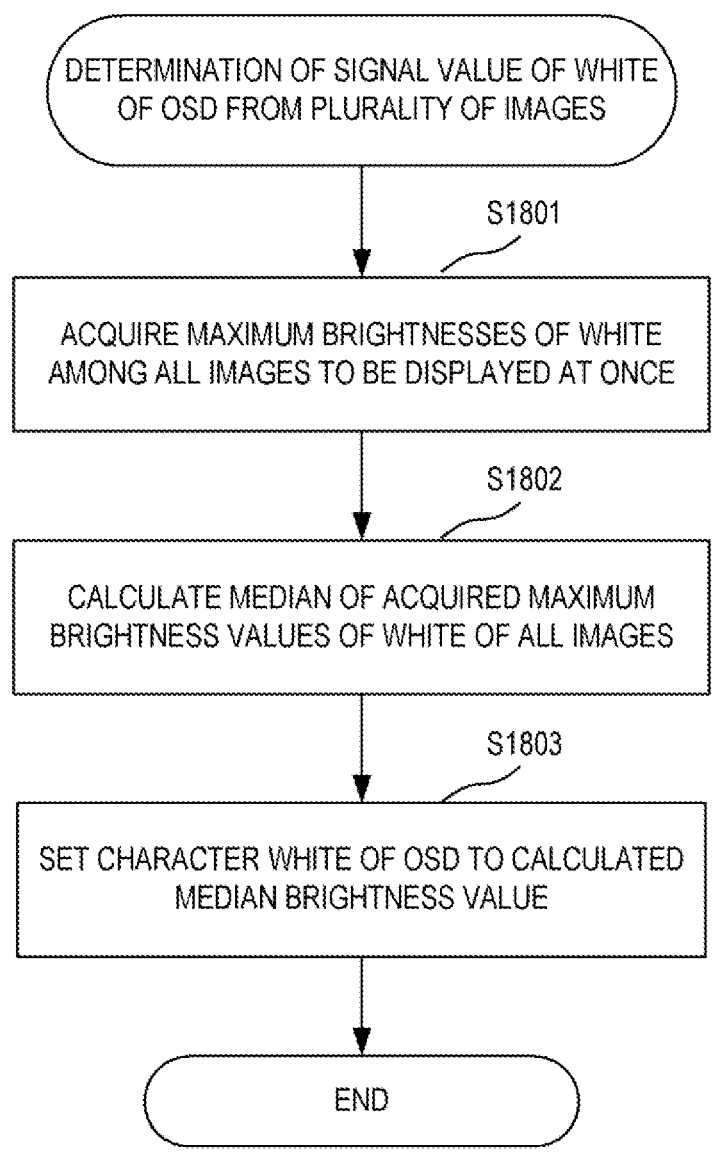

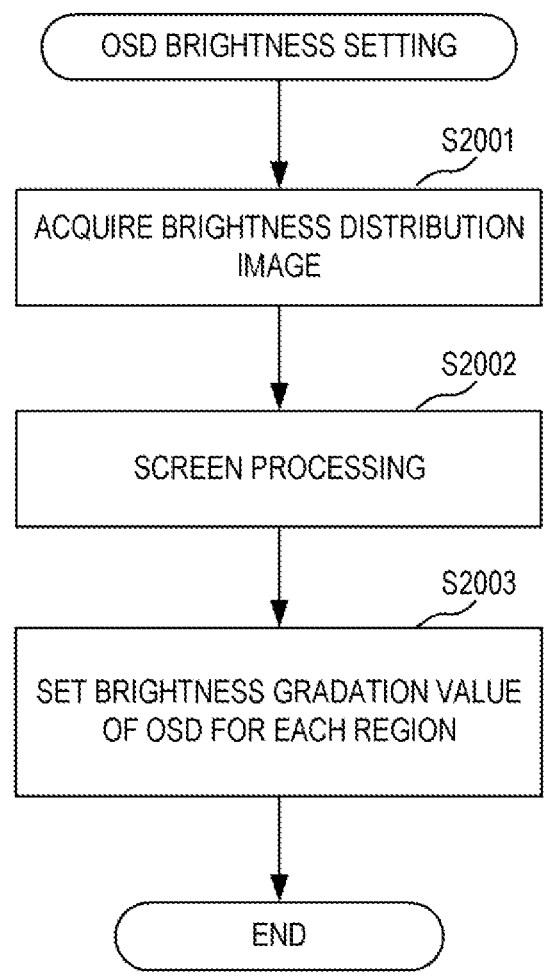

DISPLAY CONTROL APPARATUS, DISPLAY CONTROL METHOD, AND A NON-TRANSITORY COMPUTER-READABLE MEDIUM

BACKGROUND OF THE INVENTION

Field of the Invention

The present invention relates to a display control apparatus, a display control method, and a non-transitory computer-readable medium.

Description of the Related Art

In recent years, advances in LED elements and the like have led to a wider use of displays supporting an HDR (High Dynamic Range) that enables upper limit brightness (maximum brightness; peak brightness) to be enhanced by adjusting brightness of black to become darker. An HDR-ready display is capable of displaying image data with a high dynamic range (HDR) without having to compress the image data. In an HDR, scenes such as clouds in a blue sky and neon lights in a night view, of which contrast is reduced in a conventional dynamic range (hereinafter, SDR: Standard Dynamic Range), can be reproduced with greater reality (with improved gradation properties). While such an HDR has been mainly used in moving images to be recorded on Blu-ray discs and the like, future applications thereof are expected to expand into still images.

On a rear liquid crystal display of an imaging apparatus or the like when playing back and displaying a photographed image, photography information (speed, aperture value, ISO sensitivity, and image name) and an OSD (a graphic image) of state information during playback or the like are often displayed superimposed on the photographed image.

Japanese Patent Application Laid-open No. 2019-057824 discloses receiving peak brightness or gamma from a display apparatus and adjusting an OSD to be brighter in advance when determination is made that brightness of the OSD is to become darker, and also discloses determining which of an image and the OSD is important, thereby adjusting the OSD to brightness to be optical to whichever important. WO 2016/038950 discloses setting a brightness gradation value of an OSD (100 cd/m$^2$) with an SDR to Diffuse White (which corresponds to dominant white (300 to 500 cd/m$^2$) in an image) when converting the OSD into HDR data.

However, the conventional techniques disclosed in Japanese Patent Application Laid-open No. 2019-057824 and WO 2016/038950 are problematic in that when an OSD is displayed bright or displayed dark relative to a rear image, visibility of the OSD is poor.

SUMMARY OF THE INVENTION

In consideration thereof, an object of the present invention is to display an OSD with suitable brightness.

The present invention in its first aspect provides
a display control apparatus, comprising:
at least one processor and/or at least one circuit to perform the operations of the following unit:
a display controller configured to display a graphic image together with an HDR image on a display unit,
wherein the display controller is further configured to (1) display the graphic image in second brightness in a case where brightness of the HDR image is first brightness, and (2) display the graphic image in fourth brightness that is higher than the second brightness in a case where brightness of the HDR image is third brightness that is higher than the first brightness.

Further features of the present invention will become apparent from the following description of exemplary embodiments with reference to the attached drawings.

BRIEF DESCRIPTION OF THE DRAWINGS

FIG. 4A is a flow chart showing LV photography mode processing according to the first embodiment;

FIGS. 5A to 5C are sequence diagrams of connection processing according to the first embodiment;

FIG. 7A is a flow chart showing HDR photography processing according to the first embodiment;

FIG. 7C is a diagram showing a CxCy plane according to the first embodiment;

FIG. 8A to 8E are diagrams showing an example of a configuration of a file according to the first embodiment;

FIG. 9B is a flow chart showing playback mode processing according to the first embodiment;

FIG. 9D is a flow chart showing playback mode processing according to the first embodiment;

FIG. 9F is a flow chart showing playback mode processing according to the first embodiment;

FIG. 9G is a flow chart showing playback mode processing according to the first embodiment;

FIG. 9H is a flow chart showing playback mode processing according to the first embodiment;

FIG. 10A is a flow chart showing playback mode processing according to the first embodiment.

FIG. 12B is a flow chart showing OSD brightness setting processing according to the first embodiment;

FIGS. 13A to 13E are diagrams showing an example of OSD information display;

FIG. 15 is a diagram showing a correspondence relationship between photography conditions and a brightness gradation value according to a second embodiment.

FIG. 18 is a flow chart showing OSD brightness setting processing according to the third embodiment;

FIG. 20 is a flow chart showing OSD brightness setting processing according to the fourth embodiment.

DESCRIPTION OF THE EMBODIMENTS

Hereinafter, embodiments of the present invention will be described in detail with reference to the accompanying drawings. It is to be understood that the embodiments described below merely represent examples of a method of realizing the present invention and may be appropriately corrected or modified according to a configuration of an apparatus to which the present invention is applied as well as various conditions. In addition, the respective embodiments can also be combined as appropriate.

First Embodiment

Figure 1A:
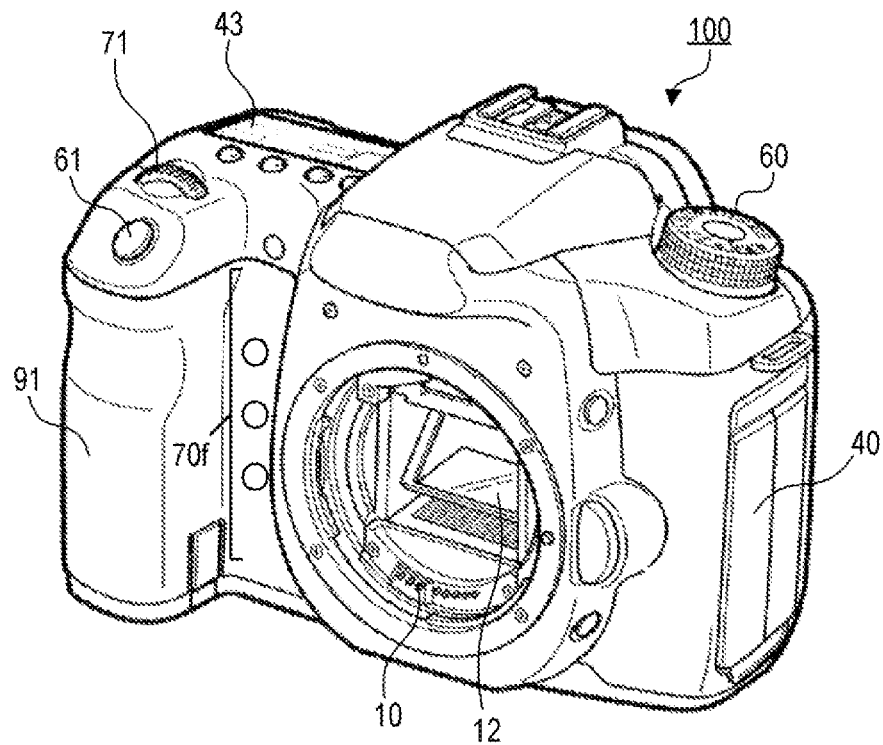
FIGS. 1A and 1B are external views of a digital camera according to a first embodiment.
Figure 1B:
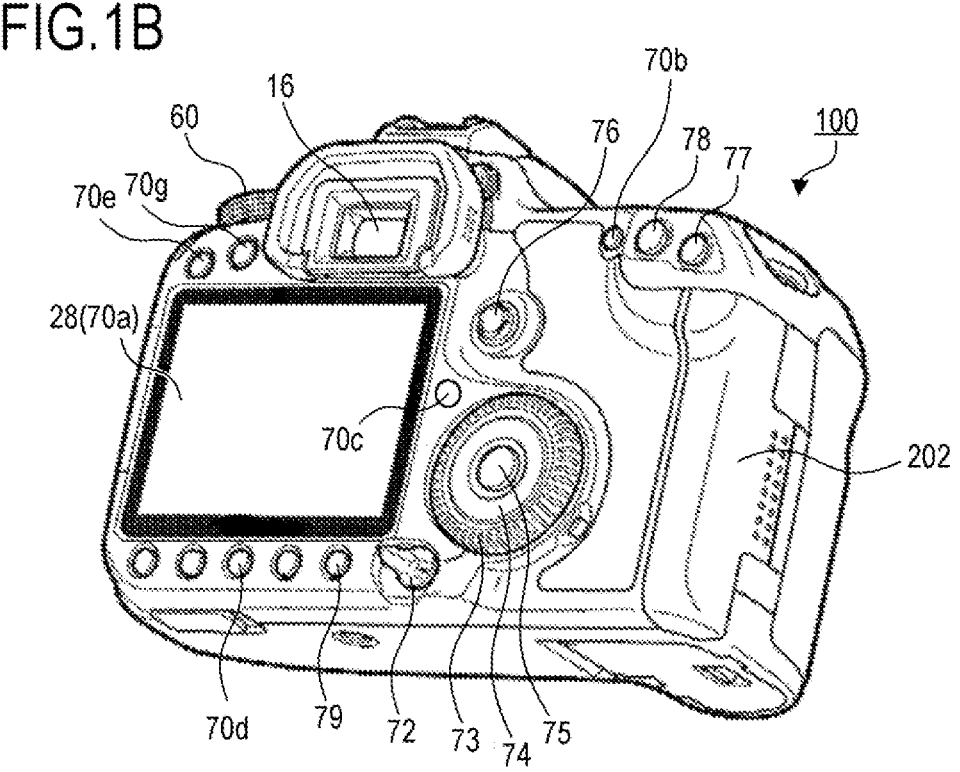

Hereinafter, a preferred embodiment of the present invention will be described with reference to the drawings. FIGS. 1A and 1B show external views of a digital camera 100 as an example of an apparatus to which the present invention can be applied. FIG. 1A is a front perspective view of the digital camera 100, and FIG. 1B is a rear perspective view of the digital camera 100.

A display unit 28 is a display provided on a rear surface of the digital camera 100 for displaying images and various types of information. A finder outer display unit 43 is a display provided on an upper surface of the digital camera 100 for displaying various setting values of the digital camera 100 such as a shutter speed and an aperture. A terminal cover 40 is a cover for protecting a connector (not illustrated) for a connection cable or the like which connects the digital camera 100 to an external device. A quick return mirror 12 is raised and lowered by an actuator (not illustrated) under instructions from a system control unit 50 (to be described later). A communication terminal 10 is a communication terminal used by the digital camera 100 to communicate with a lens unit 150 (to be described later, attachable and detachable). An eyepiece finder 16 is a look-in finder for checking a focus and a composition of an optical image of a subject obtained through the lens unit 150 by observing a focusing screen 13 (to be described later). A lid 202 is a lid of a slot in which a recording medium 200 (to be described later) is stored. A grip portion 91 is a holding portion configured in a shape that can be readily gripped by the right hand of a user when holding the digital camera 100.

In addition, the digital camera 100 has a mode changeover switch 60, a shutter button 61, a main electronic dial 71, a power supply switch 72, a sub electronic dial 73, a four-way key 74, a SET button 75, and an LV button 76. The digital camera 100 also has an enlargement button 77, a reduction button 78, and a playback button 79. The digital camera 100 may have other operating members. The various operating members will be described later.

Figure 2:
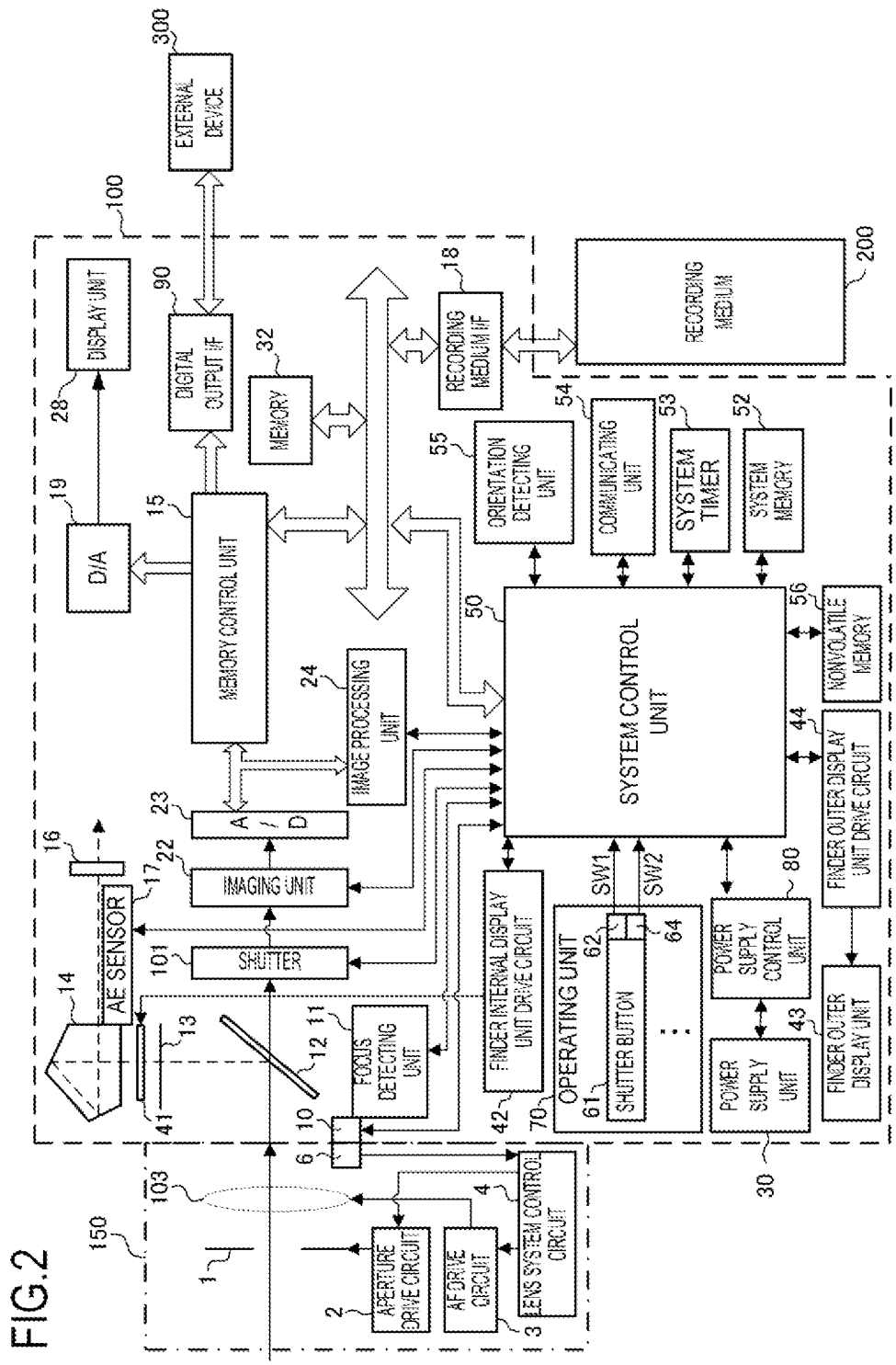
FIG. 2 is a block diagram showing a configuration of the digital camera according to the first embodiment.

FIG. 2 is a block diagram showing a configuration example of the digital camera 100.

The lens unit 150 is a lens unit mounted with a replaceable photographing lens. While a lens 103 is usually configured by a plurality of lenses, in FIG. 2, the lens 103 is shown with only one lens in a simplified manner. A communication terminal 6 is a communication terminal used by the lens unit 150 to communicate with the digital camera 100, and the communication terminal 10 is a communication terminal used by the digital camera 100 to communicate with the lens unit 150. The lens unit 150 communicates with the system control unit 50 via the communication terminals 6 and 10. In addition, the lens unit 150 controls an aperture 1 via an aperture drive circuit 2 using an internal lens system control circuit 4. Furthermore, the lens unit 150 performs focusing by displacing a position of the lens 103 via an AF drive circuit 3 using the lens system control circuit 4.

An AE (automatic exposure) sensor 17 measures brightness of a subject (subject light) through the lens unit 150.

A focus detecting unit 11 outputs information on a defocus amount to the system control unit 50. The system control unit 50 controls the lens unit 150 based on the defocus amount information to perform phase difference AF.

The quick return mirror 12 (hereinafter, the mirror 12) is raised and lowered by an actuator (not illustrated) under instructions from the system control unit 50 during exposure, live view photography, moving image photography, and the like. The mirror 12 is a mirror for switching a luminous flux incident from the lens 103 between a side of the finder 16 and a side of an imaging unit 22. While the mirror 12 is normally disposed so as to guide (reflect) the luminous flux to the finder 16 (mirror down), when photography and live view display are performed, the mirror 12 is flipped upward so as to guide the luminous flux to the imaging unit 22 and is retracted from inside the luminous flux (mirror up). In addition, the mirror 12 is configured as a half mirror so that light can be partially transmitted through a central portion thereof, and the mirror 12 causes a part of the luminous flux to be transmitted and incident to the focus detecting unit 11 for performing focus detection.

By observing the focusing screen 13 via a pentaprism 14 and the finder 16, a photographer can check a focus and a composition of an optical image of the subject obtained through the lens unit 150.

A shutter 101 is a focal plane shutter capable of freely controlling an exposure time of the imaging unit 22 under the control of the system control unit 50.

The imaging unit 22 is an imaging element constituted by a device such as a CCD or a CMOS which converts an optical image into an electrical signal. An A/D converter 23 converts an analog signal output from the imaging unit 22 into a digital signal.

An image processing unit 24 performs prescribed processing (pixel interpolation, resizing processing such as reduction, color conversion processing, and the like) on data from the A/D converter 23 or data from a memory control unit 15. In addition, the image processing unit 24 performs prescribed arithmetic processing using image data of a sensed image, and the system control unit 50 performs exposure control and ranging control based on a computation result obtained by the image processing unit 24. Accordingly, processing such as AF (automatic focusing) processing, AE processing, and EF (preliminary light emission before flash) processing in a TTL (through-the-lens) system are performed. The image processing unit 24 further performs prescribed arithmetic processing using image data of a sensed image and performs AWB (automatic white balance) processing in the TTL system based on an obtained computation result.

Output data from the A/D converter 23 is written into a memory 32 via the image processing unit 24 and the memory control unit 15 or directly written into the memory 32 via the memory control unit 15. The memory 32 stores image data obtained by the imaging unit 22 and converted into digital data by the A/D converter 23 and image data to be displayed on the display unit 28. The memory 32 has sufficient storage capacity for storing a prescribed number of still images and a prescribed time's worth of moving images and audio.

In addition, the memory 32 also doubles as a memory (a video memory) for image display. A D/A converter 19 converts data for image display stored in the memory 32 into an analog signal and supplies the analog signal to the display unit 28. In this manner, image data for display having been written into the memory 32 is displayed by the display unit 28 via the D/A converter 19. The display unit 28 performs display in accordance with an analog signal from the D/A converter 19 on a display such as an LCD. An electronic view finder function can be realized and a live image display (a live view display) can be performed by subjecting digital signals having been subjected to A/D conversion by the A/D converter 23 to D/A conversion by the D/A converter 19 and saved in the memory 32, and sequentially transmitting the signals having been subjected to D/A conversion to the display unit 28 and displaying the signals. Hereinafter, an image displayed by a live view display will be referred to as an "LV image".

A finder internal display unit 41 displays, via a finder internal display unit drive circuit 42, a frame (an AF frame) indicating a ranging point on which automatic focusing is currently being performed, icons representing a setting state of the camera, and the like.

The finder outer display unit 43 displays, via a finder outer display unit driving circuit 44, various setting values of the digital camera 100 including a shutter speed and an aperture.

A digital output I/F 90 supplies data for image display stored in the memory 32 to an external device 300 without modifying the form of a digital signal. In this manner, image data for display having been written into the memory 32 is displayed by the external device 300.

A nonvolatile memory 56 is an electrically erasable and recordable memory and, for example, an EEPROM is used. Constants, a program, and the like for operations of the system control unit 50 are stored in the nonvolatile memory 56. In this case, the program refers to a program for executing the various flow charts described later in the present embodiment.

The system control unit 50 is a control unit constituted by at least one processor or one circuit and controls the entire digital camera 100. The system control unit 50 realizes the respective processing steps of the present embodiment (to be described later) by executing the program recorded in the nonvolatile memory 56 described earlier. A system memory 52 is, for example, a RAM, and the system control unit 50 deploys constants and variables for the operations of the system control unit 50, the program read from the nonvolatile memory 56, and the like onto the system memory 52. In addition, the system control unit 50 also performs display control by controlling the memory 32, the D/A converter 19, the display unit 28, and the like.

A system timer 53 is a time-measuring unit for measuring time used in various controls and measuring time according to an internal clock.

A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter on the basis of the detection results and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

A communicating unit 54 transmits and receives video signals and audio signals to and from an external device connected wirelessly or by a wired cable. The communicating unit 54 is also capable of connecting to a wireless LAN (Local Area Network) or the Internet. In addition, the communicating unit 54 is also capable of communicating with the external device via Bluetooth (registered trademark) or Bluetooth Low Energy. The communicating unit 54 is capable of transmitting images (including LV images) sensed by the imaging unit 22 and images recorded on the recording medium 200 and receiving image data and various other types of information from the external device.

An orientation detecting unit 55 detects an orientation of the digital camera 100 relative to a direction of gravitational force. Based on the orientation detected by the orientation detecting unit 55, a determination can be made as to whether an image photographed by the imaging unit 22 is an image photographed while holding the digital camera 100 horizontally or an image photographed while holding the digital camera 100 vertically. The system control unit 50 can add orientation information in accordance with the orientation detected by the orientation detecting unit 55 to an image file of an image (a sensed image) having been sensed by the imaging unit 22 and record a rotated version of the image or the like. An acceleration sensor, a gyro sensor, or the like can be used as the orientation detecting unit 55. A motion (panned, tilted, uplifted, whether stationary or not, and the like) of the digital camera 100 can also be detected using the acceleration sensor or the gyro sensor that constitutes the orientation detecting unit 55.

An operating unit 70 is used to input various operation instructions to the system control unit 50. The operating unit 70 includes various operating members as an input unit for accepting operations (user operations) from the user. For example, the operating unit 70 includes a push button, a rotating dial, a touch sensor, and the like. Specifically, the operating unit 70 includes the mode changeover switch 60, the shutter button 61, the main electronic dial 71, the power supply switch 72, the sub electronic dial 73, and the four-way key 74. In addition, the operating unit 70 includes the SET button 75, the LV button 76, the enlargement button 77, the reduction button 78, and the playback button 79. Furthermore, the operating unit 70 includes an AF-ON button 70*b*, a quick setting button 70*c*, an active frame switching button 70*d*, a menu button 70*e*, function buttons 70*f*, and an info button 70*g*. By selecting and operating various function icons displayed on the display unit 28 or the external device 300, each operating member of the operating unit 70 is appropriately assigned a function for each scene and acts as one of various function buttons. Examples of the function buttons include an end button, a return button, an image feed button, a jump button, a narrow-down button, and an attribute change button. For example, when the menu button 70*e* is depressed, a menu screen enabling various settings to be configured is displayed on the display unit 28 or the external device 300. The user can intuitively configure various settings using the menu screen displayed on the display unit 28 or the external device 300 together with the four-way key 74 and the SET button 75.

A mode changeover switch 60 is an operating member for switching between various modes. The mode changeover switch 60 switches an operating mode of the system control unit 50 to any of a still image recording mode, a moving image photography mode, a playback mode, and the like. Modes included in the still image recording mode are an automatic photography mode, an automatic scene determination mode, a manual mode, an aperture priority mode (Av mode), a shutter speed priority mode (Tv mode), and a program AE mode. Other available modes include various scene modes that constitute photography settings for different photography scenes as well as custom modes. Using the mode changeover switch 60, the user can directly switch to any of these modes. Alternatively, after temporarily switching to a photography mode list screen using the mode changeover switch 60, another operating member may be used to selectively switch to any of a plurality of displayed modes. In a similar manner, the moving image photography mode may also include a plurality of modes.

The shutter button 61 is an operating member for issuing a photography instruction. The shutter button 61 includes a first shutter switch 62 and a second shutter switch 64. The first shutter switch 62 is turned on midway through an operation of the shutter button 61 by a so-called half-press (photography preparation instruction) and generates a first shutter switch signal SW1. In accordance with the first shutter switch signal SW1, the system control unit 50 starts an operation of AF processing, AE processing, AWB processing, EF processing, and the like. The second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of photography processing from reading a signal from the imaging unit 22 to writing image data into the recording medium 200.

The main electronic dial 71 is a rotating operating member and, by turning the main electronic dial 71, setting values such as a shutter speed and an aperture can be changed. The power supply switch 72 is an operating member for switching power of the digital camera 100 on and off. The sub electronic dial 73 is a rotating operating member and, by turning the sub electronic dial 73, operations such as moving a selection frame and feeding an image can be performed.

The four-way key 74 is configured such that upper, lower, left, and right portions are respectively depressible. The four-way key 74 enables processing corresponding to a depressed portion of the four-way key 74 to be performed. The SET button 75 is a push button mainly used to determine a selected item.

The LV button 76 is a button for switching a live view (hereinafter, an LV) on and off in the still image photography mode. In the moving image photography mode, the LV button 76 is used to issue instructions to start and stop moving image photography (recording). The enlargement button 77 is an operating button for switching an enlargement mode on and off during a live view display in the photography mode and changing enlargement rates in the enlargement mode. In the playback mode, the enlargement button 77 functions as an enlargement button for enlarging a playback image or increasing an enlargement rate of the playback image. The reduction button 78 is a button for reducing the enlargement rate of an enlarged playback image and reducing a displayed image. The playback button 79 is an operating button for switching between the photography mode and the playback mode. By depressing the playback button 79 in the photography mode, a transition can be made to the playback mode and a latest image among images recorded in the recording medium 200 can be displayed on the display unit 28.

The AF-ON button 70*b* is a button for instructing execution of AF. A depressing direction of the AF-ON button 70*b* is parallel to a direction (an optical axis) of subject light incident to the imaging unit 22 from the lens 103.

The quick setting button 70*c* (hereinafter, the Q button 70*c*) is a button for displaying a quick setting menu that is a list of configurable setting items in each operating mode. For example, when depressed while standing by for photography in live view photography, a list of setting items such as an electronic front curtain shutter, brightness of a monitor, WB of the LV screen. Split-Screen Display Zoom, and soundless photography are displayed in a single row being superimposed on an LV. By selecting any option in the displayed quick setting menu using the four-way key 74 and depressing the SET button 75, the user can change settings or make a transition to an operating mode with respect to the selected setting item.

The active frame switching button 70*d* is a button for switching between active zoomed positions (frames) of the two zoomed locations in Split-Screen Display Zoom processing. In addition, a different function is assigned depending on operating modes, and when depressed in the playback mode, a protect attribute can be imparted to an image being displayed.

The menu button 70*e* is a button for causing the display unit 28 or the external device 300 to display a menu screen that enables various settings to be configured.

The function buttons 70*f* are buttons that enable a different function to be assigned to each button. Each of the function buttons 70*f* is arranged at a position where the button can be operated by a finger (the middle finger, the ring finger, or the little finger) of the right hand holding the grip portion 91, and a depressing direction is parallel to the direction (the optical axis) of subject light incident to the imaging unit 22 from the lens 103.

The info button 70*g* is a button for switching among various information displays and the like.

A touch panel 70*a* detects contact with respect to the touch panel 70*a*. The touch panel 70*a* and the display unit 28 can be integrally constructed. For example, the touch panel 70*a* is configured such that transmittance of light does not obstruct display by the display unit 28 and is mounted to an upper layer of a display surface of the display unit 28. Subsequently, input coordinates on the touch panel 70*a* and display coordinates on the display unit 28 are associated with each other. Accordingly, a GUI (graphical user interface) can be provided which enables the user to feel as if a screen displayed on the display unit 28 can be directly manipulated. The system control unit 50 is capable of detecting the following operations with respect to the touch panel 70*a* or the following states of the touch panel 70*a*.

A state where a finger or a stylus previously not in touch with the touch panel 70*a* newly touches the touch panel 70*a* or, in other words, a start of a touch (hereinafter referred to as a touch-down)

A state where the touch panel 70*a* is being touched by a finger or a stylus (hereinafter referred to as a touch-on)

A state where a finger or a stylus is moving while in touch with the touch panel 70*a* (hereinafter referred to as a touch-move)

A state where a finger or a stylus previously in touch with the touch panel 70*a* separates from the touch panel 70*a* or, in other words, an end of a touch (hereinafter referred to as a touch-up)

A state where nothing is touching the touch panel 70*a* (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off is detected upon detection of a touch-up of all of the fingers or a stylus previously in touch.

The system control unit 50 is notified of the operations and states described above as well as a position coordinate where a finger or a stylus touches the touch panel 70*a* through an internal bus. In addition, based on the notified information, the system control unit 50 determines what kind of operation (touch operation) has been performed on the touch panel 70*a*. With respect to a touch-move, a movement direction of a finger or a stylus moving on the touch panel 70*a* can be determined for each of a vertical component and a horizontal component on the touch panel 70*a* on the basis of a change in the position coordinate. When a touch-move of at least a prescribed distance is detected, it is determined that a slide operation has been performed. An operation involving quickly moving a finger on the touch panel 70*a* for a certain distance while keeping the finger in touch with the touch panel 70*a* and then releasing the finger is referred to as a flick. In other words, a flick is an operation in which a finger quickly traces the touch panel 70*a* as though flicking on the touch panel 70*a*. A determination that a flick has been performed can be made (a determination that a flick has occurred following a slide operation can be made) when a detection of a touch-move of at least a prescribed distance at at least a prescribed speed is followed by a detection of a touch-up. Furthermore, a touch operation involving touching a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). As the touch panel 70*a*, a touch panel adopting any of various systems including a resistive film system, a capacitance system a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

In addition, besides an imaging apparatus main body, the present invention can also be applied to a control apparatus (a display control apparatus) which remotely controls an imaging apparatus (including a network camera) by communicating with the imaging apparatus via wired or wireless communication. Examples of an apparatus which remotely controls an imaging apparatus include a smartphone, a tablet PC, and a desktop PC. An imaging apparatus can be remotely controlled by notifying the imaging apparatus of commands for performing various operations and configuring settings from a control apparatus based on operations and processing performed by the control apparatus. Furthermore, the control apparatus may be configured to receive a live view image photographed by the imaging apparatus via wired or wireless communication and to display the live view image.

Moreover, while an example in which the present invention is applied to a digital camera has been described in the embodiment presented above, the present invention is not limited to this example. Specifically, the present invention can be applied to any apparatus including a display unit such as a PDA, a mobile phone terminal, a mobile image viewer, a printer apparatus equipped with a display, a digital photo frame, a music player, a game device, and an electronic book reader.

Figure 3:
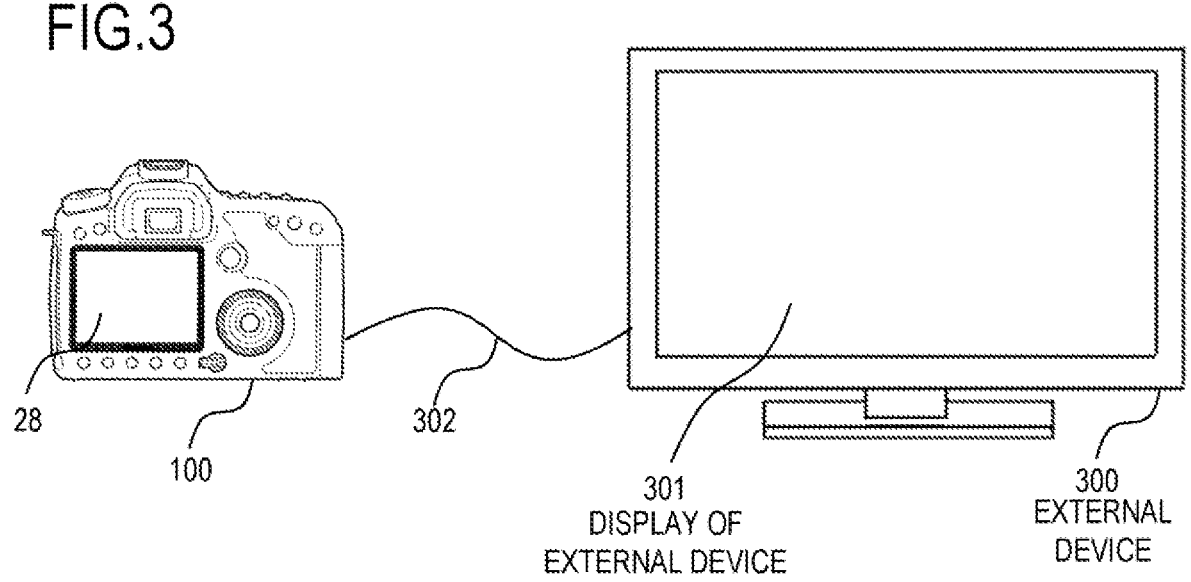
FIG. 3 is a diagram showing an external device connection according to the first embodiment.

FIG. 3 is a diagram showing the digital camera 100 and the external device 300. When the digital camera 100 and the external device 300 are connected by a connecting cable 302, the display unit 28 of the digital camera 100 turns off (no display) and a screen having been displayed on the display unit 28 is displayed on a display 301 of the external device 300.

<LV Photography Mode Processing>

FIG. 4A is a flow chart showing LV photography mode processing performed by the digital camera 100. The processing is realized as the system control unit 50 deploys a program recorded in the nonvolatile memory 56 onto the system memory 52 and executes the program.

In S401, the system control unit 50 determines whether or not an HDR photography mode is set. When the HDR photography mode is set, the system control unit 50 advances to S402, but otherwise (when an SDR photography mode is set) the system control unit 50 advances to S422.

In S402, the system control unit 50 determines whether or not the digital camera 100 is connected to the external device 300. When connected, the system control unit 50 advances to S403, but otherwise the system control unit 50 advances to S404.

In S403, the system control unit 50 performs connection processing between the digital camera 100 and the external device 300. Details of the connection processing will be described later with reference to FIGS. 5A to 5C. In the present embodiment, it is assumed that an HDR connection will be made when the external device supports HDR connection but an SDR connection will be made when the external device does not support HDR connection.

In S404, the system control unit 50 (the image processing unit 24) develops, in an HDR (with an HDR image quality), an image having been sensed by the imaging unit 22 and converted into a digital signal by the A/D converter 23.

In S405, the system control unit 50 determines whether or not the display unit 28 or the external device 300 to display the LV image supports an HDR (supports HDR display). When an HDR is supported, the system control unit 50 advances to S409, but otherwise the system control unit 50 advances to S406.

In S406, the system control unit 50 determines whether a setting of HDR assist display is "assist 1" or "assist 2". When the setting of HDR assist display is "assist 1", the system control unit 50 advances to S407, but when the setting of HDR assist display is "assist 2", the system control unit 50 advances to S408. In this case, HDR assist display refers to a function that enables, when converting an HDR image into an SDR image, the user to confirm gradation properties of HDR image data by converting the HDR image into an SDR image while prioritizing a specific range of the HDR image. In the present embodiment, the setting of HDR assist display can be switched (changed) between the two settings of "assist 1" and "assist 2". "Assist 1" is a high brightness priority setting and "assist 2" is a low brightness priority setting. It should be noted that the settings of HDR assist display can be modified by a user operation. In addition, an HDR image refers to an image of which a dynamic range is wider than a prescribed range. Furthermore, an SDR image refers to an image of which a dynamic range is narrower than the prescribed range.

In S407, the system control unit 50 performs SDR conversion processing (processing for conversion from an HDR to an SDR) in accordance with the setting of "assist 1" with respect to the HDR LV image developed in S404 and displays the LV image in an SDR (with an SDR image quality) on the display unit 28 or the external device 300. It is assumed that the system control unit 50 is to also perform resizing processing to a size suitable for the display unit 28 or the external device 300.

In S408, the system control unit 50 performs SDR conversion processing (processing for conversion from an HDR to an SDR) in accordance with the setting of "assist 2" with respect to the HDR LV image developed in S404 and displays the LV image in an SDR on the display unit 28 or the external device 300. It is assumed that the system control unit 50 is to also perform resizing processing to a size suitable for the display unit 28 or the external device 300 in a similar manner to S407.

In S409, the system control unit 50 displays the HDR LV image developed in S404 on the display unit 28 or the external device 300 without modifying the HDR. It is assumed that the system control unit 50 is to perform resizing processing to a size suitable for the display unit 28 or the external device 300 in a similar manner to S407.

In S410, the system control unit 50 determines whether or not the menu button 70e has been depressed. When the menu button 70e has been depressed, the system control unit 50 advances to S411, but otherwise the system control unit 50 advances to S412.

In S411, the system control unit 50 performs photography menu processing and advances to S412. Details of the photography menu processing will be described later with reference to FIGS. 6A and 6B.

In S412, the system control unit 50 determines whether or not the info button 70g has been depressed. When the info button 70g has been depressed, the system control unit 50 advances to S413, but otherwise the system control unit 50 advances to S414.

In S413, the system control unit 50 switches displays of photography information. Examples of the photography information include a histogram and a highlighted warning.

In S414, the system control unit 50 determines whether or not the shutter button 61 is in a half-pressed (SW1) state. When the shutter button 61 is in a half-pressed state, the system control unit 50 advances to S415, but otherwise the system control unit 50 advances to S420.

In S415, the system control unit 50 performs AF processing/AE processing described earlier.

In S416, the system control unit 50 determines whether or not the shutter button 61 is in a fully-pressed (SW2) state. When the shutter button 61 is in a fully-pressed state, the system control unit 50 advances to S418, but otherwise the system control unit 50 advances to S417.

In S417, the system control unit 50 determines whether or not the half-pressed (SW1) state of the shutter button 61 is maintained. When maintained, the system control unit 50 advances to S415, but otherwise the system control unit 50 advances to S420.

In S418, the system control unit 50 performs HDR photography processing. Details of the HDR photography processing will be described later with reference to FIGS. 7A to 7H.

In S419, the system control unit 50 performs quick review display processing. Details of the quick review display processing will be described later with reference to FIG. 4B.

In S420, the system control unit 50 determines whether or not the LV button 76 (a moving image button) has been depressed. When the LV button 76 has been depressed, the system control unit 50 advances to S421, but otherwise the system control unit 50 advances to S438.

In S421, the system control unit 50 subjects the image developed in an HDR in S404 to HEVC compression and records the image as an HDR moving image file.

In S422, the system control unit 50 determines whether or not the digital camera 100 is connected to the external device 300. When connected, the system control unit 50 advances to S423, but otherwise the system control unit 50 advances to S424.

In S423, the system control unit 50 performs connection processing between the digital camera 100 and the external device 300. Details of the connection processing will be described later with reference to FIGS. 5A to 5C. In this case, since the photography mode is the SDR photography mode, the digital camera 100 and the external device 300 are to be connected by an SDR connection.

In S424, the system control unit 50 (the image processing unit 24) develops, in an SDR (with an SDR image quality), an image having been sensed by the imaging unit 22 and converted into a digital signal by the A/D converter 23.

In S425, the system control unit 50 displays the SDR LV image developed in S424 on the display unit 28 or the external device 300 without modifying the SDR. It is assumed that the system control unit 50 is to perform resizing processing to a size suitable for the display unit 28 or the external device 300 in a similar manner to S407.

Since processing steps of S426 to S433 are similar to the processing steps of S410 to S417 described earlier, descriptions thereof will be omitted.

In S434, the system control unit 50 performs SDR photography processing. The SDR photography processing is performed in a similar manner to HDR photography processing to be described later with reference to FIGS. 7A to 7H. However, in the case of SDR photography processing, in S710, the system control unit 50 compresses an SDR image having been subjected to SDR development instead of HDR development in S707 as a main image.

In S435, the system control unit 50 performs quick review display processing. Details of the quick review display processing will be described later with reference to FIG. 4B.

In S436, the system control unit 50 determines whether or not the LV button 76 has been depressed. When the LV button 76 has been depressed, the system control unit 50 advances to S437, but otherwise the system control unit 50 advances to S438.

In S437, the system control unit 50 subjects the image developed in an SDR in S424 to H264 compression and records the image as an SDR moving image file.

In S438, the system control unit 50 determines whether or not the playback button 79 has been depressed. When the playback button 79 has been depressed, the system control unit 50 advances to S439, but otherwise the system control unit 50 advances to S440.

In S439, the system control unit 50 performs playback mode processing. Details of the playback mode processing will be described later with reference to FIGS. 9A to 9H and FIGS. 10A and 10B.

In S440, a determination is made as to whether or not the LV photography mode processing is to be ended. When the LV photography mode processing is to be ended, the system control unit 50 ends the present processing flow, but otherwise the system control unit 50 advances to S401.

<<Quick Review Display Processing (S419, S435)>>

Figure 4B:
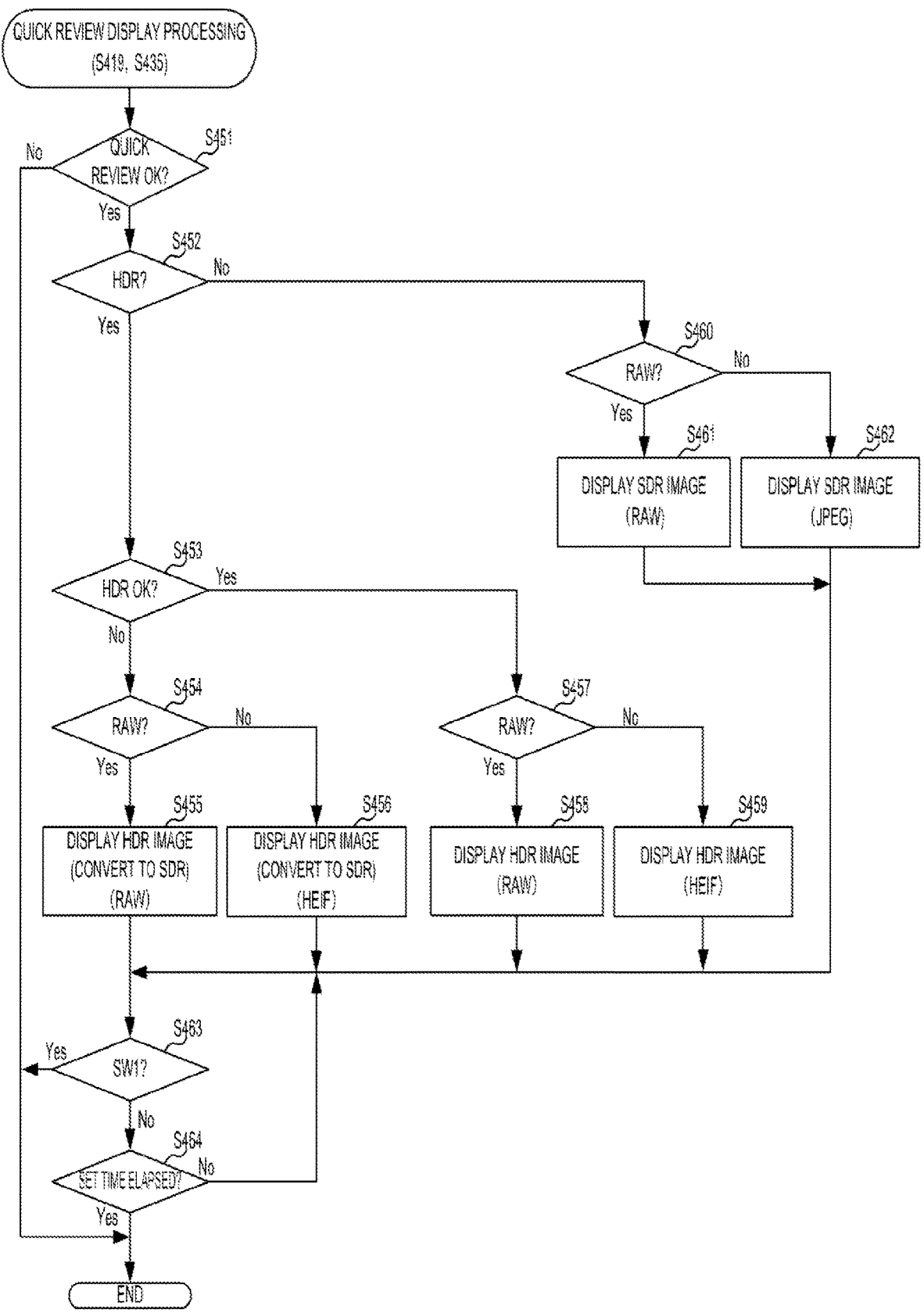
FIG. 4B is a flow chart showing quick review display processing according to the first embodiment.

FIG. 4B is a flow chart showing quick review display processing (S419, S435) according to the present embodiment. The processing is realized as the system control unit 50 deploys a program recorded in the nonvolatile memory 56 onto the system memory 52 and executes the program.

In S451, the system control unit 50 determines whether or not quick review display is set to "available". When the quick review display is set to "available", the system control unit 50 advances to S452, but otherwise (when quick review display is set to "not available") the system control unit 50 ends the present processing flow.

In S452, the system control unit 50 determines whether or not photography has been performed in the HDR photography mode. When photography has been performed in the HDR photography mode, the system control unit 50 advances to S453, but otherwise (when photography has been performed in the SDR photography mode) the system control unit 50 advances to S460.

In S453, the system control unit 50 determines whether or not the display unit 28 or the external device 300 to perform quick review display supports an HDR. When an HDR is supported, the system control unit 50 advances to S457, but otherwise the system control unit 50 advances to S454.

In S454, the system control unit 50 determines whether or not photography has been performed by RAW still image photography. In the case of RAW still image photography, the system control unit 50 advances to S455, but otherwise (in the case of HEIF still image photography) the system control unit 50 advances to S456.

In S455, the system control unit 50 converts the HDR image for display in a RAW image file into an SDR image (conversion from an HDR to an SDR) and displays the converted image on the display unit 28 or the external device 300 in an SDR. The system control unit 50 may perform resizing processing to a size suitable for the display unit 28 or the external device 300.

In S456, the system control unit 50 converts the HDR image for display in an HEIF image file into an SDR image (conversion from an HDR to an SDR) and displays the converted image on the display unit 28 or the external device 300 in an SDR. The system control unit 50 may perform resizing processing to a size suitable for the display unit 28 or the external device 300 in a similar manner to S455.

In S457, the system control unit 50 determines whether or not photography has been performed by RAW still image photography in a similar manner to S454. In the case of RAW still image photography, the system control unit 50 advances to S458, but otherwise (in the case of HEIF still image photography) the system control unit 50 advances to S459.

In S458, the system control unit 50 displays the HDR image for display in a RAW image file on the display unit 28 or the external device 300 in an HDR. The system control unit 50 may perform resizing processing to a size suitable for the display unit 28 or the external device 300 in a similar manner to S455.

In S459, the system control unit 50 displays the HDR image for display in an HEIF image file on the display unit 28 or the external device 300 in an HDR. The system control unit 50 may perform resizing processing to a size suitable for the display unit 28 or the external device 300 in a similar manner to S455.

In S460, the system control unit 50 determines whether or not photography has been performed by RAW still image photography. In the case of RAW still image photography, the system control unit 50 advances to S461, but otherwise (in the case of JPEG still image photography) the system control unit 50 advances to S462.

In S461, the system control unit 50 displays the SDR image for display in a RAW image file on the display unit 28 or the external device 300 in an SDR. The system control unit 50 may perform resizing processing to a size suitable for the display unit 28 or the external device 300 in a similar manner to S455.

In S462, the system control unit 50 displays the SDR image for display in a JPEG image file on the display unit 28 or the external device 300 in an SDR. The system control unit 50 may perform resizing processing to a size suitable for the display unit 28 or the external device 300 in a similar manner to S455.

In S463, the system control unit 50 determines whether or not the shutter button 61 has been depressed (half-pressed (SW1)). When the shutter button 61 has been depressed, the system control unit 50 ends the present processing flow, but otherwise the system control unit 50 advances to S464.

In S464, the system control unit 50 determines whether or not the time of quick review display (display by quick review display processing) has reached or exceeded at least a prescribed set time. When the prescribed set time or more has been reached or exceeded, the system control unit 50 ends the present processing flow, but otherwise the system control unit 50 advances to S463. It should be noted that the set time can be configured and changed by the user.

<<Connection Processing (S403, S423)>>

Figure 5A:
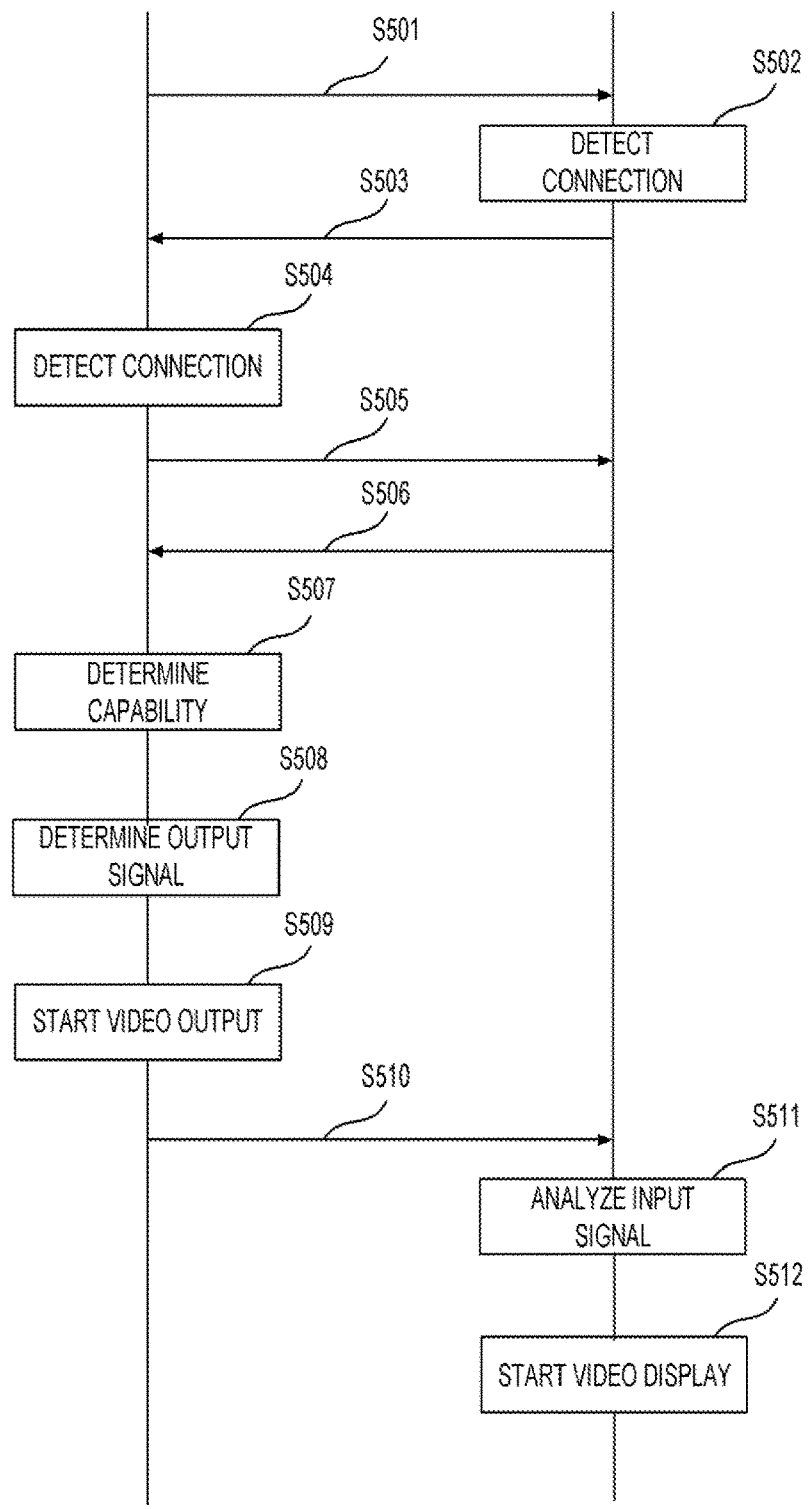

FIG. 5A is a sequence diagram showing connection processing (S403, S423) when the digital camera 100 and the external device 300 are connected to each other. The present embodiment will be described on the assumption that the digital camera 100 and the external device 300 are connected to each other.

In S501, the system control unit 50 controls the digital output I/F 90 and starts transmission of a +5 V signal to the external device 300. The transmitted +5 V signal is transmitted to the external device 300 through a +5 V signal line (not illustrated) of the connecting cable 302. The external device 300 receives the +5 V signal of the connecting cable 302 and advances to S502.

In S502, the external device 300 detects that the digital camera 100 has been connected to the external device 300 via the connecting cable 302 and advances to S503.

In S503, the external device 300 starts transmission of an HPD signal (a Hot Plug Detect signal) to the digital camera 100 via an HPD signal line (not illustrated) of the connecting cable 302. The digital output I/F 90 of the digital camera 100 receives the transmitted HPD signal via the connecting cable 302. Upon receiving the HPD signal, the digital output I/F 90 notifies the system control unit 50 of the reception of the HPD signal and advances to S504.

In S504, the system control unit 50 detects the connection of the external device 300 based on the notification of reception of the HPD signal and advances to S505.

In S505, the system control unit 50 controls the digital output I/F 90 and transmits an EDID (Extended Display Identification Data) request signal from the connecting cable 302. The transmitted EDID request signal is transmitted to the external device 300 through an EDID signal line (not illustrated) of the connecting cable 302. The external device 300 receives the EDID request signal and advances to S506.

In S506, the external device 300 transmits an EDID from the EDID signal line (not illustrated) of the connecting cable 302. The digital output I/F 90 of the digital camera 100 receives the transmitted EDID via the connecting cable 302. Upon receiving the EDID, the digital output I/F 90 notifies the system control unit 50 of the reception of the EDID and advances to S507.

In S507, the system control unit 50 issues an instruction to the digital output I/F 90 to copy the EDID received in S506 to the memory 32. After the copy is completed, the system control unit 50 analyzes the EDID expanded on the memory 32, determines a video signal that can be accepted by the external device 300 (a capability of the external device 300), and advances to S508.

In S508, the system control unit 50 determines whether to output an HDR signal or an SDR signal. In the present embodiment, the system control unit 50 outputs an HDR signal to the external device 300 in a case where the setting of the digital camera 100 is HDR-enabled and the external device 300 supports an HDR, but otherwise outputs an SDR signal. Examples of a case where the external device 300 supports an HDR include a case where an HDR signal is included in a video signal that can be accepted by the external device 300 as determined in S507.

In S509, the system control unit 50 issues an instruction to the digital output I/F 90 to start transmission of the signal determined in S508. The digital output I/F 90 having received the instruction to start transmission starts transmission of a video signal (an SDR signal or an HDR signal) via the connecting cable 302 and advances to S510.

In S510, the system control unit 50 outputs the video signal to the external device 300 via a TMDS (Transition Minimized Differential Signaling) signal line (not illustrated) of the connecting cable 302. The external device 300 receives the video signal via the TMDS signal line (not illustrated) of the connecting cable 302 and advances to S511.

In S511, the external device 300 analyses the video signal received in S510, switches drive of the display 301 to a setting that enables the video signal to be displayed, and advances to S512.

In S512, the external device 300 displays the video signal received in S510 on the display 301 of the external device 300.

FIGS. 5B and 5C are diagrams showing processing when video output is switched from an SDR image to an HDR image (or when video output is switched from an HDR image to an SDR image) in a state where the digital camera 100 and the external device 300 are connected to each other and a video is being displayed on the external device 300.

FIG. 5B is a sequence diagram showing processing for switching a video output from the digital camera 100 to the external device 300 from an SDR image to an HDR image. In this case, it is assumed that the connection between the digital camera 100 and the external device 300 has been completed.

In S521, the system control unit 50 issues an instruction to the digital output IF 90 to transmit an SDR video signal (an SDR signal) and advances to S522.

In S522, the system control unit 50 outputs the SDR video signal to the external device 300 via the TMDS signal line (not illustrated) of the connecting cable 302. The external device 300 receives the SDR video signal via the TMDS signal line (not illustrated) of the connecting cable 302 and advances to S523.

In S523, the external device 300 displays the SDR video signal received in S522 on the display 301 of the external device 300. When the digital camera 100 is outputting an SDR video signal, an SDR image is displayed on the display 301 of the external device 300 by repeating the processing steps of S521 to S523. When the digital camera 100 switches video output to the external device 300 from an SDR image to an HDR image, processing steps of S524 and thereafter are executed.

In S524, the system control unit 50 controls the digital output I/F 90 and issues an instruction to suspend output of the SDR video signal and advances to S525.

In S525, the system control unit 50 issues a notification to the effect that transmission (output) of the video signal is to be suspended via the TMDS signal line (not illustrated) of the connecting cable 302. The external device 300 receives the notification to the effect that transmission of the SDR video signal is to be suspended via the TMDS signal line (not illustrated) of the connecting cable 302 and advances to S526.

In S526, since reception of the video from the digital camera 100 has been suspended, the external device 300 suspends display of the video on the display 301 of the external device 300 and advances to S527.

In S527, the system control unit 50 issues an instruction to the digital output IF 90 to transmit an HDR video signal and advances to S528.

In S528, the system control unit 50 outputs the HDR video signal via the TMDS signal line (not illustrated) of the connecting cable 302. The external device 300 receives the HDR video signal via the TMDS signal line (not illustrated) of the connecting cable 302 and advances to S529.

In S529, the external device 300 analyses the video signal received in S528, switches drive of the display 301 to a setting for displaying an HDR video signal, and advances to S530.

In S530, the external device 300 displays the HDR video signal received in S528 on the display 301 of the external device 300. At this point, since processing times of S529 to S530 differ depending on performance of the external device 300, it may take around 1 second to 5 seconds until the video is displayed.

FIG. 5C is a sequence diagram showing processing for switching a video output from the digital camera 100 to the external device 300 from an HDR image to an SDR image. In this case, it is assumed that the connection between the digital camera 100 and the external device 300 has been completed.

In S541, the system control unit 50 issues an instruction to the digital output I/F 90 to transmit an HDR video signal (an HDR signal) and advances to S542.

In S542, the system control unit 50 outputs the HDR video signal to the external device 300 via the TMDS signal line (not illustrated) of the connecting cable 302. The external device 300 receives the HDR video signal via the TMDS signal line (not illustrated) of the connecting cable 302 and advances to S543.

In S543, the external device 300 displays the HDR video signal received in S542 on the display 301 of the external device 300. When the digital camera 100 is outputting an HDR video signal, an HDR image is displayed on the display 301 of the external device 300 by repeating the processing steps of S541 to S543. When the digital camera 100 switches video output to the external device 300 from an HDR image to an SDR image, processing steps of S544 and thereafter are executed.

In S544, the system control unit 50 issues an instruction to the digital output I/F 90 to suspend output of the HDR video signal and advances to S545.

In S545, the system control unit 50 issues a notification to the effect that transmission (output) of the video signal is to be suspended via the TMDS signal line (not illustrated) of the connecting cable 302. The external device 300 receives the notification to the effect that transmission of the HDR video signal is to be suspended via the TMDS signal line (not illustrated) of the connecting cable 302 and advances to S546.

In S546, since reception of the video from the digital camera 10 has been suspended, the external device 300 suspends display of the video on the display 301 of the external device 300 and advances to S547.

In S547, the system control unit 50 issues an instruction to the digital output I/F 90 to transmit an SDR video signal and advances to S548.

In S548, the digital camera 100 outputs the SDR video signal via the TMDS signal line (not illustrated) of the connecting cable 302. The external device 300 receives the SDR video signal via the TMDS signal line (not illustrated) of the connecting cable 302 and advances to S549.

In S549, the external device 300 analyses the video signal received in S548, switches drive of the display 301 to a setting for displaying an SDR video signal, and advances to S550.

In S550, the external device 300 displays the SDR video signal received in S548 on the display 301 of the external device 300. At this point, since processing times of S549 to S550 differ depending on performance of the external device 300, it may take around 1 second to 5 seconds until the video is displayed.

<<Photography Menu Processing (S411, S427)>>

Figure 6A:
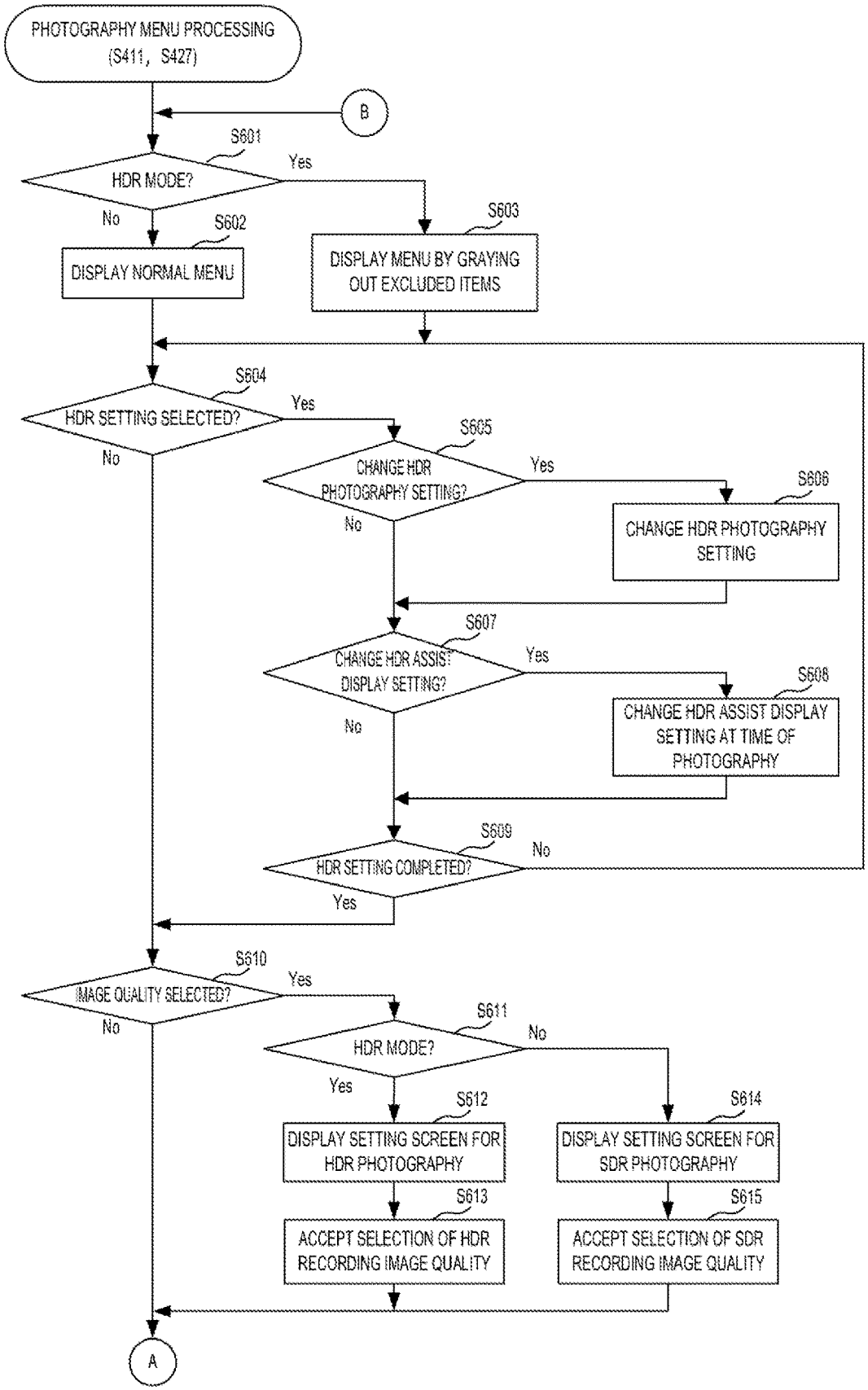
FIG. 6A is a flow chart showing photography menu processing according to the first embodiment.
Figure 6B:
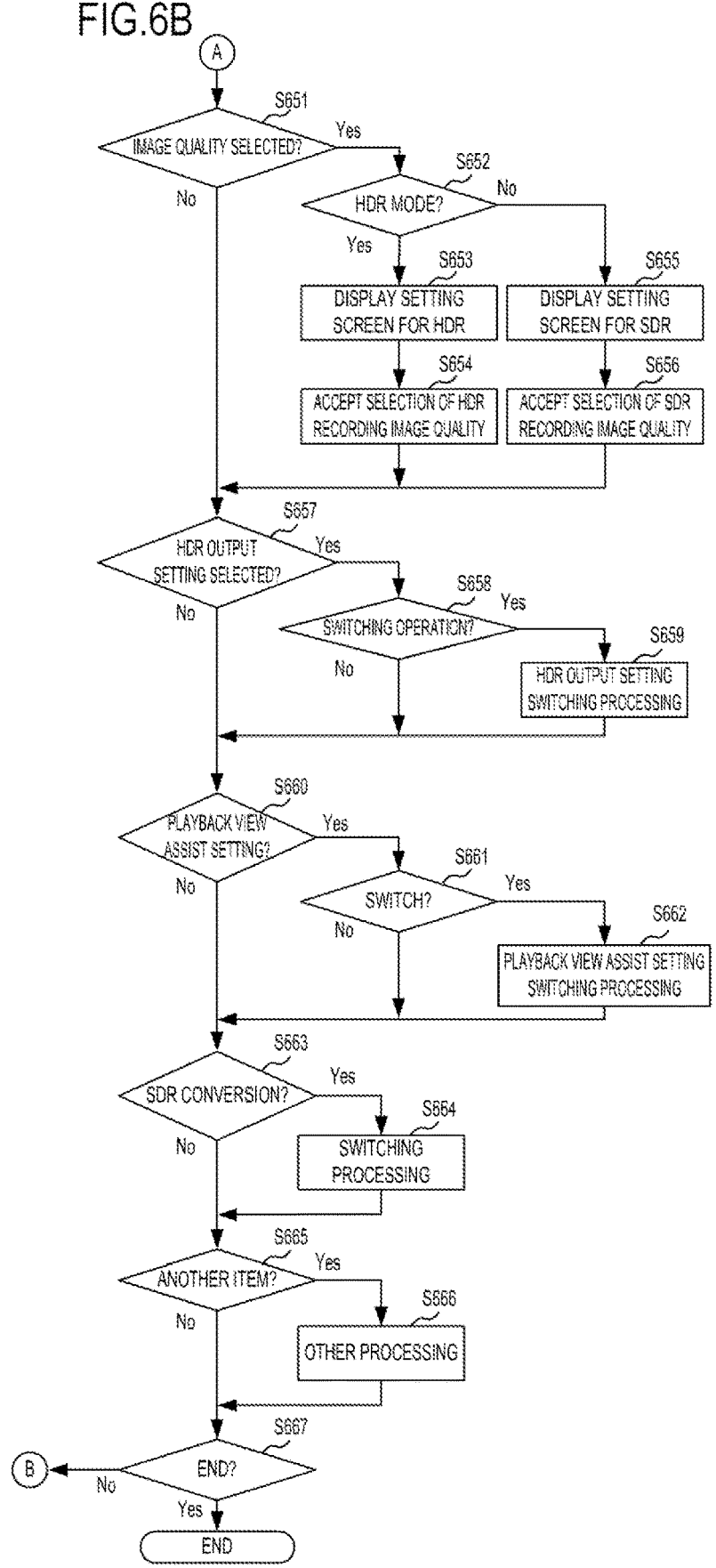
FIG. 6B is a flow chart showing photography menu processing according to the first embodiment.

FIGS. 6A and 6B are flow charts showing details of photography menu processing according to the present embodiment. The processing is realized as the system control unit 50 deploys a program recorded in the nonvolatile memory 56 onto the system memory 52 and executes the program.

In S601, the system control unit 50 determines whether or not the HDR photography mode is set. When the HDR photography mode is set, the system control unit 50 advances to S603, but otherwise (when the SDR photography mode is set) the system control unit 50 advances to S602.

In S602, the system control unit 50 displays a menu to be used during normal SDR photography. In S603, the system control unit 50 displays a menu by changing functions not to be concomitantly used during HDR photography to a disabled state (grayed out).

In S604, the system control unit 50 determines whether or not a setting item related to HDR photography has been selected by the user. When a setting item related to HDR photography has been selected by the user, the system control unit 50 advances to S605, but otherwise the system control unit 50 advances to S610.

In S605, the system control unit 50 determines whether or not a setting related to whether or not HDR photography is to be performed has been switched to "enabled" by the user. When the setting has been switched to "enabled" by the user, the system control unit 50 advances to S606, but otherwise the system control unit 50 advances to S607.

In S606, the system control unit 50 changes the setting related to whether or not HDR photography is to be performed to "enabled" and records a setting value in the system memory 52.

In S607, the system control unit 50 determines whether or not a setting of HDR assist display has been changed by the user. When the setting has been changed by the user, the system control unit 50 advances to S608, but otherwise the system control unit 50 advances to S609. When the setting related to whether or not HDR photography is to be performed is "disabled", the setting of HDR assist display is desirably unchangeable.

In S608, the system control unit 50 changes the setting of HDR assist display during photography and records a setting value in the system memory 52. At least two setting values (options) may be available as variations when the setting of HDR assist display is "enabled".

In S609, the system control unit 50 determines whether or not an end instruction of HDR setting has been issued by the user. When an end instruction has not been issued, the system control unit 50 advances to S604 but when an end instruction has been issued, the system control unit 50 advances to S610.

In S610, the system control unit 50 determines whether or not a setting item related to still image recording image quality has been selected by the user. When a setting item related to still image recording image quality has been selected by the user, the system control unit 50 advances to S611, but otherwise the system control unit 50 advances to S651 (FIG. 6B).

In S611, the system control unit 50 determines whether or not the HDR photography mode is set. When the HDR photography mode is set, the system control unit 50 advances to S612, but otherwise (when the SDR photography mode is set) the system control unit 50 advances to S614.

In S612, the system control unit 50 displays a setting screen for HDR photography. In S613, the system control unit 50 accepts a recording image quality for HDR photography by a user selection. It is assumed that, as recording image quality for HDR photography, any of "RAW image", "HDR still image file", and "dual image simultaneous output of RAW+HDR still image file" can be selected by the user. In addition, it is assumed that, as an image size, any of "large" that is close to the number of pixels during sensor reading, "middle" that is slightly smaller, "small" that is further smaller, and the like can be selected. Furthermore, it is assumed that, as a compression ratio at which a file size capacity is to be reduced (compressed), any of "high image quality (low compression ratio)", "standard (high compression ratio)", and "low image quality (high compression ratio)" can be selected.

In S614, the system control unit 50 displays a setting screen for SDR photography. In S615, the system control unit 50 accepts a recording image quality for SDR photography by a user selection. It is assumed that pluralities of options are provided for setting recording image quality and the like for SDR photography in a similar manner to that described above.

In S651 (FIG. 6B), the system control unit 50 determines whether or not a setting item related to moving image recording image quality has been selected by the user. When a setting item related to moving image recording image quality has been selected by the user, the system control unit 50 advances to S652, but otherwise the system control unit 50 advances to S657.

In S652, the system control unit 50 determines whether or not the HDR photography mode is set. When the HDR photography mode is set, the system control unit 50 advances to S653, but otherwise (when the SDR photography mode is set) the system control unit 50 advances to S655.

In S653, the system control unit 50 displays a setting screen for HDR photography. In S654, the system control unit 50 accepts a recording image quality for HDR photography by a user selection. It is assumed that, as setting recording image quality for HDR photography, any of "RAW moving image", "RAW moving image+proxy moving image", "HDR moving image file", and "triple image simultaneous output of RAW+proxy moving image+HDR moving image file" can be selected by the user. In addition, it is assumed that, as an image size, any of "8K" "4K", "Full HD", "HD", "VGA", and the like can be selected. Furthermore, it is assumed that, as a compression ratio at which a file size capacity is to be reduced (compressed), any of "high image quality (low compression ratio)" such as ALL-I, "standard" such as IPB, "low image quality (high compression ratio)", and the like can be selected. In addition, a frame rate and a broadcast system (NTSC, PAL, or the like) may be made selectable.

In S655, the system control unit 50 displays a setting screen for SDR photography. In S656, the system control unit 50 accepts a recording image quality for SDR photography by a user selection. It is assumed that pluralities of options are provided for setting recording image quality for SDR photography in a similar manner to HDR photography.

In S657, the system control unit 50 determines whether or not a setting item for HDR output has been selected by the user. When a setting item for HDR output has been selected by the user, the system control unit 50 advances to S658, but otherwise the system control unit 50 advances to S660.

In S658, the system control unit 50 determines whether or not the HDR output setting has been switched to "enabled" by the user. When the setting has been switched to "enabled" by the user, the system control unit 50 advances to S659, but otherwise the system control unit 50 advances to S660.

In S659, the system control unit 50 changes the HDR output setting to "enabled" and records a setting value in the system memory 52.

In S660, the system control unit 50 determines whether or not a setting item for view assist during playback has been selected by the user. When a setting item for view assist during playback has been selected by the user, the system control unit 50 advances to S661, but otherwise the system control unit 50 advances to S663.

In S661, the system control unit 50 determines whether or not the setting of view assist during playback has been switched to "enabled" by the user. When the setting has been switched to "enabled" by the user, the system control unit 50 advances to S662, but otherwise the system control unit 50 advances to S663.

In S662, the system control unit 50 changes the setting of view assist during playback to "enabled" and records a setting value in the system memory 52.

In S663, the system control unit 50 determines whether or not a setting item for SDR conversion during transfer has been selected by the user. When a setting item for SDR conversion during transfer has been selected by the user, the system control unit 50 advances to S664, but otherwise the system control unit 50 advances to S665.

In S664, the system control unit 50 switches the setting of SDR conversion during transfer between "enabled" and "disabled".

In S665, the system control unit 50 determines whether or not another setting item has been selected by the user. When another setting item has been selected by the user, the system control unit 50 advances to S666, but otherwise the system control unit 50 advances to S667. In S666, the system control unit 50 performs processing associated with the other setting item.

In S667, the system control unit 50 determines whether or not an instruction to end photography menu processing has been accepted from the user. When an instruction to end photography menu processing has been accepted, the system control unit 50 ends the present processing flow, but otherwise the system control unit 50 advances to S601.

<<HDR Photography Processing (S418)>>

FIG. 7A is a flow chart showing details of HDR photography processing (S418) according to the present embodiment. An example in which RAW data written into the memory 32 is developed in an HDR by the image processing unit 24 will be described.

An imaging apparatus such as a digital camera or a digital video camera has a white balance function for correcting a tone of a photographed image in accordance with a light source at the time of photography. The white balance function is a function for correcting a difference in tones that change depending on a light source (a natural light source such as fair weather or overcast weather or an artificial light source such as a fluorescent lamp or an incandescent lamp) to make white appear the same regardless of the light source.

In S701, the system control unit 50 acquires RAW data via the memory control unit 15.

In S702, the system control unit 50 performs processing for determining whitish pixels (white search intra-frame determination processing) based on the acquired RAW data.

In S703, the system control unit 50 calculates a white balance coefficient necessary for white balance processing based on a result of S702. Details of processing (calculation processing of the white balance coefficient) of S702 and S703 will be described later using the flow chart shown in FIG. 7B.

In S704 to S706, the system control unit 50 calculates a gradation correction parameter necessary for gradation correction processing. Details of calculation processing of the gradation correction parameter will be described later using the flow chart shown in FIG. 7D.

In S707, the system control unit 50 performs development using the calculated white balance coefficient, the gradation correction parameter, and various parameters for an HDR. As developing parameters, a color matrix, camera OETF curve data, a color adjustment parameter, a noise reduction parameter, a sharpness parameter, or the like may be used. As a color OETF, for example, while reverse characteristics of an EOTF (Electro-Optical Transfer Function) of PQ (Perceptual Quantization) standardized by ST. 2084 are assumed, a camera-side OOTF (Opto-Optical Transfer Function) may be combined. Alternatively, an OETF of HLG (Hybrid Log-Gamma) developed as ARIB STD-B67 may be used.

In S708, the system control unit 50 resizes the image developed in S707, generates an MPF (Multi Pixel Format) image as images for comparison between two screens (images for simplified display), and compresses the MPF image.

In S709, the system control unit 50 further resizes the MPF image generated in S708 to generate a thumbnail image to be used in index display (index playback) or the like and compresses the thumbnail image.

In S710, the system control unit 50 compresses the HDR image developed in S707 as a main image. While there are many conceivable compression methods, for example, compression may be performed by H.265 (ISO/IEC 23008-2 HEVC) in a case of 10-bit YUV422 data.

In S711, the system control unit 50 determines whether or not RAW recording is to be performed based on a user setting (recording image quality setting). When RAW recording is to be performed, the system control unit 50 advances to S712, but otherwise the system control unit 50 advances to S713.

In S712, the system control unit 50 compresses the RAW image and records the compressed RAW image in the recording medium 200 via the recording medium I/F 18. The compressed RAW image is added a header and recorded as a file. While there are several conceivable compression systems, lossless compression that is reversible with no deterioration or lossy compression that is irreversible but enables file sizes to be reduced may be used. In addition, as detection metadata, the header records the processing result of S702, the histogram obtained in S704, and the face detection result obtained in S705. Furthermore, the header also records developing parameters for an HDR such as a white balance coefficient and a gradation correction amount when HDR photography has been set by the user and the MPF image for display having been generated in S708.

Figure 8A:
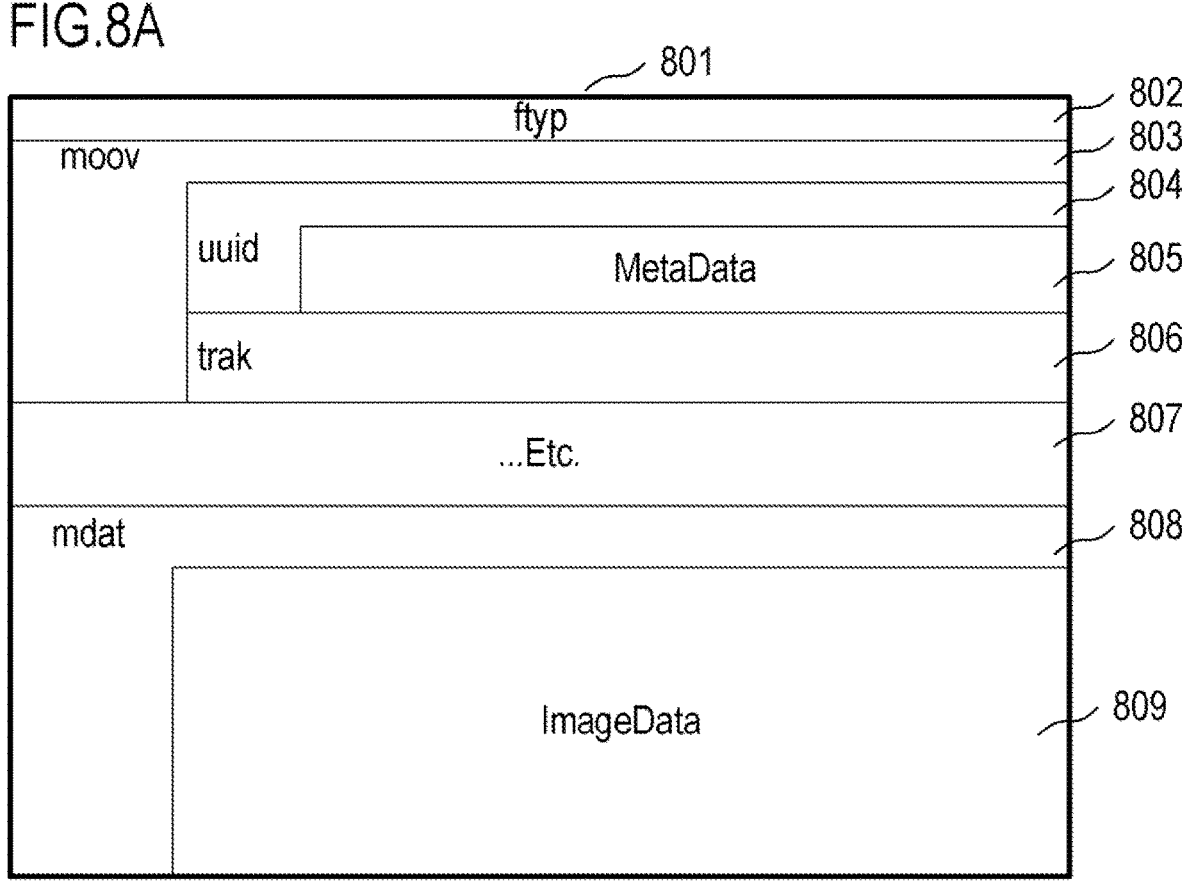
Figure 8B:
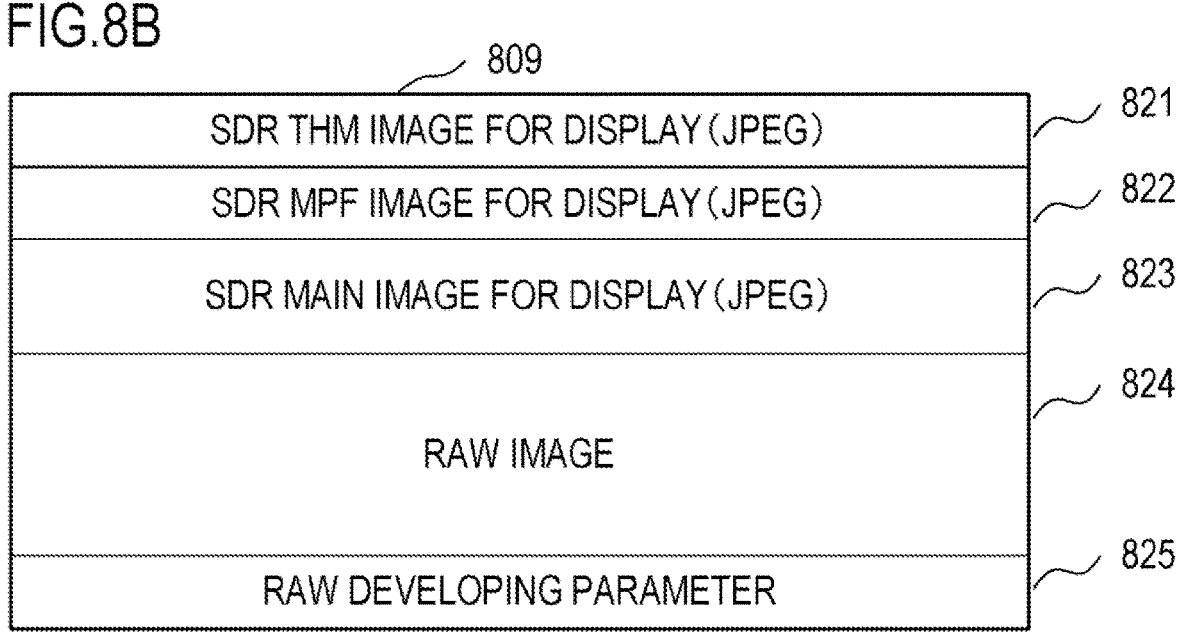
Figure 8C:
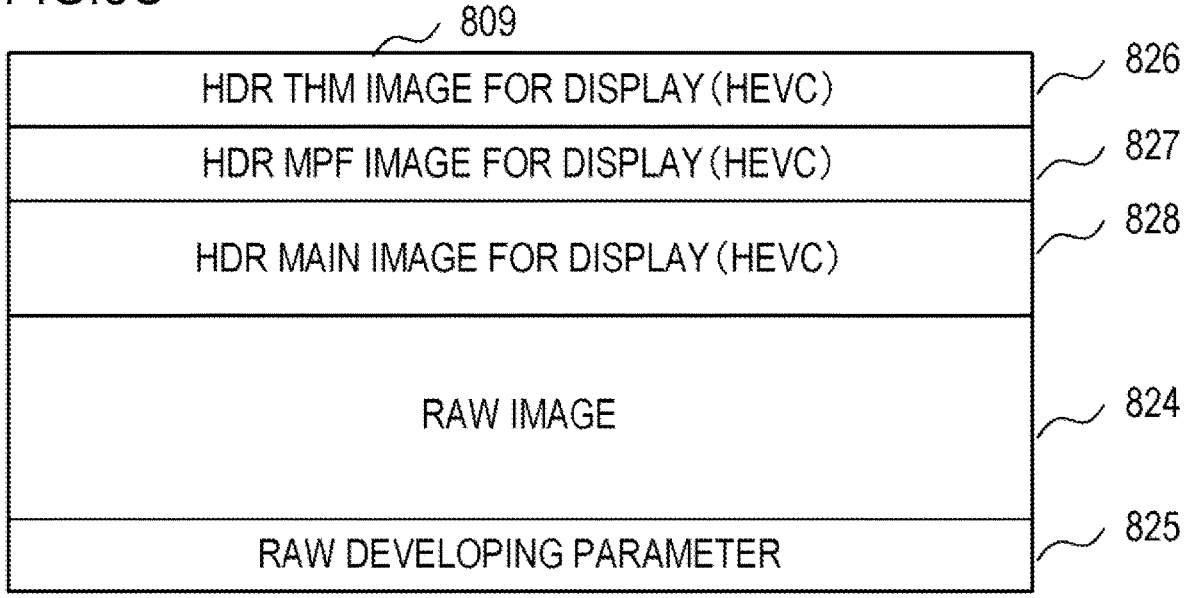
Figure 8D:
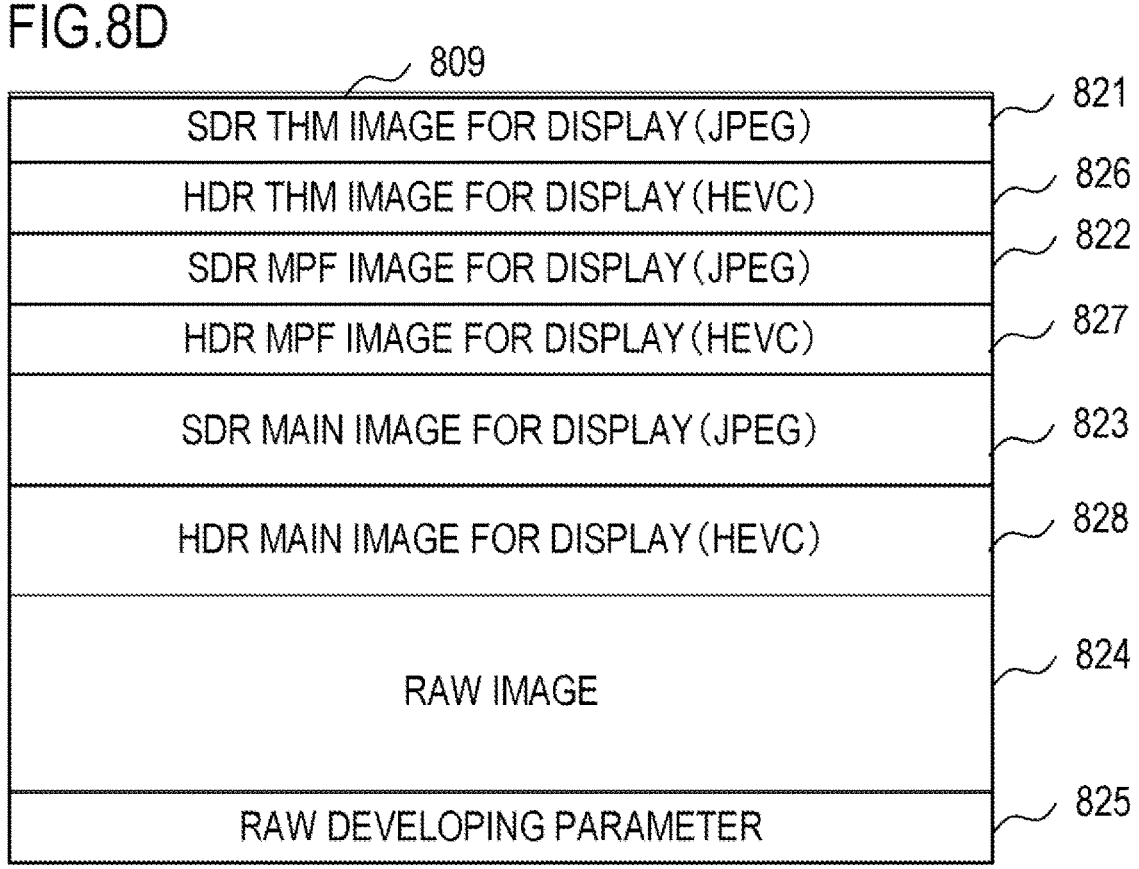

As for developing parameters, while developing parameters for an SDR are to be used in the case of SDR photography, when processing speed allows a margin as in a single shot mode, developing parameters for an SDR may also be generated during HDR photography and both developing parameters for an SDR and developing parameters for an HDR may be recorded (FIGS. 8A and 8C). In addition, when processing speed allows a margin as in a single shot mode, besides a display image for an HDR, a main image in SDR image quality, an MPF image, and a thumbnail image may be created using developing parameters for an SDR and the display image for an HDR and a display image for an SDR may be recorded in a same file (FIG. 8D). Furthermore, when displaying a thumbnail, since getting a rough idea of what the image looks like is sufficient due to the smallness of the image, only the thumbnail image created in S709 may be created and saved as an SDR-developed image (FIG. 8E). By adopting such a configuration, even a product not supporting decoding in H.265 that is an HDR compression system can display only thumbnail images.

In S713, the system control unit 50 compresses the developed HDR image and adds static metadata or dynamic metadata, and records the compressed HDR image as a file in the recording medium 200 via the recording medium I/F 18. Static metadata includes the three primary colors and x, y coordinates of a white point of a display in compliance with CEA-861.3 and a maximum brightness value, minimum brightness, and the like of a mastering display. In addition, examples of static metadata include a maximum content light level and a maximum frame-average light level. Furthermore dynamic metadata includes metadata of dynamic tone mapping of a color volume conversion as defined in SMPTE ST 2094. Since expressing HDR characteristics with a PQ signal requires a minimum depth of 10 bits, since the depth of a conventional JPEG format is 8 bits, a container for a still image HDR must be newly adopted. Therefore, in the present embodiment, a container of HEIF (High Efficiency Image File Format) is used. HEIF is an image file format developed by the MPEG (Moving Picture Experts Group) and defined in MPEG-H Part 12 (ISO/IEC 23008-12). A feature of HEIF is that not only a main image but a thumbnail, temporally related images, and metadata such as EXIF and XMP can also be stored in a single file. Therefore, HEIF is convenient since a 10-bit image sequence encoded in HEVC can also be stored.

<<Calculation Processing of White Balance Coefficient (S702, S703)>>

Figure 7B:
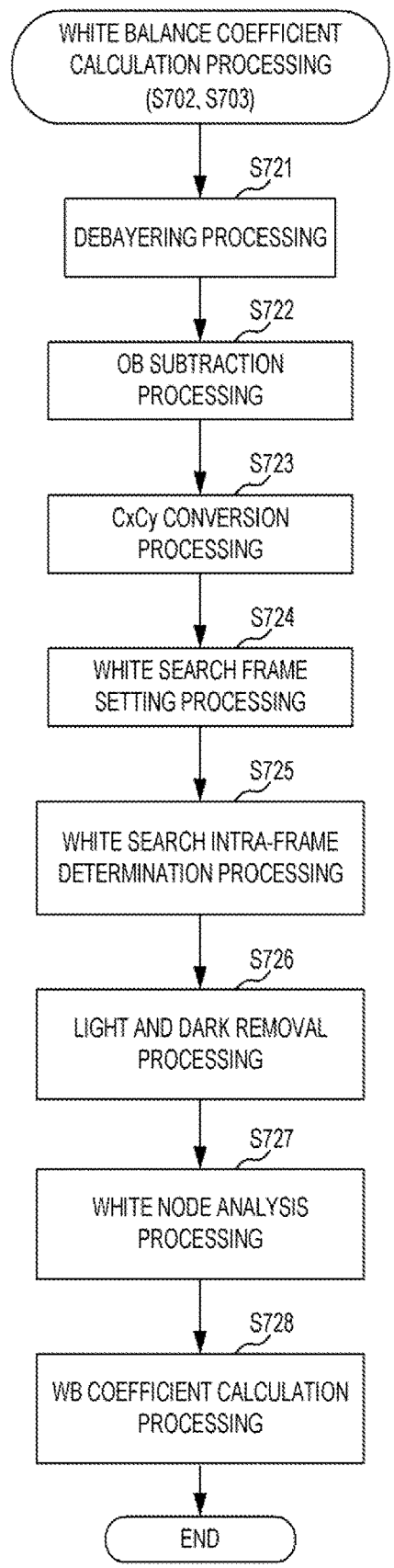
FIG. 7B is a flow chart showing HDR photography processing according to the first embodiment.

FIG. 7B is a flow chart showing details of calculation processing of a white balance coefficient (S702, S703) according to the present embodiment.

In S721, the system control unit 50 performs debayering processing. With RAW data, each pixel only contains a signal of any of R, G, and B. The debayering processing is performed because performing a white search requires a conversion into a color signal. While there are several debayering methods of generating a signal of all channels of R, G, and B, for example, a signal is generated by linear interpolation using a low-pass filter.

In S722, the system control unit 50 performs processing for subtracting an optical black component from the signal after debayering. Generally, with RAW data, optical black (OB) is not 0 but has a value due to the effect of noise. Therefore, an OB component must be subtracted from the signal after debayering.

In S723, the system control unit 50 calculates a color signal Cx, Cy from the acquired RGB signal using the following equations (1), where Cx represents a color temperature and Cy corresponds to a green-direction correction amount. Yi denotes a brightness value.

$$Cx = \frac{(R + G_2) - (B + G_1)}{Yi} \quad (1)$$

$$Cy = \frac{(R + B) - (G_1 + G_2)}{Yi}$$

$$Yi = \frac{R + G_1 + G_2 + B}{4}$$

FIG. 7C illustrates a CxCy plane. As shown in FIG. 7C, by photographing white in advance under various color temperatures from a high color temperature (such as in the daytime) to a low color temperature (such as at sundown) using an imaging apparatus and plotting color assessment values Cx, Cy on coordinates, a white axis 1200 to be a reference for detecting white can be determined. Since a slight variability in white is present in an actual light source, processing that provides both sides of the white axis 1200 with a width is performed (S724). This (the white axis with a width) will be referred to as a white search frame 1201.

In S725, the system control unit 50 plots each pixel after debayering on the CxCy coordinate system and determines whether or not the pixel is within the white search frame 1201.

In S726, the system control unit 50 performs light and dark removal processing which limits pixels to be integration objects in a brightness direction among pixels that fall within the white search frame. The processing is performed in order to prevent a calculation accuracy of the white balance coefficient from declining due to excessively dark colors being susceptible to the effect of noise. In a similar manner, since sensor saturation of any of the respective channels in excessively light colors disrupts a balance of an R/G ratio or a B/G ratio and causes a separation from a correct color, the processing is performed in order to prevent a calculation accuracy of the white balance coefficient from declining. In this case, for example, while brightness up to +1 EV is considered an object on a lightness side in an SDR by considering brightness up to +2 EV an object in an HDR, a white balance coefficient more optimized for an HDR can be calculated.

In S727, the system control unit 50 calculates integration values SumR, SumG, and SumB of each color assessment value from Cx, Cy which is inside the white search frame and which has been subjected to light and dark removal processing (white node analysis processing).

In S728, the system control unit 50 calculates white balance coefficients WBCo_R, WBCo_G, and WBCo_B from the calculated integration values using the following equations (2). It should be noted that values of the white balance coefficients (WB coefficients) may be calculated for a photography mode (SDR photography or HDR photography) set by the user or may be calculated for both an SDR and an HDR.

$$WBCo\_R = \frac{SumY \times 1024}{SumR} \quad (2)$$

$$WBCo\_G = \frac{SumY \times 1024}{SumG}$$

$$WBCo\_B = \frac{SumY \times 1024}{SumB}$$

$$SumY = \frac{(SumR + 2 \times SumG + SumB)}{4}$$

<<Calculation Processing of Gradation Correction Parameter (S704 to S706)>>

Figure 7D:
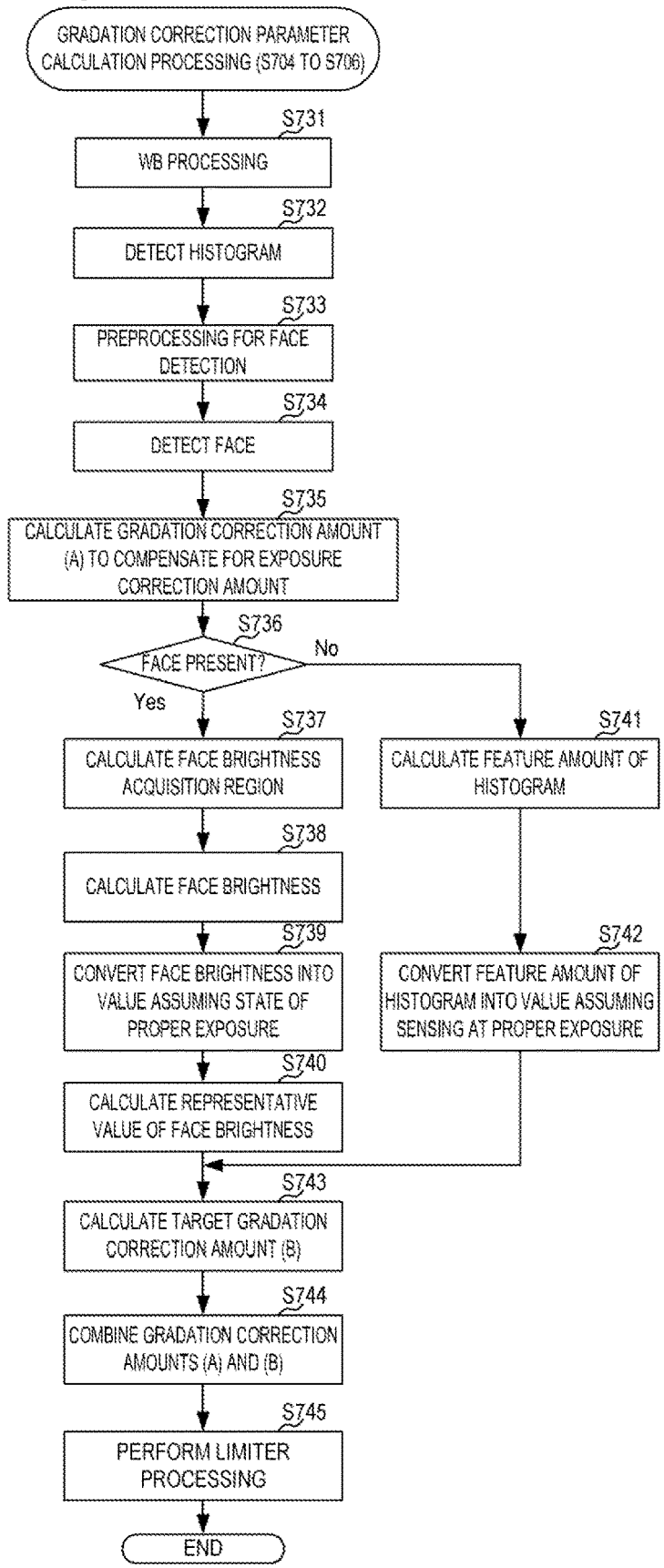
FIG. 7D is a flow chart showing HDR photography processing according to the first embodiment.

FIG. 7D is a flow chart showing details of calculation processing of a gradation correction parameter (S704 to S706) according to the present embodiment.

In S731, the system control unit 50 performs WB processing using the WB coefficients generated in the processing steps of S701 to S703 shown in FIG. 7A.

In S732, the system control unit 50 performs histogram detection. Specifically, the system control unit 50 applies a gain value of white balance obtained in S731 to an entirety of image data. Furthermore, the system control unit 50 generates a histogram as brightness information from a pixel value (an image) having been subjected to gamma correction processing. For the gamma correction processing, while a method of using a known lookup table may be used, gamma characteristics that are the same as gamma characteristics used in development are preferably used. However, in order to conserve processing time and memory amount, simplified gamma characteristics such as gamma characteristics approximated by polygonal lines may be used. Generally, since end portions of an image are often not that important and are affected by a drop in peripheral light intensity depending on the lens used for sensing, a histogram may be created by excluding pixels in peripheral edge portions.

In S733, the system control unit 50 performs preprocessing for face detection. This involves applying reduction processing, gamma processing, and the like on image data to enable a face to be readily detected. Various known methods can be applied as the preprocessing for face detection.

In S734, the system control unit 50 executes face detection processing using a known method with respect to image data after the preprocessing. Due to the face detection processing, a region (a face region) detected as a face and a reliability of the detection are obtained.

In S735, the system control unit 50 calculates a gradation correction amount (a gradation correction amount (A)) to compensate for an exposure correction amount (an amount of decrease) as a first gradation correction amount. In doing so, a gradation correction amount of input/output characteristics is calculated so that, while dark parts of the image attain proper exposure, high brightness pixels of at least a brightness level determined in advance are not corrected (at least the exposure correction amount is not completely compensated). Accordingly, light parts are further prevented from becoming blown-out highlights after the gradation correction. The gradation correction amount can be prepared in advance as a plurality of correction tables in accordance with exposure correction amounts.

In S736, the system control unit 50 determines whether or not a face has been detected. Specifically, the system control unit 50 determines that a face has been detected when there is a face region of which a reliability is higher than an assessment threshold set in advance among face regions detected by the face detection processing in S734. When a face has been detected, the system control unit 50 advances to S737, but otherwise the system control unit 50 advances to S741.

In S737, the system control unit 50 detects partial regions of the detected face region as face brightness acquisition regions. The face brightness acquisition regions are regions for acquiring brightness of a bright portion of a face and a number, positions, and the like of the face brightness acquisition regions are not particularly limited.

In S738, with respect to each of the face brightness acquisition regions, the system control unit 50 obtains an average value (calculates a face brightness) for each type of R pixels, G pixels, and B pixels contained in the region. Furthermore, with respect to each average value of the RGB pixels, a gain value of white balance is applied in a similar manner to histogram detection and, after performing gamma correction, the average values are converted into a brightness value Y using the following equation (3). It should be noted that the gain value of white balance to be applied in histogram detection and face detection is preferably the same gain value having been used in WB processing with respect to the same piece of image data. While the same brightness gamma used in development is ideally used in the gamma correction, in order to conserve processing time and memory amount, simplified gamma characteristics such as gamma characteristics approximated by polygonal lines may be used.

$$Y = 0.299 \times R + 0.587 \times G + 0.114 \times B \quad (3)$$

In S739, the system control unit 50 converts a brightness value obtained with respect to each face brightness acquisition region in S738 into a value that assumes a state of proper exposure. The purpose of this processing is to correct, since the image data has been sensed at lower exposure than proper exposure, a situation where brightness of a face is detected lower than when the image data is sensed at proper exposure. When converting the brightness values, an exposure correction amount (an amount of decrease) determined by exposure control may be compensated or the gradation correction amount calculated in S735 may be used.

In S740, the system control unit 50 calculates a representative value of the brightness of a detected face. As the representative value, for example, a statistic such as a maximum value may be obtained based on a brightness value of each face brightness acquisition region of the detected face region.

In S741, the system control unit 50 detects a histogram character value. For example, the histogram character value is a level (SD) to which belong pixels of which a cumulative frequency from a dark side of the histogram is 1% or a level (HL) to which belong pixels of which a cumulative frequency from a light side of the histogram is 1%.

In S742, the system control unit 50 converts the histogram character value calculated in S741 into a value that assumes sensing at proper exposure. The purpose of this processing is to correct, since the image data has been sensed at lower exposure than proper exposure, a situation where the histogram character value is detected lower than when the image data is sensed at proper exposure. When converting the brightness values, an exposure correction amount (an amount of decrease) determined by exposure control may be compensated or the gradation correction amount calculated in S735 may be used.

In S743, the system control unit 50 calculates a target correction amount. First, the system control unit 50 obtains a representative brightness value of a face or a target brightness level with respect to the histogram character value. Next, based on the target brightness levels and a minimum value and a maximum value of brightness in the image data, the system control unit 50 creates, using spline interpolation or the like, a lookup table (input/output characteristics) that determines an output brightness level with respect to an input brightness level. Hereinafter, the lookup table will also be referred to as a gradation correction amount (B) or a second gradation correction amount.

Figure 7E:
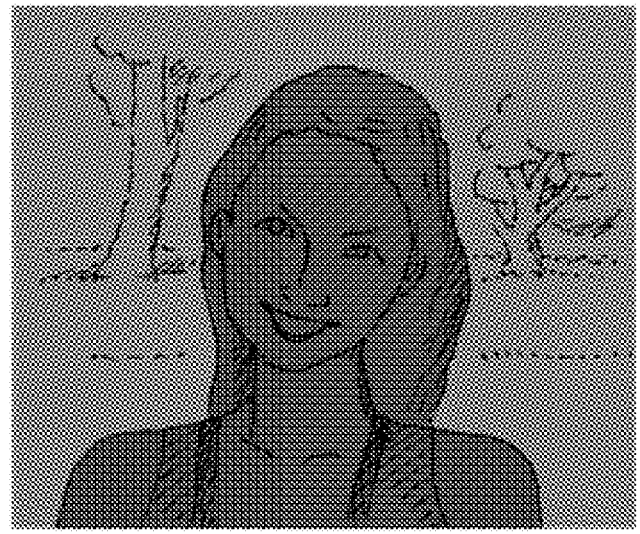
FIG. 7E is a diagram showing an example of a display image according to the first embodiment.
Figure 7F:
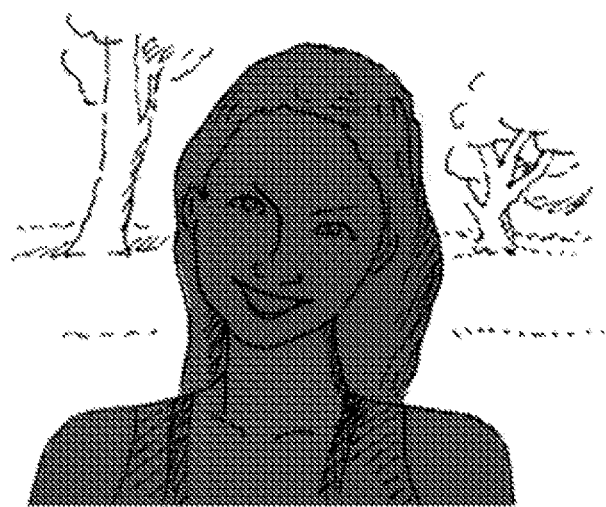
FIG. 7F is a diagram showing an example of a display image according to the first embodiment.
Figure 7G:
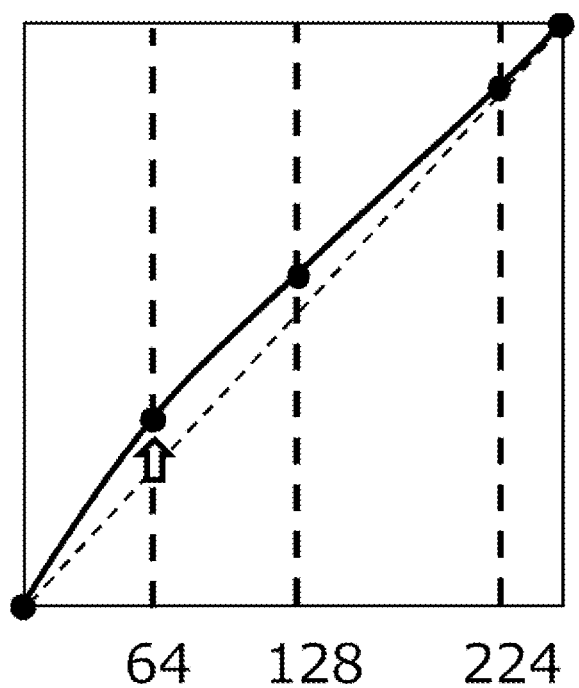
FIG. 7G is a diagram showing an example of a gradation correction amount according to the first embodiment.
Figure 7H:
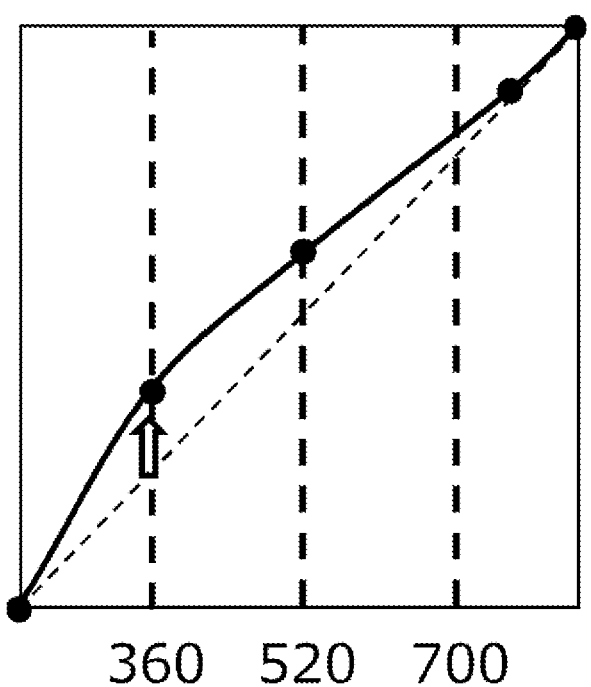
FIG. 7H is a diagram showing an example of a gradation correction amount according to the first embodiment.

In this case, in an HDR, a target gradation correction amount may be differentiated from an SDR FIG. 7E shows an example of display in an SDR FIG. 7F shows an example of display in an HDR. Although brightness values of subjects are a same value, while a background in the SDR is 100 cd/m$^2$ at the highest, a background in the HDR has a value that exceeds 100 cd/m$^2$. As a result, even if the brightness values of the subjects are the same, the HDR may give an impression that it is darker. This is a phenomenon called brightness contrast which is attributable to visual characteristics of humans. In this case, by applying a correction value that makes dark parts less dark as shown in FIG. 7H as compared to the gradation correction amount calculated in an SDR as shown in FIG. 7G, a preferable result in terms of appearance can be produced.

While a target brightness level with respect to the representative brightness value of a face and a histogram character value of image data can be set to a fixed value that is considered empirically preferable, a different target brightness level may be set in accordance with a representative brightness value or a value of a histogram character value. In this case, a lookup table that determines a relationship of a target brightness level with respect to an input level may be prepared for each parameter (a representative brightness value or a histogram character value) for which a target brightness level is to be set. Correction characteristics for realizing a conversion to the target brightness level having been determined in this manner is obtained by a method such as spline interpolation and, if necessary, the correction characteristics are saved as a lookup table (or a relational expression) for applying the gradation correction amount (B).

In S744, the system control unit 50 combines the gradation correction amount (A) calculated in S735 and the gradation correction amount (B) calculated in S743 with each other. For example, the system control unit 50 obtains a brightness value resulting from first applying the gradation correction amount (A) to each input brightness level and subsequently applying the gradation correction amount (B) to the brightness level after correction and creates a lookup table of an output brightness level with respect to each input brightness level.

In S745, the system control unit 50 performs processing (limiter processing) for limiting an upper limit value of the combined correction amount (a combined gradation correction amount) obtained in S744. By combining the gradation correction amount (A) and the gradation correction amount (B) with each other, since a correction amount increases and an amount of noise becomes more apparent in the image after correction, a limit is imposed on an overall correction amount. The limiter processing can be realized by preparing a maximum correction amount to be allowed for each brightness value as a table and replacing an output level that exceeds the maximum correction amount among values of the lookup table created in S744 with an output level corresponding to the maximum correction amount. It should be noted that a value for a photography mode (SDR photography or HDR photography) set by the user may be calculated as the gradation correction amount or gradation correction amounts for both an SDR and an HDR may be calculated.

<<Data Structure>>

FIG. 8A shows a structure of still image RAW image data to be recorded in the recording medium 200 in the various steps of recording processing described above. A file format to be exemplified below is an ISO base media file format defined in ISO/IEC 14496-12. Therefore, the present file format has a tree structure and has respective nodes called boxes. In addition, each box can have a plurality of boxes as child elements.

Image data (an image file) 801 has a box ftyp (802) in the beginning for describing a file type, a box moov (803) that includes all metadata, a box mdat (808) for a main body of media data of a track, and other boxes (807). The box moov has, as child elements, a box uuid (804) for storing MetaData (805) and a trak box (806) for storing information that refers to ImageData. In MetaData, metadata of an image such as a date and time of creation of the image, conditions at the time of photography, information on whether the photography was performed in an HDR or an SDR, and other information related to photography is described. The box mdat described earlier has ImageData (809) that is data of a photographed still image as a child element.

In this case, a RAW image photographed in an SDR and a RAW image photographed in an HDR differ in the image recorded in ImageData (809).

FIG. 8B is a diagram showing ImageData (809) in which a RAW image photographed in an SDR is recorded. The ImageData (809) has a THM image (821) having been developed with SDR image quality and subjected to JPEG compression, an MPF image (822), a main image (823), a RAW image (824), and a RAW developing parameter (825).

FIG. 8C is a diagram showing ImageData (809) having only an HDR image as a display image at the time of HDR photography. The ImageData (809) has a THM image (826) having been developed with HDR image quality and subjected to HEVC compression, an MPF image (827), a main image (828), the RAW image (824), and the RAW developing parameter (825).

FIG. 8D is a diagram showing ImageData (809) having both an HDR image and an SDR image as display image at the time of HDR photography. The ImageData (809) has the THM image (821) having been developed with SDR image quality and subjected to JPEG compression, the MPF image (822), the main image (823), and the THM image (826) having been developed with HDR image quality and subjected to HEVC compression. The ImageData (809) also has the MPF image (827), the main image (828), the RAW image (824), and the RAW developing parameter (825).

FIG. 8E is a diagram showing ImageData (809) having only an SDR image as the THM image at the time of HDR photography but having an HDR image as the MPF image and the main image. The ImageData (809) has the THM image (821) having been developed with SDR image quality and subjected to JPEG compression, the MPF image (827) having been developed with HDR image quality and subjected to HEVC compression, the main image (828), the RAW image (824), and the RAW developing parameter (825).

The file formats shown in the present embodiment are merely examples and other boxes may be included as necessary. Alternatively, configurations may be adopted in which a display image is held in a box inside moov (803) or in the other boxes (807).

<<Playback Mode Processing (SDR) (S439)>>

Figure 9A:
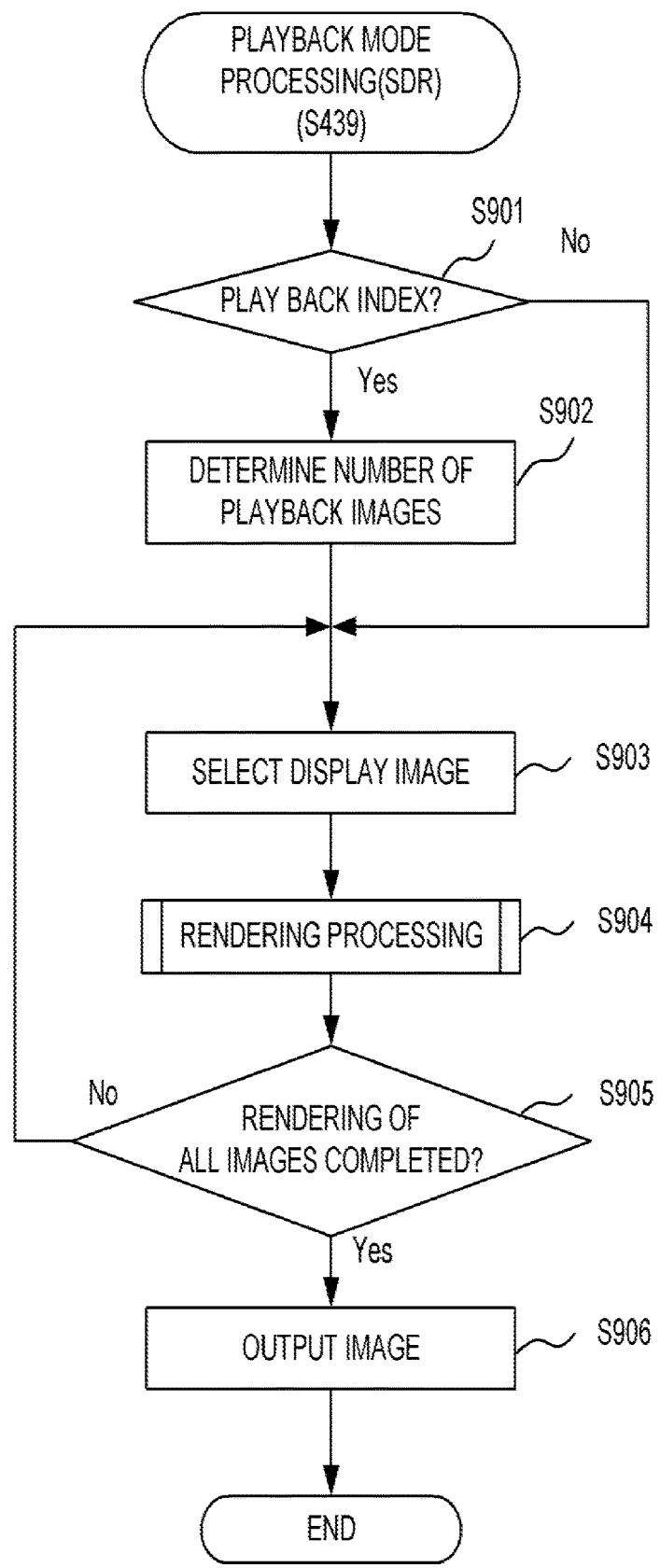
FIG. 9A is a flow chart showing playback mode processing according to the first embodiment.
Figure 9C:
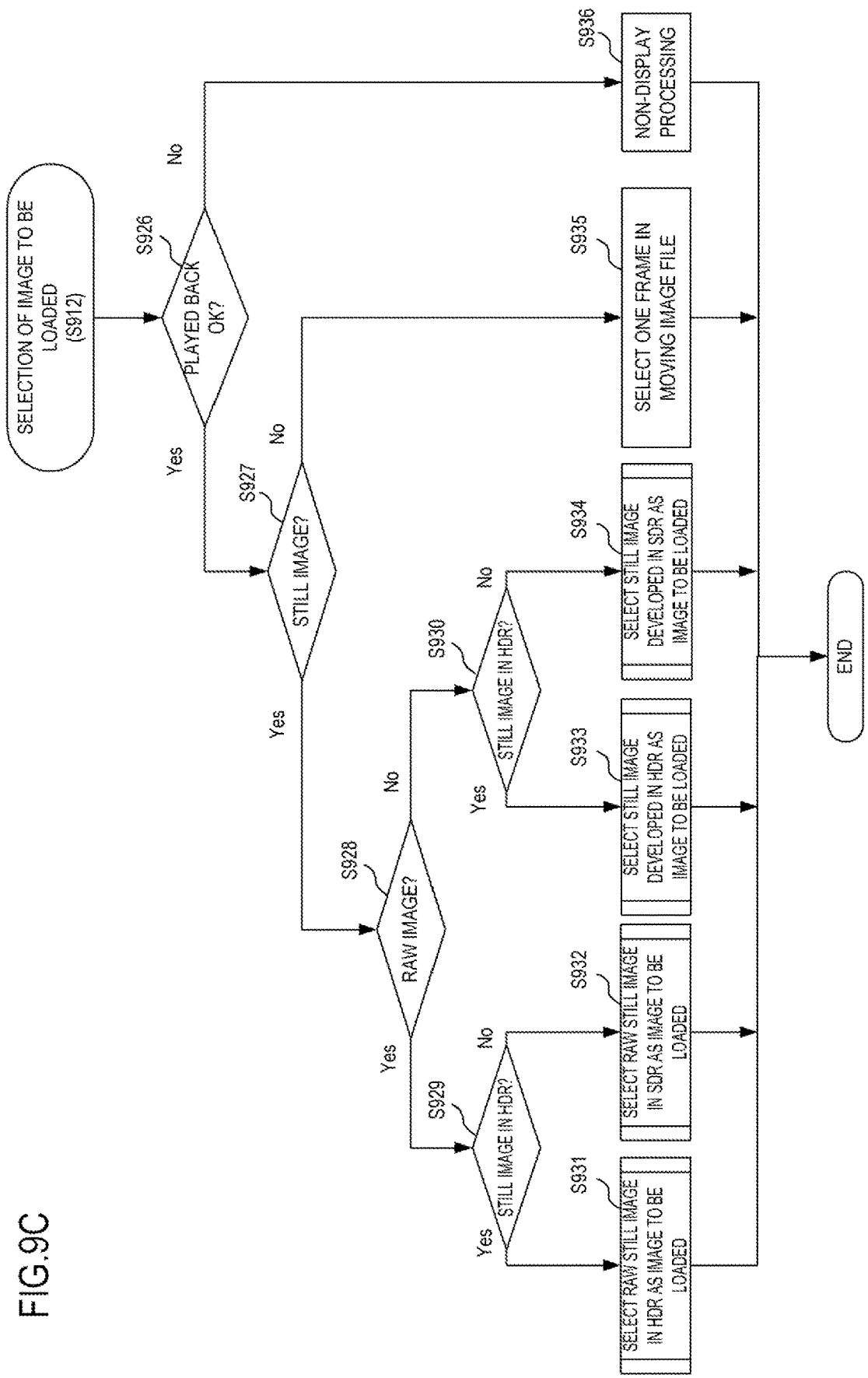
FIG. 9C is a flow chart showing playback mode processing according to the first embodiment.

FIG. 9A is a flow chart showing details of the playback mode processing (S439) using the display unit 28. The processing is realized as the system control unit 50 deploys a program recorded in the nonvolatile memory 56 onto the system memory 52 and executes the program.

In S901, the system control unit 50 determines whether or not index playback is to be performed. When index playback is to be performed, the system control unit 50 advances to S902, but otherwise (when normal playback is to be performed) the system control unit 50 advances to S903.

In S902, the system control unit 50 determines the number of images to be played back (displayed). In S903, the system control unit 50 determines the images to be played back (displayed). In S904, the system control unit 50 performs rendering processing of the images to be played back. Details of the rendering processing will be described later with reference to FIG. 9B.

In S905, the system control unit 50 determines whether or not rendering of all images to be displayed has been completed. When the rendering has been completed, the system control unit 50 advances to S906, but otherwise the system control unit 50 advances to S903.

In S906, the system control unit 50 performs image output to the display unit 28 and ends the present processing flow.

The system control unit 50 may perform operation acceptance processing (not illustrated) described below. First, the system control unit 50 determines whether or not the menu button 70e has been depressed by the user. When it is determined that the menu button 70e has been depressed, menu display processing is performed. Next, the system control unit 50 determines whether or not the shutter button 61 has been depressed by the user. When it is determined that the shutter button 61 has been depressed, the playback mode is ended and photography mode processing is performed. Furthermore, the system control unit 50 determines whether or not the power supply switch 72 has been operated by the user and power has been turned off. When it is determined that power has been turned off power off processing is executed. Moreover, the system control unit 50 determines whether or not an image switching operation has been performed by the user. When it is determined that an image switching operation has been performed, the system control unit 50 advances to S903 and performs playback processing of a next image.

FIG. 9B is a flow chart showing details of the rendering processing (S904).

In S911, the system control unit 50 acquires information on images to be played back. In S912, the system control unit 50 determines the images to be played back (selection of an image to be loaded). Details of the processing for determining the images to be played back will be described later with reference to FIG. 9C.

In S913, the system control unit 50 loads the images to be played back from the recording medium 200. In S914, the system control unit 50 performs expansion processing of the images to be played back. In S915, the system control unit 50 collects brightness data for each pixel from image data subjected to the expansion processing in S914. The brightness data is, for example, brightness information to be used in histogram processing or highlighted warning processing.

In S916, the system control unit 50 determines whether or not an image to be played back (a loaded image) is an HDR image. When the image to be played back (the loaded image) is an HDR image, the system control unit 50 advances to S917, but otherwise (when the image to be played back (the loaded image) is an SDR image) the system control unit 50 advances to S920.

In S917, the system control unit 50 determines whether or not the setting of HDR assist display during playback is "assist 1". When the setting is "assist 1", the system control unit 50 advances to S918 but otherwise (when the setting is "assist 2") the system control unit 50 advances to S919.

In S918, the system control unit 50 performs SDR conversion (conversion from an HDR to an SDR) in accordance with the setting of "assist 1" with respect to the image having been expanded in S914.

In S919, the system control unit 50 performs SDR conversion (conversion from an HDR to an SDR) in accordance with the setting of "assist 2" with respect to the image having been expanded in S914.

In S920, the system control unit 50 performs magnification and reduction processing with respect to the image to a size suitable for the display unit 28. In S921, the system control unit 50 determines an arrangement of the generated image, arranges the image, and ends the rendering processing.

FIGS. 9C to 9H are flow charts showing details of the processing for selecting an image to be loaded (S912).

In S926, the system control unit 50 determines whether or not an acquired image can be played back. When the image can be played back, the system control unit 50 advances to S927, but otherwise the system control unit 50 advances to S936.

In S927, the system control unit 50 determines whether or not the image to be played back is a still image. When the image to be played back is a still image, the system control unit 50 advances to S928, but otherwise the system control unit 50 advances to S935.

In S928, the system control unit 50 determines whether or not the image to be played back is a RAW image. When the image to be played back is a RAW image, the system control unit 50 advances to S929, but otherwise the system control unit 50 advances to S930.

In S929, the system control unit 50 determines whether or not the RAW image to be played back is a RAW image photographed in an HDR. When the RAW image to be played back is a RAW image photographed in an HDR, the system control unit 50 advances to S931, but otherwise (when the RAW image to be played back is a RAW image photographed in an SDR) the system control unit 50 advances to S932. The determination at this point is made using metadata in the RAW file described with reference to FIGS. 8A to 8E.

In S930, the system control unit 50 determines whether or not the still image determined not to be a RAW image is an image photographed in an HDR. When the still image has been photographed in an HDR, the system control unit 50 advances to S933, but otherwise (when the still image has been photographed in an SDR) the system control unit 50 advances to S934. In the present embodiment, since an image photographed in an HDR is recorded as an HEIF file and an image photographed in an SDR is recorded as an JPEG file, a determination of whether an image is an HDR image or an SDR image is to be made based on whether the image is an HEIF file or a JPEG file. Alternatively, whether an image is an HDR image or an SDR image may be determined using metadata inside the HEIF file.

In S931, the system control unit 50 selects image data to be used for playback from the file of the RAW image photographed in an HDR.

In S932, the system control unit 50 selects image data to be used for playback from the file of the RAW image photographed in an SDR.

In S933, the system control unit 50 selects image data to be used for playback from the file of the still image developed in an HDR.

In S934, the system control unit 50 selects image data to be used for playback from the file of the still image developed in an SDR.

In S935, the system control unit 50 selects image data (a frame) to be displayed from a moving image file.

In S936, the system control unit 50 performs non-display processing of a playback image. In this case, information indicating that playback cannot be performed is displayed on the display unit 28 in order to notify the user that the image cannot be played back.

FIG. 9D is a flow chart showing details of the processing (S931) for selecting image data to be used for playback from the file of the RAW image photographed in an HDR.

In S941, the system control unit 50 determines whether or not index playback is to be performed. When index playback is to be performed, the system control unit 50 advances to S942, but otherwise (when normal playback is to be performed) the system control unit 50 advances to S943.

In S942, the system control unit 50 determines whether or not the number of indices to be played back in index playback is at least 36. When the number of indices to be played back is at least 36, the system control unit 50 advances to S945, but otherwise the system control unit 50 advances to S944. While the determination is made in the present embodiment in accordance with whether or not the number of indices to be played back is at least 36, the threshold of the number of indices to be played back is merely an example. Alternatively, the threshold of the number of indices to be played back may be changed depending on a size of the display unit 28.

In S943, the system control unit 50 determines "HDR main image (HEVC) for display" (828) as the image data (image to be loaded) to be played back.

In S944, the system control unit 50 determines "HDR MPF image (HEVC) for display" (827) as the image data to be played back.

In S945, the system control unit 50 determines "HDR THM image (HEVC) for display" (826) as the image data to be played back.

Figure 9E:
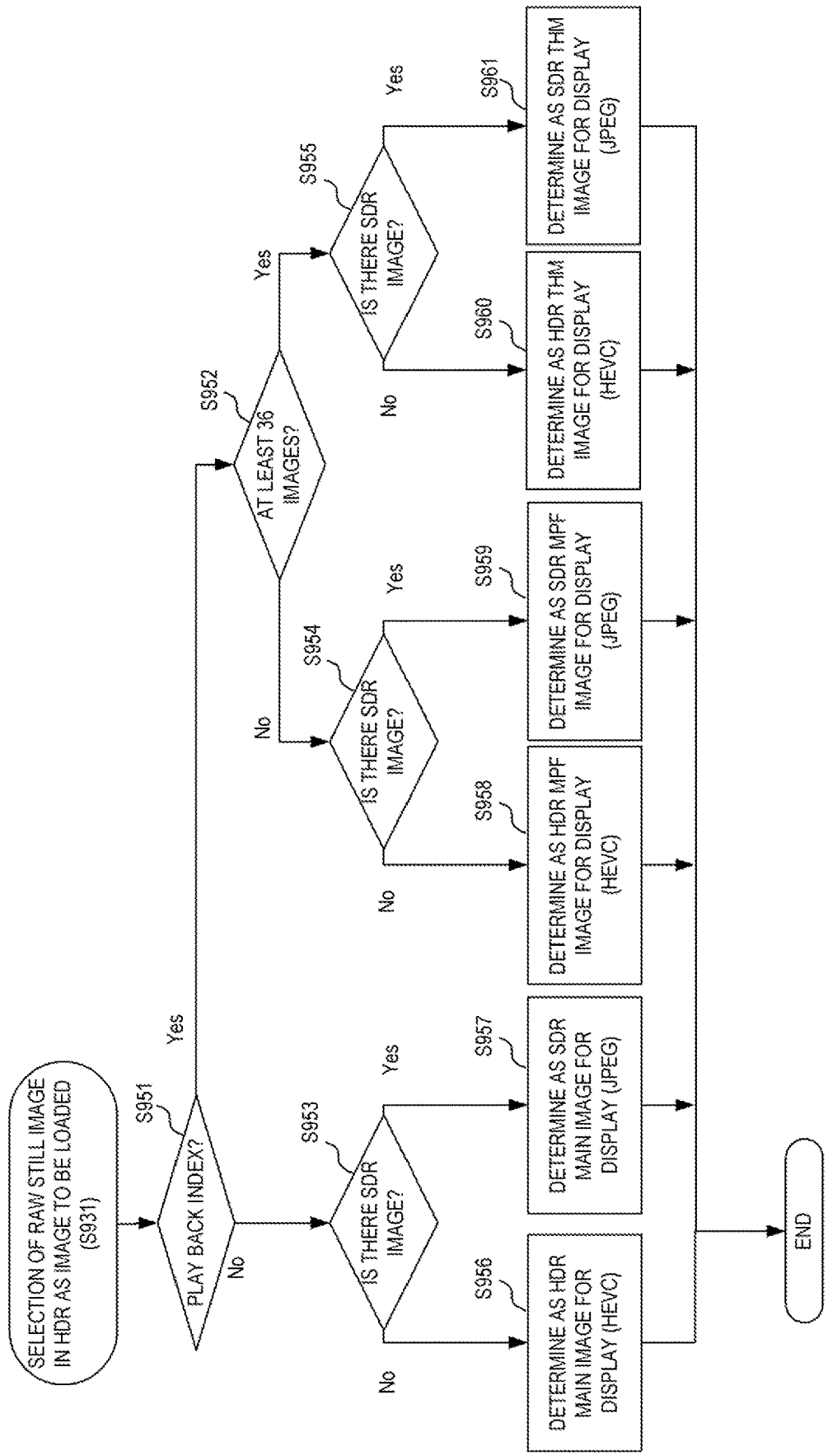
FIG. 9E is a flow chart showing playback mode processing according to the first embodiment.

FIG. 9E is a flowchart showing another example of the processing (S931) for selecting image data to be used for playback from the file of the RAW image photographed in an HDR. Specifically, the flow chart shows details of processing for selecting image data to be used for playback from the file of the RAW image photographed in an HDR when the RAW image file has an SDR display image.

In S951, the system control unit 50 determines whether or not index playback is to be performed. When index playback is to be performed, the system control unit 50 advances to S952, but otherwise (when normal playback is to be performed) the system control unit 50 advances to S953.

In S952, the system control unit 50 determines whether or not the number of indices to be played back in index playback is at least 36. When the number of indices to be played back is at least 36, the system control unit 50 advances to S955, but otherwise the system control unit 50 advances to S954.

In S953 to S955, the system control unit 50 determines whether or not the RAW image file to be played back contains an SDR image. The determination at this point is made using metadata in the RAW file described earlier with reference to FIGS. 8A to 8E.

In S956, the system control unit 50 determines "HDR main image (HEVC) for display" (828) as the image data to be used for playback.

In S957, the system control unit 50 determines "SDR main image (JPEG) for display" (823) as the image data to be used for playback.

In S958, the system control unit 50 determines "HDR MPF image (HEVC) for display" (827) as the image data to be played back.

In S959, the system control unit 50 determines "SDR MPF image (JPEG) for display" (822) as the image data to be used for playback.

In S960, the system control unit 50 determines "HDR THM image (HEVC) for display" (826) as the image data to be used for playback.

In S961, the system control unit 50 determines "SDR THM image (JPEG) for display" (821) as the image data to be used for playback.

FIG. 9F is a flow chart showing details of the processing (S933) for selecting image data to be used for playback from the file of the still image developed in an HDR.

In S971, the system control unit 50 determines whether or not index playback is to be performed. When index playback is to be performed, the system control unit 50 advances to S972, but otherwise (when normal playback is to be performed) the system control unit 50 advances to S973.

In S972, the system control unit 50 determines whether or not the number of indices to be played back in index playback is at least 36. When the number of indices to be played back is at least 36, the system control unit 50 advances to S975, but otherwise the system control unit 50 advances to S974.

In S973, the system control unit 50 determines "HDR main image (HEVC)" (not illustrated) as the image data to be used for playback.

In S974, the system control unit 50 determines "HDR MPF image (HEVC)" (not illustrated) as the image data to be used for playback.

In S975, the system control unit 50 determines "HDR THM image (HEVC)" (not illustrated) as the image data to be used for playback.

FIG. 9G is a flow chart for selecting image data to be used for playback from the file of the RAW image photographed in an SDR.

In S981, the system control unit 50 determines whether or not index playback is to be performed. When index playback is to be performed, the system control unit 50 advances to S982, but otherwise (when normal playback is to be performed) the system control unit 50 advances to S983.

In S982, the system control unit 50 determines whether or not the number of indices to be played back in index playback is at least 36. When the number of indices to be played back is at least 36, the system control unit 50 advances to S985, but otherwise the system control unit 50 advances to S984.

In S983, the system control unit 50 determines "SDR main image (JPEG) for display" (823) as the image data to be used for playback.

In S984, the system control unit 50 determines "SDR MPF image (JPEG) for display" (822) as the image data to be used for playback.

In S985, the system control unit 50 determines "SDR THM image (JPEG) for display" (821) as the image data to be used for playback.

FIG. 9H is a flow chart showing details of the processing (S934) for selecting image data to be used for playback from the file of the still image developed in an SDR.

In S991, the system control unit 50 determines whether or not index playback is to be performed. When index playback is to be performed, the system control unit 50 advances to S992, but otherwise (when normal playback is to be performed) the system control unit 50 advances to S993.

In S992, the system control unit 50 determines whether or not the number of indices to be played back in index playback is at least 36. When the number of indices to be played back is at least 36, the system control unit 50 advances to S995, but otherwise the system control unit 50 advances to S994.

In S993, the system control unit 50 determines "SDR main image (JPEG)" (not illustrated) as the image data to be used for playback.

In S994, the system control unit 50 determines "SDR MPF image (JPEG)" (not illustrated) as the image data to be used for playback.

In S995, the system control unit 50 determines "SDR THM image (JPEG)" (not illustrated) as the image data to be used for playback.

<<Playback Mode Processing (HDR) (S439)>>

FIG. 10A is a flow chart showing details of the playback mode processing (S439) using the external device 300. The processing is realized as the system control unit 50 deploys a program recorded in the nonvolatile memory 56 onto the system memory 52 and executes the program.

In S1001, the system control unit 50 determines whether or not the digital camera 100 is connected to the external device 300. When it is determined that the digital camera 100 is connected to the external device 300, the system control unit 50 advances to S1002, but otherwise the system control unit 50 advances to S1005.

In S1002, the system control unit 50 determines whether or not the HDR setting during playback is enabled. It is assumed that, as the HDR setting during playback, "perform HDR playback", "do not perform HDR playback", and "linked with photography mode" can be selected and set. In addition, "perform HDR playback" is a mode in which HDR output is performed as long as the external device 300 supports an HDR regardless of whether the image to be played back is an HDR image or an SDR image. "Do not perform HDR playback" is a mode in which SDR output is performed. "Linked with photography mode" is a mode in which output during playback is linked with the photography mode, and when "HDR photography" is set to "perform", HDR output is also performed during output, but when "HDR photography" is set to "do not perform", SDR output is also performed during output. In S1002, the system control unit 50 advances to S1003 when the mode is "perform HDR playback" but the system control unit 50 advances to S1005 when the mode is "do not perform HDR playback". In addition, when the mode is "linked with photography mode", the system control unit 50 advances to S1003 when "HDR photography" set in S606 is "perform" but the system control unit 50 advances to S1005 when "HDR photography" set in S606 is "do not perform".

In S1003, the system control unit 50 determines whether or not the external device 300 is a display supporting an HDR. When the external device 300 supports an HDR, the system control unit 50 advances to S1004, but otherwise the system control unit 50 advances to S1005.

In S004, the system control unit 50 outputs a video (a signal) in an HDR to the external device 300.

In S1005, the system control unit 50 outputs a video in an SDR to the external device 30).

Since S1006 to S1008 and S1010 and S1011 are the same as S901 to S903 and S905 and S906 having been described with reference to FIG. 9A, descriptions thereof will be omitted. Details of S1009 will be described below with reference to FIG. 10B.

Figure 10B:
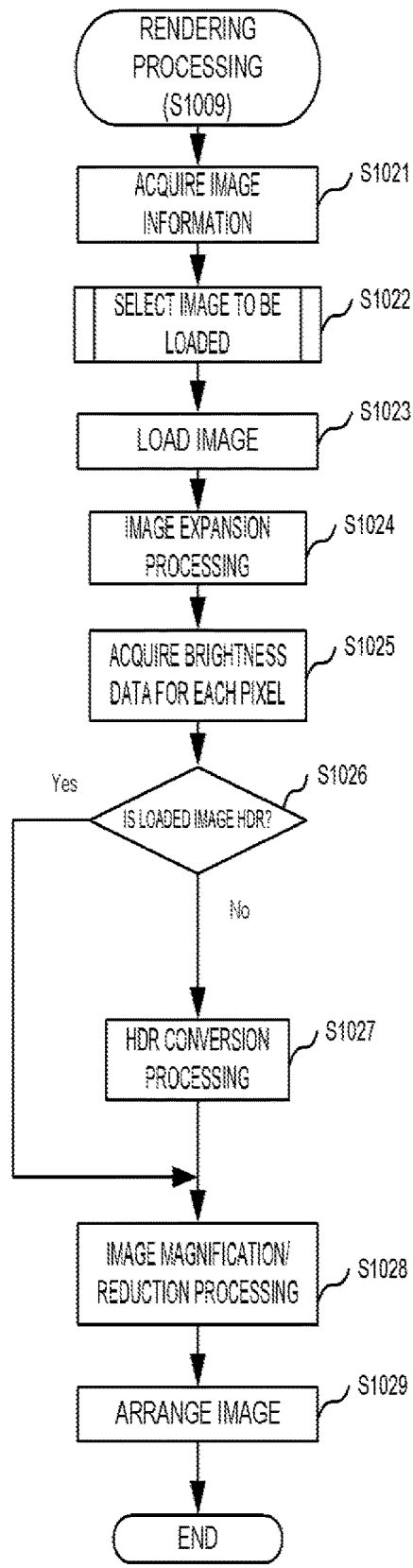
FIG. 10B is a flow chart showing playback mode processing according to the first embodiment.

FIG. 10B is a flow chart showing details of the rendering processing (S1009) in the playback mode processing using the external device 300.

Since S1021 to S1025, S1028, and S1029 are the same as S911 to S915, S920, and S921 having been described with reference to FIG. 9B, descriptions thereof will be omitted.

In S1026, the system control unit 50 determines whether or not an image to be played back is an HDR image. When the image to be played back is an HDR image, the system control unit 50 advances to S1028, but otherwise (when the image to be played back is an SDR image) the system control unit 50 advances to S1027.

In S1027, the system control unit 50 performs HDR conversion (conversion from an SDR to an HDR).

<<Playback Menu Processing>>

Figure 11A:
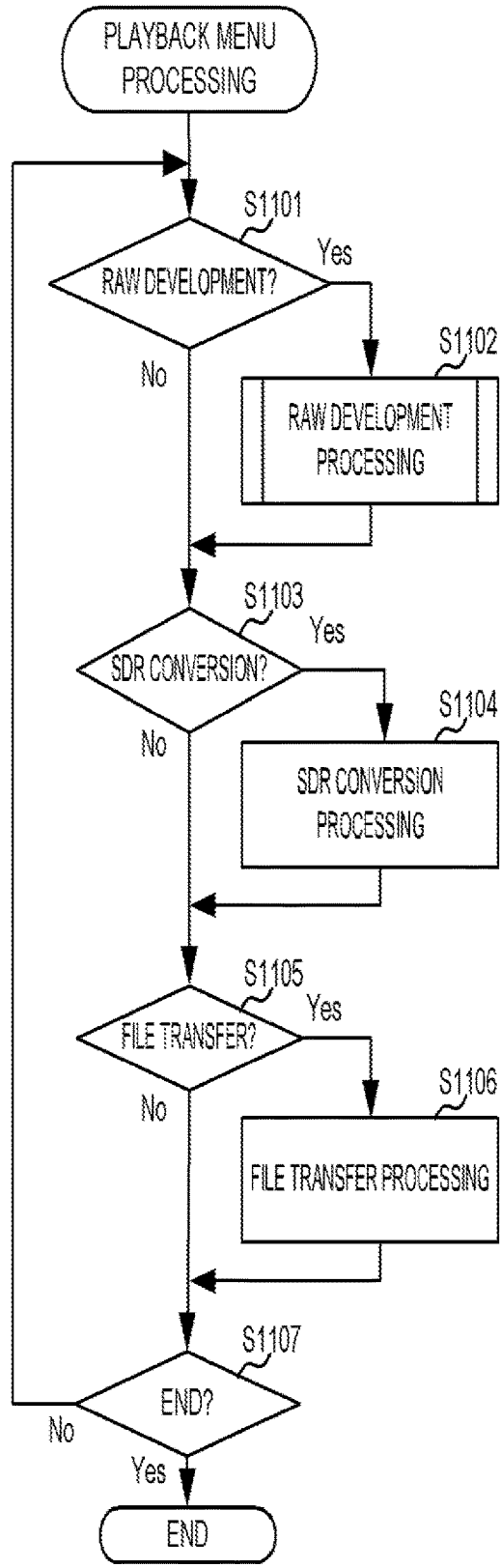
FIG. 11A is a flow chart showing playback menu processing according to the first embodiment.

FIG. 11A is a flow chart showing details of playback menu processing according to the present embodiment. The processing is realized as the system control unit 50 deploys a program recorded in the nonvolatile memory 56 onto the system memory 52 and executes the program.

In S1101, the system control unit 50 refers to a user setting in a setting item (not illustrated) of RAW development to determine whether or not RAW development is to be performed. When RAW development is to be performed, the system control unit 50 advances to S1102, but when RAW development is not to be performed, the system control unit 50 advances to S1103.

In S1102, the system control unit 50 performs RAW development processing with respect to a RAW image file specified by the user. For example, the system control unit 50 performs HDR development and saves the developed image file as an HEIF file or performs SDR development and saves the developed image file as a JPEG file. Details of the RAW development processing will be described later with reference to FIG. 11B.

In S1103, the system control unit 50 refers to a setting item (not illustrated) of SDR conversion of an HDR file to determine whether or not SDR conversion (conversion from an HDR to an SDR) is to be performed. When SDR conversion is to be performed, the system control unit 50 advances to S1104, but otherwise the system control unit 50 advances to S1105.

In S1104, the system control unit 50 performs SDR conversion with respect to an HDR image file specified by the user. Since the HDR image is an image generated in a color space of which an OETF is PQ and a color gamut is BT.2020 or the like, tone mapping and gamut mapping processing to a color space such as γ2.2 of an SDR or sRGB must be performed. While known techniques may be used as a specific method, for example, performing tone mapping that causes a proper exposure to conform to an SDR enables a result with adjusted brightness to be obtained as compared to an SDR.

In S1105, the system control unit 50 refers to a setting item (not illustrated) of file transfer to determine whether or not a file transfer is to be performed. When a file transfer is to be performed, the system control unit 50 advances to S1106, but when a file transfer is not to be performed, the system control unit 50 advances to S1107.

In S1106, the system control unit 50 performs transfer processing with respect to an image file specified by the user. When transferring an HDR image file, if the receiving destination is only capable of SDR display, the image file may be transferred as an SDR image file after performing the SDR conversion described in S1104 in the camera.

In S1107, the system control unit 50 determines whether or not to end the playback menu processing. When the playback menu processing is to be ended, the system control unit 50 ends the present processing flow, but otherwise the system control unit 50 advances to S101.

Figure 11B:
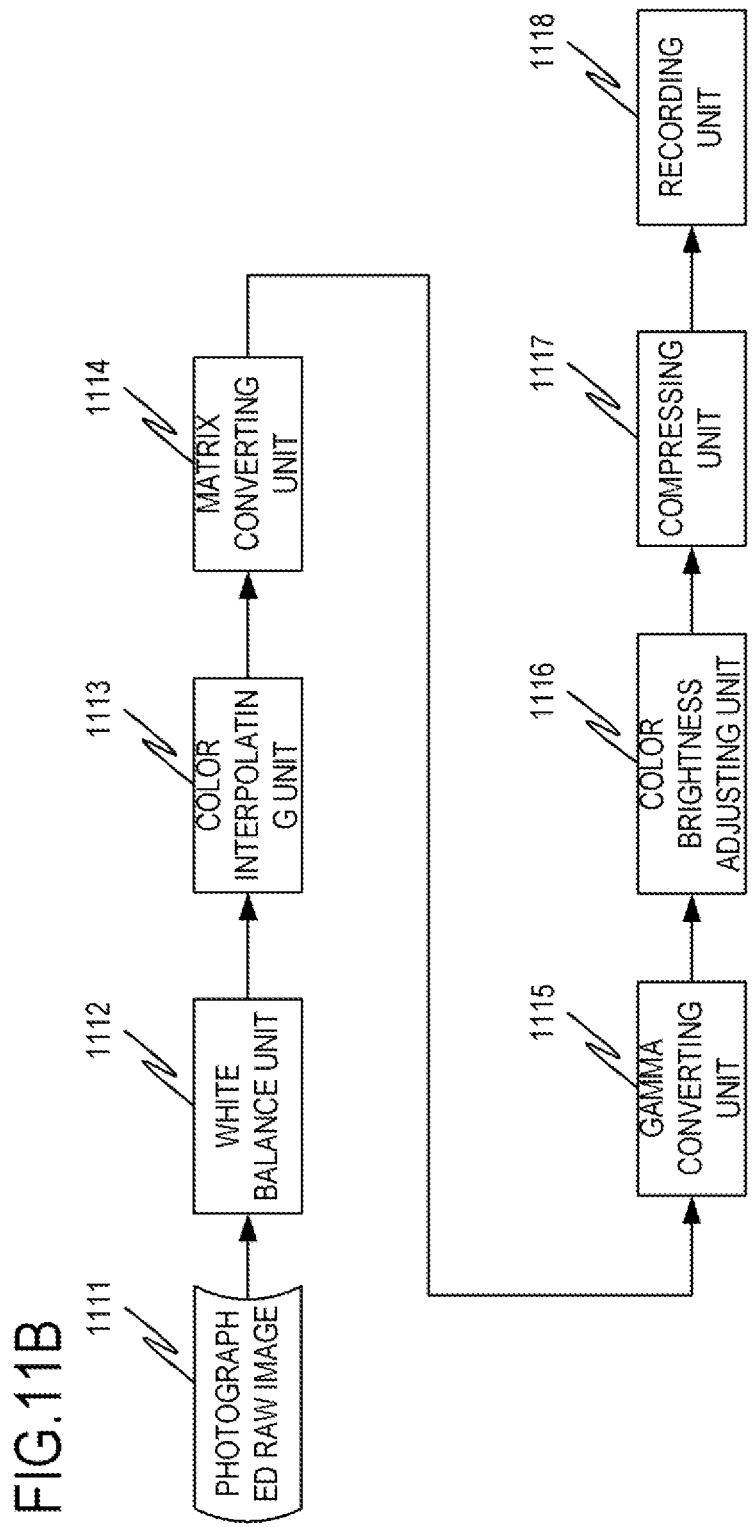
FIG. 11B is a functional block diagram related to RAW development processing according to the first embodiment.

FIG. 11B is a functional block diagram of each function that performs the RAW development processing (S1102). The system control unit 50 loads a photographed RAW image 1111 that is recorded in the recording medium 200 and the RAW development processing is performed by the image processing unit 24. Each pixel of the RAW image only indicates intensity on a single color plane. It should be noted that RAW images include RAW (SDR) that are photographed in an SDR and RAW (HDR) that are photographed in an HDR. In addition, there may be cases where the RAW (SDR) is developed in an SDR as it is and cases where RAW (SDR) is developed in an HDR. Conversely, there are cases where RAW (HDR) is developed in an HDR and cases where the RAW (HDR) is developed in an SDR. A white balance unit 1112 performs processing for making white whiter. When developing the RAW (HDR) in an HDR, white balance processing is performed using a white balance coefficient for an HDR that is recorded in a file. In addition, when developing in an SDR, white balance processing is performed by generating a white balance coefficient for an SDR that is stored in a file. When white balance coefficients for both an HDR and an SDR are recorded in an RAW image, whichever is necessary may be used as appropriate.

A color interpolating unit 1113 performs noise reduction and interpolates a color mosaic image to generate a color image in which all pixels are complete with pieces of color information of R, G. and B. A basic color image is generated from the generated color image via a matrix converting unit 1114 and a gamma converting unit 1115. Subsequently, processing for adjusting an appearance of the image is performed by a color brightness adjusting unit 1116 with respect to the color image. For example, image correction such as detecting an evening view and enhancing chroma thereof is performed in accordance with the scene. While gradation correction is performed simultaneously, when developing the RAW (HDR) in an HDR, gradation correction is performed using a gradation correction amount for an HDR that is recorded in a file. When developing in an SDR, gradation correction is executed by calculating a gradation correction amount for an SDR using a face detection result and a histogram that are recorded in a file. When gradation correction amounts for both an HDR and an SDR are recorded in an RAW image, whichever is necessary may be used as appropriate.

With respect to the image having been subjected to desired color adjustment, a compressing unit 1117 compresses the high resolution image by a method such as JPEG or HEVC and a recording unit 1118 generates a developed image to be recorded in a recording medium such as a flash memory. Since the HEIF container described earlier is capable of storing a plurality of images, an image developed in an SDR may be stored together with the image developed in an HDR.

<OSD Brightness Setting Processing>

Figure 12A:
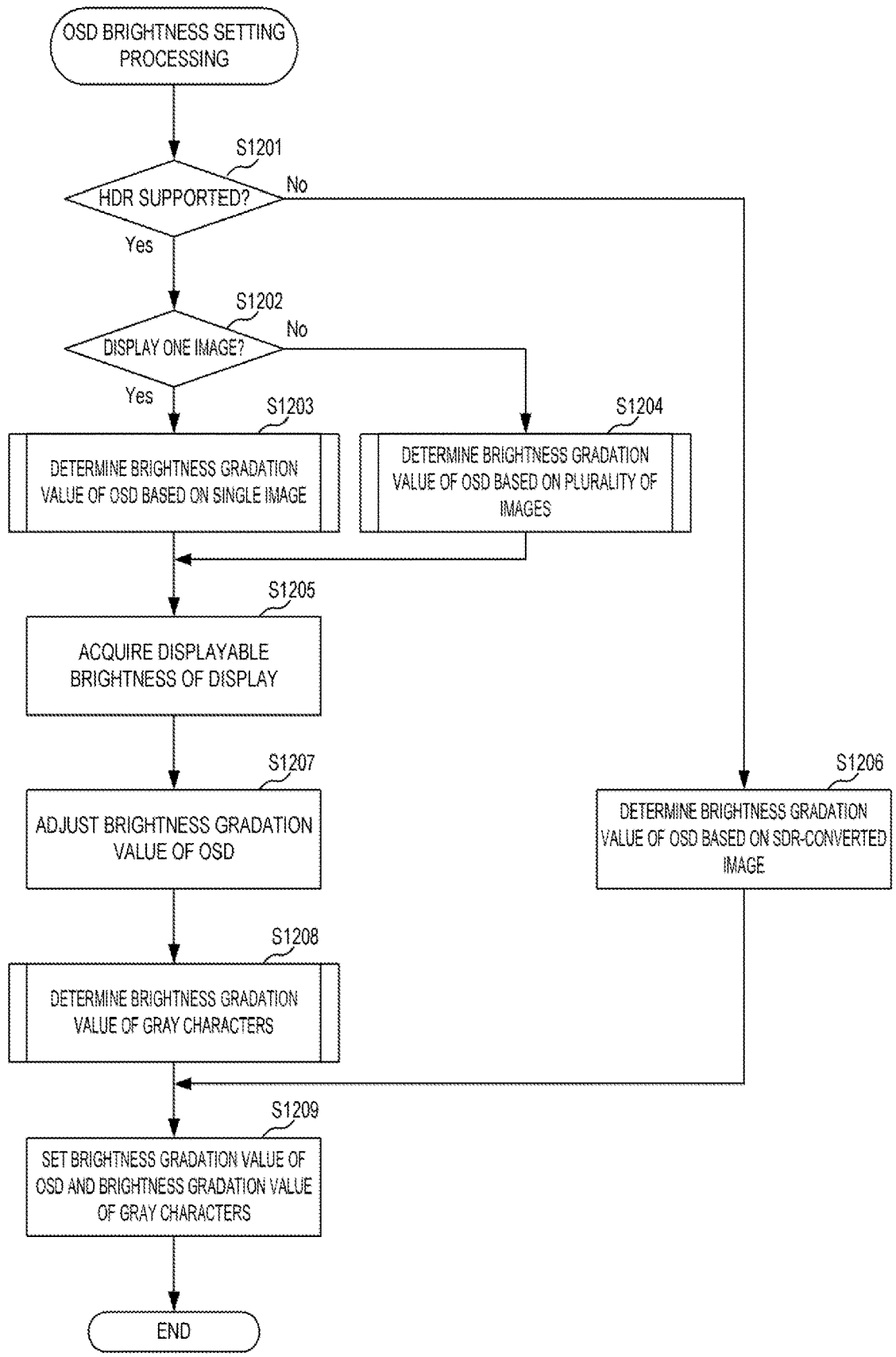
FIG. 12A is a flow chart showing OSD brightness setting processing according to the first embodiment.

FIG. 12A is a flow chart showing an example of OSD brightness setting processing according to the present embodiment. The processing is realized as the system control unit 50 deploys a program recorded in the nonvolatile memory 56 onto the system memory 52 and executes the program. The processing is processing for adjusting (setting) brightness of an OSD when performing information display of the OSD on an HDR display.

In S1201, the system control unit 50 determines whether or not the display that is a display destination of the OSD (in the present embodiment, the external device 300) supports HDR display. When the display supports HDR display, the system control unit 50 advances to S1202, but otherwise the system control unit 50 advances to S1206.

In S1202, the system control unit 50 determines whether or not the image that is a display object is a single image. When the image that is a display object is a single image, the system control unit 50 advances to S1203, but otherwise (in the case of a plurality of images) the system control unit 50 advances to S1204.

In S1203, the system control unit 50 determines a brightness gradation value (a signal value of white) of the OSD based on the (single) image that is a display object. Details of the processing for determining the brightness gradation value of the OSD based on the image will be described later with reference to FIG. 12B.

In S1204, the system control unit 50 determines the brightness gradation value of the OSD based on the (plurality of) images that are display objects. Details of the processing for determining the brightness gradation value of the OSD based on the images will be described later with reference to FIG. 12B.

In S1205, the system control unit 50 acquires displayable brightness of the display. This is done in order to determine whether or not the display is capable of display based on the brightness gradation value of the OSD determined in S1203 or S1204. As a method of acquiring the displayable brightness of the display, for example, EDID information including the display brightness information of the display is acquired using a DDI (Display Data Channel). It should be noted that, as a premise, both a graphic board and the display must support DDI. When the display brightness information of the display cannot be acquired, display brightness selected by the user from expected values of display display brightness prepared in advance may be acquired. Examples of the expected values of display display brightness include 1000 cd/m$^2$, 600 cd/m$^2$, and 400 cd/m$^2$ that conform to the DisplayHDR standard of VESA and 1000 cd/m² and 500 cd/m² that conform to UltraHD PremiumLOGO.

In S1206, the system control unit 50 determines the brightness gradation value of the OSD based on an SDR-converted image (an image after SDR conversion; an SDR image). For example, a maximum brightness gradation value is calculated among brightness gradation values of all pixels that constitute the SDR-converted image and the maximum brightness gradation value is determined as the brightness gradation value of the OSD. Since an SDR uses a color gamut of Rec.709, gamma 2.2, or the like, the brightness gradation value is a relative value. However, with the popularization of HDR displays in recent years, a peak brightness when displaying in an SDR on an HDR display has become higher. In this case, displaying in an SDR in a conventional manner may create a problem in that 255 (8 bits) that is a brightness gradation value of white (white brightness) equals 1000 cd/m² and becomes too bright in a similar manner to an HDR. When peak brightness of an SDR display can be acquired from EDID information, as the brightness gradation value of white of an OSD, a code value of an SDR corresponding to a brightness gradation value determined by a method similar to the method for HDR (processing of S1202 and thereafter) may be set.

In S1207, the system control unit 50 adjusts the brightness gradation value of the OSD. Specifically, the system control unit 50 determines, as a final brightness gradation value of the OSD, whichever brightness gradation value is smaller between the brightness gradation value of the OSD determined in S1203 or S1204 and the displayable brightness of the display acquired in S1205.

In S1208, the system control unit 50 determines a brightness gradation value of gray characters among the OSD. Gray characters represent an OSD indicating that a function displayed by the gray characters is disabled. Processing for determining the brightness gradation value of the gray characters will be described later with reference to FIG. 12C.

In S1209, the system control unit 50 sets the determined brightness gradation values (the brightness gradation value of the OSD and the brightness gradation value of the gray characters).

FIG. 12B is a flow chart showing details of processing (S1203, S1204) for determining the brightness gradation value of an OSD (a signal value of white) according to the present embodiment.

In S1211, the system control unit 50 acquires a maximum brightness gradation value among all pixels constituting a display image. For example, the system control unit 50 analyzes a histogram of brightness signals of the display image and acquires a signal value of a last bin on a high brightness side (a maximum value of brightness signals). In this case, since simply selecting a maximum value may cause a value with extremely low frequency among signal values of bright spots or the like to be acquired and may result in a low correlation with appearance, for example, an average value of a highest (high brightness side) 1% of signal values of the histogram may be acquired in place of the maximum value. In addition, when there are a plurality of images that are display objects (in the case of S204), a maximum brightness gradation value is acquired from each of the plurality of images and a maximum value, a minimum value, an average value, a median, a mode, or the like of the plurality of acquired brightness gradation values is acquired.

In S1212, when the brightness gradation value acquired in S1211 is lower than a minimum brightness gradation value (a prescribed value) retained in advance, the system control unit 50 determines the minimum brightness gradation value as the brightness gradation value of the OSD. When the OSD is displayed in accordance with the maximum value acquired in S1211, the OSD becomes darker in the case of a scene solely constituted by dark pixels (a low-key scene). Therefore, in the present embodiment, a minimum brightness value is retained in advance as the brightness of the OSD, and when the maximum value acquired in S1211 is lower than the minimum brightness value, the minimum brightness value is set as the brightness gradation value of the OSD. As the minimum brightness value, for example, 100 cd/m² that is described as a de facto standard in the Appendix of ITU-R BT.1886 can be used.

In S1213, the system control unit 50 sets the brightness gradation value determined through the processing described above as the brightness gradation value of the OSD. In other words, when the brightness of the OSD (a graphic image) is denoted by L1 and the brightness of the display image (an HDR image) is denoted by L2, L1=f(L2) can also be considered an increasing function in a broad sense. It should be noted that the brightness of the OSD need only increase as the brightness of the display image increases and the brightness of the OSD may increase linearly or increase in a stepwise manner (in a step function) in proportion to the brightness of the display image.

Figure 12C:
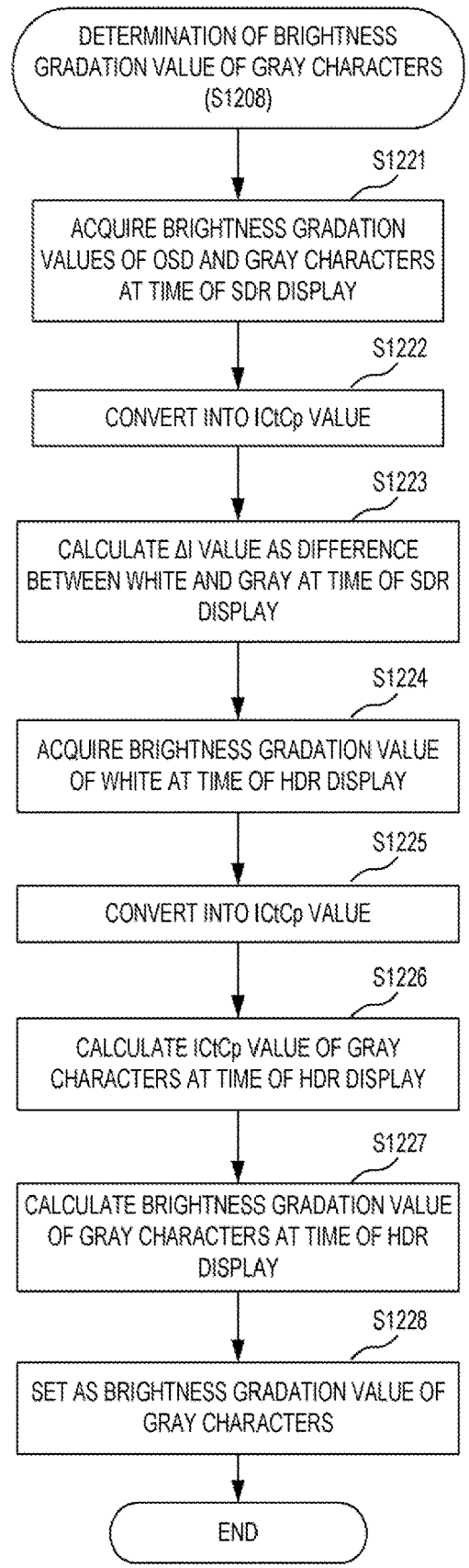
FIG. 12C is a flow chart showing OSD brightness setting processing according to the first embodiment

FIG. 12C is a flow chart showing details of the processing (S1208) for determining the brightness gradation value of gray characters among an OSD.

In S1221, the system control unit 50 acquires the brightness gradation values of white and gray during display in an SDR. For example, the system control unit 50 acquires 255 (8 bits) as the brightness gradation value of white during display in an SDR and acquires 128 (8 bits) as the brightness gradation value of gray during display in the SDR.

In S1222, the system control unit 50 converts the values acquired in S1221 into ICtCp values. Specifically, the signal values of white and gray of an SDR are converted from XYZ values into ICtCp values using a conversion formula that is described in White Paper Version 7.2 (ICtCp_DolbyWhitePaper.pdf) made publicly accessible by Dolby.

In S1223, the system control unit 50 calculates a difference ΔI (a perceptual difference) between the white ICtCp value and the gray ICtCp value. Since brightness in an SDR is relative brightness, character white is not always 100 cd/m². Cases where 200 cd/m² is assumed as character white in an SDR or the like can be accommodated by performing linear scaling in an XYZ color space in the middle of the conversion formula to ICtCp.

In S1224, the system control unit 50 acquires the brightness gradation value of the OSD determined in S1207 with respect to an HDR.

In S1225, the system control unit 50 converts the value acquired in S1224 into an ICtCp value in a similar manner to an SDR In S1226, the system control unit 50 calculates an ICtCp value of gray characters. In an HDR, when an OETF of the image is PQ, since a code value and a brightness value have a one-to-one correspondence, the linear scaling described earlier is not required. When the OETF of the image is HLG, since values are relative, desired scaling is necessary in a similar manner to an SDR. In doing so, an assumed system gamma must also be taken into consideration. In addition, in order to realize in an HDR the perceptual difference between white and gray in an SDR, an ICtCp value obtained by subtracting the perceptual difference ΔI from the ICtCp value of white in an HDR may be adopted as the ICtCp value of gray in the HDR.

In S1227, the system control unit 50 calculates a brightness gradation value (Y) from the ICtCp value of gray characters in an HDR having been calculated as described above via LMS, XYZ, and RGB.

In S1228, the system control unit 50 sets the brightness gradation value of gray characters in an OSD during display in an HDR.

FIGS. 13A to 13C are diagrams showing a display image according to a conventional method. Conventionally, when playing back and displaying a photographed image on a rear liquid crystal display of an imaging apparatus or the like, photography information (a speed, an aperture value, ISO sensitivity, and an image name) and an OSD (a graphic image) of state information during playback or the like are displayed superimposed on the photographed image.

For example, in the case of an SDR image, as shown in FIG. 13A, a maximum (upper limit) gradation value assumable by the SDR image and white of an OSD are generally set to a same maximum value 255 in terms of 8-bit code. However, in the case of an HDR image, particularly in the case of image data in compliance with the PQ standard, a maximum gradation value that is present in the HDR image is generally not 1023 in terms of 10-bit code. Therefore, as shown in FIG. 13B, assigning a maximum value of 1023 to white of an OSD causes (while also depending on performance of the display) the OSD to appear to shine brighter than the image and displayed in a dazzling manner. On the other hand, there is a concern that an image of a background is perceived as being relatively darker and hard to make out. Therefore, for example, assigning a gradation value of 520 to white of the OSD eliminates dazzle as shown in FIG. 13C. In this case, the value of 520 is a PQ code value corresponding to brightness of 100 $cd/m^2$ that is described as a de facto standard in the Appendix of ITU-R BT.1886. However, in cases where image data of the background is light or the like, there is a concern that white of OSD may be perceived as being relatively darker and hard to make out. In addition, while there are cases where making white of an OSD darker causes white to be perceived as being gray, since gray often represents a disabled function, there is a concern that the user may be misled.

FIGS. 13D and 13E are diagrams showing a display image according to the present embodiment. As shown in FIG. 13D, since a maximum brightness gradation value of a background image and a brightness gradation value of white characters in an OSD (a graphic image) are the same, visibility of the OSD is improved. In addition, as shown in FIG. 13E, even when the maximum brightness of the background image differs among images to be displayed, by matching the brightness of white characters of the OSD to the maximum brightness of the background image for each image, improved visibility of the OSD can always be realized. As described above, according to the first embodiment, even with an HDR display capable of displaying high brightness, an OSD superimposed on a background image can be shown with good visibility.

Figure 14:
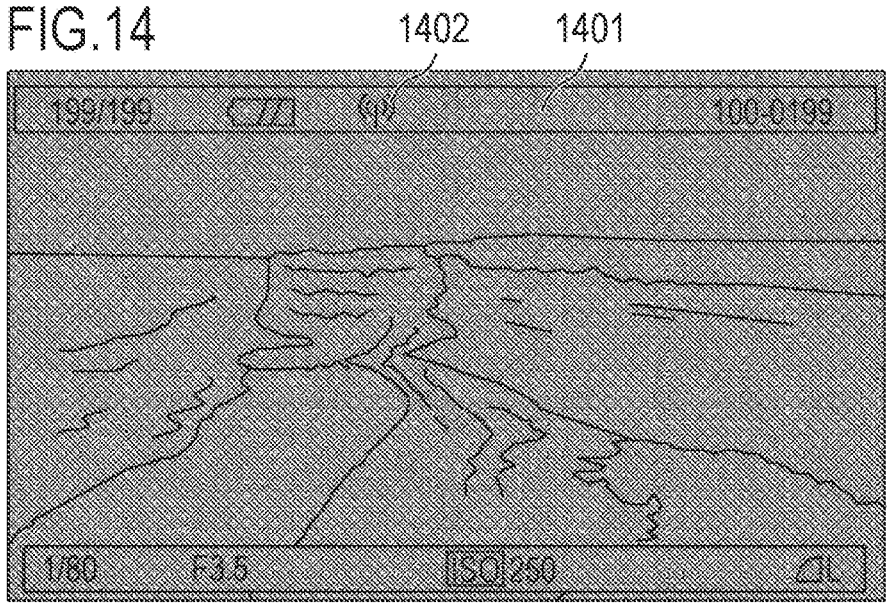
FIG. 14 is a diagram showing OSD information display according to the first embodiment.

In addition, due to the processing described above, the perceptual difference between a gray location (gray characters or symbols) (1402) and a white location (1401) of the OSD shown in FIG. 14 (display in an SDR) is maintained even after switching to display in an HDR and the brightness gradation value of white changes. Therefore, gray brightness can be perceived in a same feeling as in an SDR.

Second Embodiment

Next, a second embodiment of the present invention will be described. In the first embodiment, a brightness gradation value of an OSD is determined based on a maximum brightness gradation value of a background image. The second embodiment differs from the first embodiment in that the brightness gradation value of an OSD is determined based on photographing conditions of a background image.

Specifically, in the processing of S1203 or S1204 in FIG. 12A, the brightness gradation value of an OSD is determined in accordance with an input dynamic range setting at the time of sensing and a gamma setting at the time of development. While 1023 corresponds to 10000 $cd/m^2$ in PQ, when the input dynamic range is narrow, it is conceivable that values up to 1023 will not be exhausted as output. A maximum value of an output signal to be actually used is dependent on a gamma curve at the time of development, and when gamma characteristics include high contrast, the maximum value of an output signal also increases. Therefore, for example, as photographing conditions, there exist maximum signal values in accordance with four combinations, namely, a narrow D range setting and a wide D range setting in the photography mode during photography and a high-contrast gamma setting (developing mode) and a low-contrast gamma setting (developing mode) during development. FIG. 15 is a diagram showing an example of four maximum signal values and four maximum brightness values that are determined according to photographing conditions. As the brightness gradation value of white of an OSD, a maximum signal value corresponding to photographing conditions may be set.

As described above, according to the second embodiment, by determining the brightness gradation value of white in an OSD based on photographing conditions of an image instead of pixel values of the image, visibility of the OSD is improved. For example, when sequentially feeding and viewing a plurality of images during image playback, even when a maximum brightness value of contents varies among the images, the brightness gradation value of white of the OSD remains unchanged and visibility can be improved by suppressing flicker.

Figure 16:
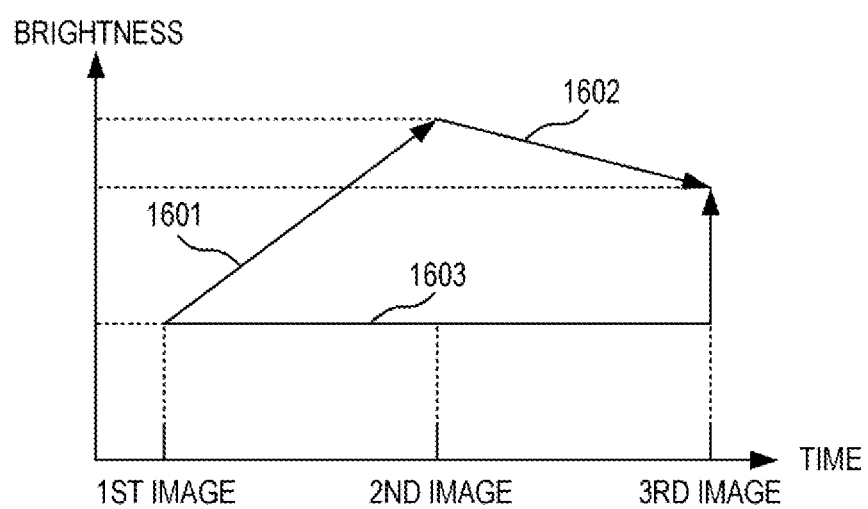
FIG. 16 is a flow chart showing a brightness change according to the second embodiment.

However, when sequentially feeding and viewing a plurality of images with different photographing conditions, there remains a concern that flicker may occur. Therefore, as shown in FIG. 16, when photographing conditions differ between a first image and a second image, brightness of the OSD may be gradually changed (1601). The brightness is gradually changed in a similar manner when feeding images from the second image to a third image (1602). However, when image feed is performed at high speed by an operation such as continuously depressing an image feed button (not illustrated), brightness need not be gradually changed. In this case, for example, by displaying the OSD at brightness corresponding to photographing conditions of an image being displayed when depression of the image feed button is released while maintaining the brightness of the first image, flicker can be reduced (1603).

Third Embodiment

Next, a third embodiment of the present invention will be described. In the first and second embodiments, the brightness gradation value of white of an OSD is set based on a pixel value or photographing conditions of a display image. The third embodiment differs from first and second embodiments in that, when performing multi-playback of a plurality of images including an HDR image and an SDR image by index display or the like, the brightness gradation value of white of an OSD is determined based on a plurality of images. In other words, in the first embodiment described earlier, processing of S1204 differs.

Figure 17A:
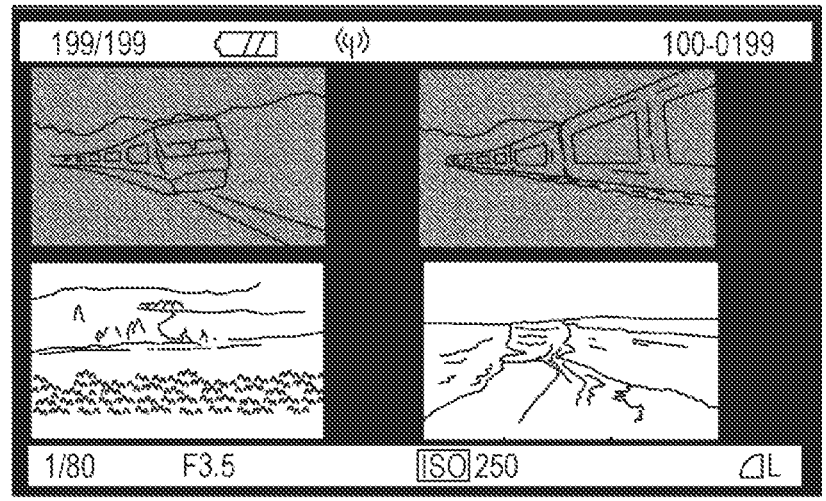
FIGS. 17A to 17C are diagrams showing an example of a display image according to a third embodiment.
Figure 17B:
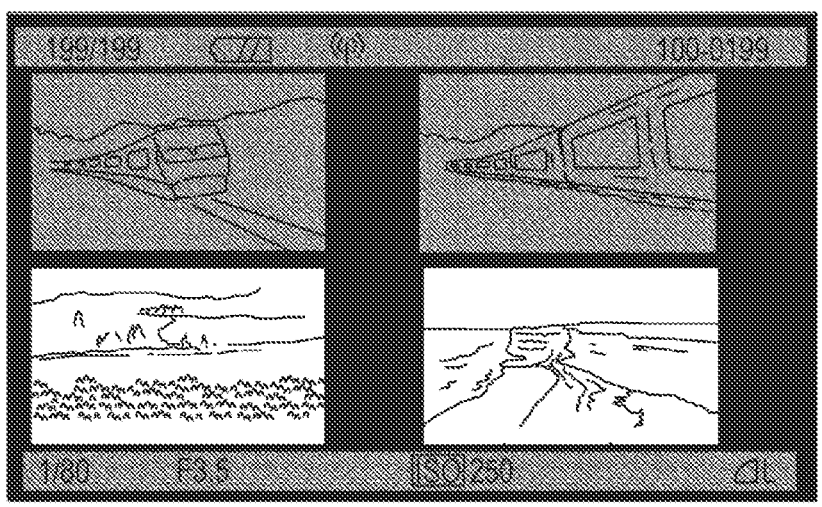
Figure 17C:
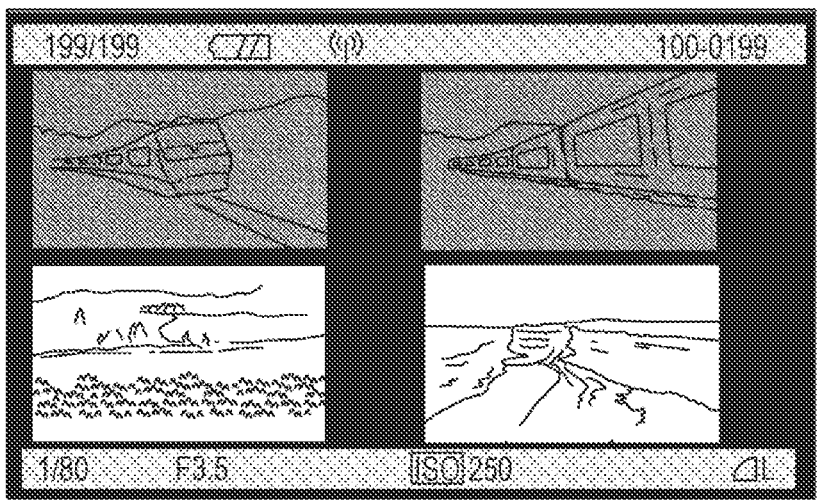

FIGS. 17A to 17C are diagrams showing an example of multi-playback display according to the present embodiment. For example, let us assume that, among four images in a 2 by 2 arrangement, the top two images are SDR images with a maximum brightness value of 100 cd/m² and the bottom two images are HDR images with a maximum brightness value of 648 cd/m². In this case, conforming the brightness gradation value of white of an OSD to the HDR images as shown in FIG. 17A causes brightness of the OSD to excessively rise relative to brightness of the SDR images and visibility of the OSD to decline and, at the same time, visibility of the SDR images declines. In addition, conforming the brightness gradation value of white of the OSD to the SDR images as shown in FIG. 17B causes brightness of the OSD to excessively fall relative to brightness of the HDR images and visibility of the OSD to decline. In consideration thereof, in the third embodiment, a brightness gradation value of white of a plurality of images is adjusted.

FIG. 18 is a flow chart showing an example of OSD brightness setting processing according to the third embodiment.

In S1801, the system control unit 50 acquires the brightness gradation value of white of a plurality of images. In S1802, the system control unit 50 calculates a median of the brightness gradation values of white of all acquired images. In S1803, the system control unit 50 sets the calculated median as the brightness gradation value of white of the OSD. Accordingly, since an SDR image, an HDR image, and an OSD can be displayed in a balanced manner as shown in FIG. 17C, visibility can be improved. It should be noted that the method of calculating the brightness gradation value of white from a plurality of images (S1802) is not limited to a median and statistics such as an average value or a mode may be used.

As described above, according to the third embodiment, when simultaneously displaying a plurality of images (side by side), the brightness gradation value of white in an OSD is determined based on the brightness gradation values of white of all images. Accordingly, for example, even when performing multi-display such as index display, visibility can be improved with respect to all of an SDR image, an HDR image, and an OSD.

Fourth Embodiment

Next, a fourth embodiment of the present invention will be described. In the first to third embodiments, one brightness gradation value of white of an OSD is set with respect to an entire screen. In other words, in the first to third embodiments, one brightness gradation value of white of an OSD is set based on an entire background. However, a subject has light regions as well as dark regions and SDR images are often darker than HDR images. The fourth embodiment differs from the first to third embodiments in that an optimal brightness gradation value of white in an OSD is set for each region inside a plane of a single image to be a background.

Figure 19A:
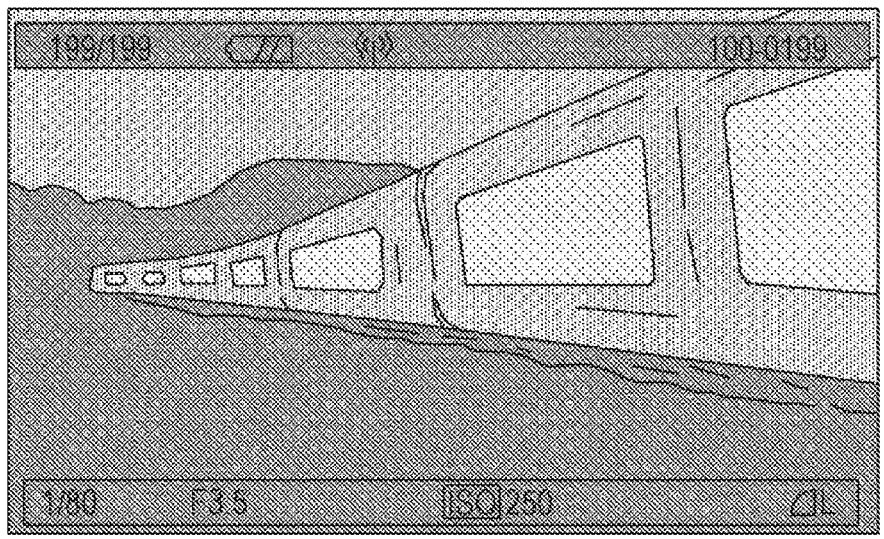
FIGS. 19A and 19B are diagrams showing an example of a display image according to a fourth embodiment.

For example, since the brightness gradation value of white in an OSD at a lower end of FIG. 19A is more or less the same as the brightness of the background image, there is no problem with the visibility of the OSD at the lower end. However, with an OSD at an upper end of which the brightness gradation value of white is the same as that of the OSD at the lower end, since the background image is light, the OSD at the upper end appears relatively dark. In such a case, it is difficult to preferably set only one brightness gradation value of white of an OSD with respect to one image. Therefore, in consideration of features of an image an optimal brightness gradation value of white in an OSD is desirably set for each region inside an image plane.

FIG. 20 is a flow chart showing an example of OSD brightness setting processing according to the fourth embodiment.

In S2001, the system control unit 50 acquires a brightness distribution image (an image indicating a brightness distribution) based on a display image. As the brightness distribution image, a brightness component of a display image may be used. Since a brightness component of a middle to low band (a low-frequency band of which a spatial frequency is lower than a prescribed frequency) has a lower risk of image quality deterioration such as a tone jump in processing to be described later, processing of lowering a high band (a high-frequency band) is performed in advance with respect to a brightness signal of the display image. While there are several conceivable processing steps for lowering (suppressing) a high band, for example, filtering processing of horizontally and vertically applying an LPF (low-pass filter) may be performed.

In S2002, using the calculated brightness distribution image, the system control unit 50 obtains a brightness gradation value of an OSD for each region (corrects an image for information display of an OSD). In a region with high brightness in the brightness distribution image, the brightness gradation value of the OSD may also be increased. In this case, the higher the brightness of a region, the higher the brightness gradation value of the OSD. While there are several conceivable methods of realizing S2002, for example, a brightness distribution image of the display image and an image for information display of an OSD are conceivably calculated by screen processing. Screen processing is a layer composition method and, while screen processing may be performed using a known technique, specifically, screen processing can be performed by multiplying a black/white inverted display image and a similarly black/white inverted image for information display of an OSD and subjecting an obtained result to black/white inversion once again.

Figure 19B:
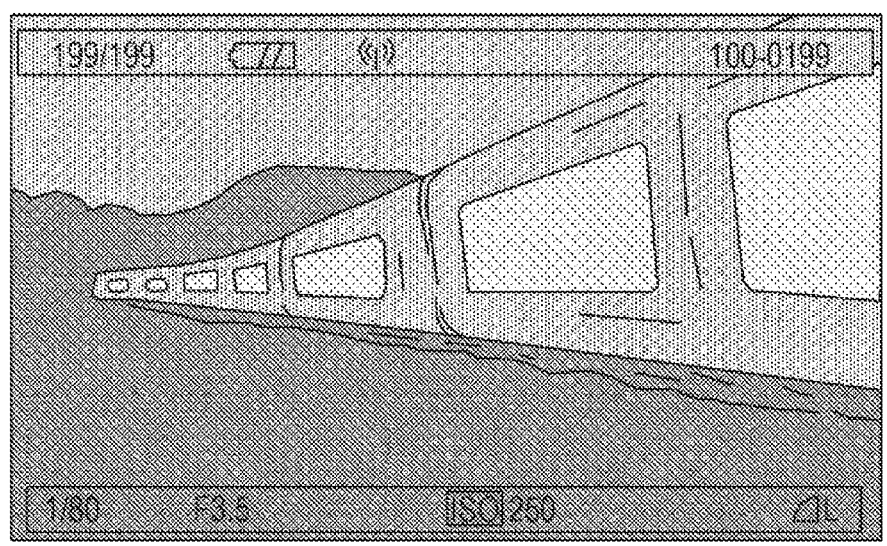

In S2003, the system control unit 50 sets the brightness gradation value of white of the OSD obtained in S2002 as an actual brightness gradation value (code value). Accordingly, as shown in FIG. 19B, in the display image, a light OSD can be superimposed and displayed on a light region (upper end) and a dark OSD can be superimposed and displayed on a dark region (lower end).

As described above, according to the fourth embodiment, by setting a brightness gradation value of white of an OSD that differs among regions of an image in accordance with features of the image, information on the OSD can be displayed in a stable manner with good visibility without depending on a subject.

Furthermore, the present invention can also be realized by executing the processing described below. Specifically, the present invention can also be realized by supplying software (a program) that realizes functions of the embodiments described above to a system or an apparatus via a network or various storage media and having a computer (or a CPU, an MPU, or the like) in the system or the apparatus load and execute the program.

Although preferred embodiments of the present invention have been described above, it is to be understood that the present invention is not limited to such embodiments and various modifications and changes may be without departing from the spirit and scope of the present invention.

According to the present invention, an OSD can be displayed with suitable brightness.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-018973, filed on Feb. 6, 2020, which is hereby incorporated by reference herein in its entirety.

What is claimed is:

1. An apparatus, comprising:
an imaging element; and
a display controller configured to display a graphic image together with an HDR image on a display unit,
wherein the display controller is further configured to (1) display the graphic image in second brightness in a case where brightness of the HDR image is first brightness, and (2) display the graphic image in fourth brightness that is higher than the second brightness in a case where brightness of the HDR image is third brightness that is higher than the first brightness, and
the brightness of the HDR image used for the case determination is maximum brightness corresponding to a dynamic range set on the device at a time of imaging or maximum brightness corresponding to a gamma set on the device at a time of development.

2. The apparatus according to claim 1, wherein the brightness of the HDR image used for the case determination is maximum brightness in the HDR image.

3. The apparatus according to claim 1, wherein the display controller is further configured to, in a case where switching between images to be displayed on the display unit is implemented, gradually change the brightness of the graphic image.

4. The apparatus according to claim 1, wherein in a case where the display controller displays a plurality of images side by side on the display unit, the brightness of the graphic image is any value of a maximum value, a minimum value, an average value, a median, or a mode of maximum brightnesses of the respective images.

5. The apparatus according to claim 1, wherein the display controller is further configured to determine brightness of the graphic image for each region in a plane of the HDR image.

6. The apparatus according to claim 1, wherein the display controller is further configured to adjust brightness of the graphic image on the basis of display brightness selected by a user.

7. The apparatus according to claim 1, wherein the display controller is further configured to adjust brightness of the graphic image on the basis of displayable brightness acquired from the display unit.

8. The apparatus according to claim 1, wherein the display controller is further configured to adjust brightness of the graphic image on the basis of a brightness component of which a spatial frequency is a low frequency band that is lower than a prescribed frequency in the HDR image.

9. The apparatus according to claim 1, wherein the display controller is further configured to determine brightness of gray that indicates a state of being disabled in the graphic image at a time of display in an HDR on the basis of on a difference between maximum brightness of the graphic image and brightness of gray at a time of display in an SDR.

10. The apparatus according to claim 1, wherein the display controller is further configured to, in a case where brightness of the graphic image that is determined on the basis of brightness of the HDR image is lower than a prescribed value, set the brightness of the graphic image to the prescribed value.

11. The apparatus according to claim 1, wherein the brightness of the HDR image used for the case determination is the maximum brightness corresponding to the dynamic range set on the device at the time of imaging and the maximum brightness corresponding to the gamma set on the device at the time of development.

12. A control method of an apparatus including an imaging element, the control method comprising:
displaying a graphic image together with an HDR image on a display unit,
displaying the graphic image in second brightness in a case where brightness of the HDR image is first brightness, and
displaying the graphic image in fourth brightness that is higher than the second brightness in a case where brightness of the HDR image is third brightness that is higher than the first brightness, wherein
the brightness of the HDR image used for the case determination is maximum brightness corresponding to a dynamic range set on the device at a time of imaging or maximum brightness corresponding to a gamma set on the device at a time of development.

13. A non-transitory computer readable medium that stores a program, wherein the program causes a computer to execute: a control method of an apparatus including an imaging element, the control method comprising:
displaying a graphic image together with an HDR image on a display unit, displaying the graphic image in second brightness in a case where brightness of the HDR image is first brightness, and displaying the graphic image in fourth brightness that is higher than the second brightness in a case where brightness of the HDR image is third brightness that is higher than the first brightness, and the brightness of the HDR image used for the case determination is maximum brightness corresponding to a dynamic range set on the device at a time of imaging or maximum brightness corresponding to a gamma set on the device at a time of development.

\* \* \* \* \*